(12) United States Patent
Li et al.

(10) Patent No.: US 12,022,768 B1
(45) Date of Patent: Jul. 2, 2024

(54) HIGH-EFFICIENCY AND LOW-DAMAGE POTATO COMBINE HARVESTER

(71) Applicant: Jiangsu University, Jiangsu (CN)

(72) Inventors: Yaoming Li, Jiangsu (CN); Hanhao Wang, Jiangsu (CN); Kuizhou Ji, Jiangsu (CN); Ying Wu, Jiangsu (CN); Xiangyang Wu, Jiangsu (CN); Guoliang You, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/284,295

(22) PCT Filed: Dec. 30, 2022

(86) PCT No.: PCT/CN2022/144070
§ 371 (c)(1),
(2) Date: Sep. 27, 2023

(87) PCT Pub. No.: WO2023/165254
PCT Pub. Date: Sep. 7, 2023

(30) Foreign Application Priority Data

Dec. 29, 2022 (CN) .......................... 202211709404.9

(51) Int. Cl.
*A01D 17/02* (2006.01)
*A01D 17/10* (2006.01)
(Continued)

(52) U.S. Cl.
CPC .............. *A01D 17/02* (2013.01); *A01D 33/08* (2013.01); *A01D 51/005* (2013.01); *A01D 2017/103* (2013.01)

(58) Field of Classification Search
CPC ........ A01D 15/00–15/04; A01D 17/00–17/22; A01D 21/00–21/04; A01D 33/00–33/14; A01D 51/005
See application file for complete search history.

(56) References Cited

U.S. PATENT DOCUMENTS

2018/0042176 A1   2/2018   Obropta et al.

FOREIGN PATENT DOCUMENTS

| CN | 201430778 | 3/2010 |
| CN | 202818956 | 3/2013 |

(Continued)

OTHER PUBLICATIONS

"International Search Report (Form PCT/ISA/210) of PCT/CN2022/144070," mailed on Apr. 17, 2023, pp. 1-4.

(Continued)

*Primary Examiner* — Adam J Behrens
*Assistant Examiner* — Madeline I Runco
(74) *Attorney, Agent, or Firm* — JCIPRNET

(57) ABSTRACT

The present disclosure provides a high-efficiency and low-damage potato combine harvester, including a digging device, a conveyance and separation device, a separation and elevation reversing device, a potato collection box, and a control unit. The digging device is provided at a front end of the potato combine harvester. The conveyance and separation device is provided behind the digging device, and configured to perform preliminary conveyance and separation on a potato-soil-stem mixture dug by the digging device. The separation and elevation reversing device is provided at a side of the conveyance and separation device, and configured to separate the potato-soil-stem mixture from the conveyance and separation device and elevate potatoes to the potato collection box. The potato collection box is located at a tail end of the separation and elevation reversing device, and configured to load the potatoes and feed weight information of carried potatoes back to the control unit.

32 Claims, 20 Drawing Sheets

(51) Int. Cl.
      *A01D 33/08*       (2006.01)
      *A01D 51/00*       (2006.01)

(56) References Cited

FOREIGN PATENT DOCUMENTS

| | | |
|---|---|---|
| CN | 205196313 | 5/2016 |
| CN | 110214527 | 9/2019 |
| CN | 112970033 | 6/2021 |
| CN | 215353645 | 12/2021 |
| CN | 115500140 | 12/2022 |
| JP | 2011130668 A * | 7/2011 |

OTHER PUBLICATIONS

"Written Opinion of the International Searching Authority (Form PCT/ISA/237) of PCT/CN2022/144070," mailed on Apr. 17, 2023, pp. 1-3.

* cited by examiner

HIGH-EFFICIENCY AND LOW-DAMAGE POTATO COMBINE HARVESTER

CROSS-REFERENCE TO RELATED APPLICATION

This application is a 371 of international application of PCT application serial no. PCT/CN2022/144070, filed on Dec. 30, 2022, which claims the priority benefit of China application no. 202211709404.9, filed on Dec. 29, 2022. The entirety of each of the above-mentioned patent applications is hereby incorporated by reference herein and made a part of this specification.

BACKGROUND

Technical Field

The present disclosure belongs to the technical field of intelligent agricultural machinery, and particularly relates to a high-efficiency and low-damage potato combine harvester.

Description of Related Art

As the fourth most important staple food crop in China, potatoes have been widely planted in the arid hilly regions of Northwest China. Mechanized harvesting is considered as a critical step in potato production. Concerning the existing simple digging harvester mainly used for harvesting the potatoes, the working efficiency is low, considerable labor is required to go to fields again for manual pickup and conveyance, the potatoes cannot be picked up completely, and the production cost is high. With the high efficiency, good working performance, less manpower, and remarkable cost effectiveness, a combine harvester is a mainstream development trend to harvest the potatoes. Large-scale planting of the potatoes in hilly and mountain regions will be benefited from a potato combine harvester. With a wide market prospect, the potato combine harvester is of great significance to reduce the production cost, improve the economic benefit, and popularize the potatoes as staple food.

The potato harvester used widely at present in China only includes a digging device and a simple separation conveyor chain. For this machine, the digging resistance is large, and the conveyance and separation device is too simple to separate a potato-soil-stem mixture at the high efficiency and high performance, thereby causing large damage rate and leakage rate. The existing potato combine harvester is integrated with a digging device, a conveying device and a potato collection device. It realizes combine harvesting for the potatoes, and saves harvesting time and labor. However, all devices in the potato combine harvester are structured conventionally and are not optimized, such that the damage rate and leakage rate cannot be reduced, and the cleaning rate is to be improved. Moreover, the digging device is the prior art and is not optimized in various scenes, the potato-stem separation mechanism has a limited number of stages, and low-damage optimization is not performed on the potato loading-unloading mechanism. Therefore, the existing potato harvester cannot harvest the potatoes at a high efficiency and a low damage, with potato harvesting quality to be further improved.

SUMMARY

In view of the above technical problems, the present disclosure provides a high-efficiency and low-damage potato combine harvester. The present disclosure harvests potatoes at the high efficiency and the low damage, and improves harvesting quality of the potatoes.

The present disclosure achieves the above technical objective through following technical solutions.

A high-efficiency and low-damage potato combine harvester is provided, including a digging device, a conveyance and separation device, a separation and elevation reversing device, a potato collection box, and a control unit, where the digging device is provided at a front end of the potato combine harvester; the conveyance and separation device is provided behind the digging device, and configured to perform preliminary conveyance and separation on a potato-soil-stem mixture dug by the digging device; the separation and elevation reversing device is provided at a side of the conveyance and separation device, and configured to further separate the potato-soil-stem mixture from the conveyance and separation device and elevate potatoes to the potato collection box; the potato collection box is located at a tail end of the separation and elevation reversing device, and configured to load the potatoes and feed weight information of carried potatoes back to the control unit; and the control unit controls an ascending angle, a descending angle, and an inclination angle of a potato carrying part of the potato collection box according to a weight of the carried potatoes.

In the high-efficiency and low-damage potato combine harvester, the digging device includes a digging shovel, a vibrating sieve, a drive device, an adjusting device, and a transitional conveyor chain; the digging shovel includes an upper fixed shovel and a lower movable shovel; the upper fixed shovel is provided on the lower movable shovel; the upper fixed shovel and the lower movable shovel are stacked in a staggered manner; a shovel tip of the lower movable shovel extends to a front of a shovel tip of the upper fixed shovel; circular microprotrusion structures are densely arranged on a shovel surface of the upper fixed shovel; the vibrating sieve is provided between the digging device and the transitional conveyor chain; the drive device is connected to the lower movable shovel and the vibrating sieve, and configured to drive the lower movable shovel and the vibrating sieve to vibrate in a reciprocating manner; the adjusting device is provided on a potato harvester frame; the adjusting device is connected to the digging shovel, and configured to adjust a digging depth and a penetrating angle; and the transitional conveyor chain is provided behind the digging shovel.

The digging device can effectively reduce a digging resistance in potato harvesting and prevent soil hilling and potato damaging phenomena. This greatly improves a harvesting efficiency and working performance.

In the above solution, the upper fixed shovel includes a nylon shovel surface and a fixed shovel supporting device; the nylon shovel surface is provided on the fixed shovel supporting device; the circular microprotrusion structures are densely arranged on the nylon shovel surface; the circular microprotrusion structures each are a lotus-leaf-like hydrophobic structure, to reduce adhesion for fine soil particles, and congestion of soil on the shovel surface; and the nylon shovel surface has an arc-shaped shovel tip, to reduce adhesion of the soil on the shovel surface and breakage of the potatoes.

Further, the fixed shovel supporting device includes a fixed shovel supporting plate, a supporting arm, a rotary shaft, and an angle adjusting plate; the nylon shovel surface is provided on the fixed shovel supporting plate; the fixed shovel supporting plate is connected to one end of the supporting arm; an other end of the supporting arm is connected to the rotary shaft; two ends of the rotary shaft are provided on the adjusting device; and the angle adjusting plate includes one end connected to the rotary shaft, and an other end connected to the adjusting device.

In the above solution, a shovel tip of a movable shovel blade of the lower movable shovel is shaped as a gear tooth having two involutes crossed and a tip end cut; and the involutes at two sides of the shovel tip are respectively provided with cutting edges, thereby reducing a resistance when the movable shovel blade cuts the soil.

In the above solution, the adjusting device includes a parallel four-rod mechanism, a depth adjusting mechanism, and an angle adjusting mechanism; the depth adjusting mechanism includes one side connected to the potato harvester frame, and an other side connected to an upper portion of the parallel four-rod mechanism; the upper fixed shovel is provided at a front end of the parallel four-rod mechanism; a rear end of the parallel four-rod mechanism is connected to the potato harvester frame; the depth adjusting mechanism is configured to adjust an inclination angle of the parallel four-rod mechanism relative to ground, thereby adjusting the digging depth of the digging shovel; the angle adjusting mechanism includes one end connected to the front end of the parallel four-rod mechanism, and an other end connected to the upper fixed shovel; and the angle adjusting mechanism is configured to adjust an inclination angle of the upper fixed shovel relative to the ground, thereby adjusting the penetrating angle of the digging shovel.

Further, a number of the parallel four-rod mechanisms is two, and the parallel four-rod mechanisms are respectively symmetrically provided at two sides of the depth adjusting mechanism; the parallel four-rod mechanisms each include front connecting rods, upper connecting rods, first side plates, and second side plates; one end of each of the front connecting rods is connected to one end of one of the upper connecting rods, an other end of the one of the upper connecting rods is connected to one end of one of the first side plates, an other end of the one of the first side plates is connected to one end of one of the second side plates, and an other end of the one of the second side plates is connected to an other end of the each of the front connecting rods; upper portions of two of the front connecting rods are connected through a first beam; two of the upper connecting rods are connected through a second beam; upper portions of two of the first side plates are connected through a third beam; and lower portions of the two of the first side plates are connected through a fourth beam.

In the above solution, the depth adjusting mechanism includes a digging depth adjusting hydraulic cylinder, a first depth adjusting rod, and a second depth adjusting rod; the digging depth adjusting hydraulic cylinder includes one end connected to the potato harvester frame, and an other end connected to the first depth adjusting rod; the first depth adjusting rod includes one end connected to a third beam, and an other end connected to one end of the second depth adjusting rod; and an other end of the second depth adjusting rod is connected to a second beam.

In the above solution, the angle adjusting mechanism includes an angle adjusting hydraulic cylinder; and the angle adjusting hydraulic cylinder includes one end connected to one end of one of the front connecting rods, and an other end connected to the upper fixed shovel.

In the above solution, the conveyance and separation device includes a potato-soil separation conveyor chain, a potato-stem separation conveyor chain, elastic open-close scraping teeth, and a tensioning mechanism; the potato-stem separation conveyor chain surrounds the potato-soil separation conveyor chain; the elastic open-close scraping teeth are provided above the potato-stem separation conveyor chain; the elastic open-close scraping teeth are cooperated with the potato-stem separation conveyor chain to separate stems and leaves from the potatoes; and the tensioning mechanism is provided on the potato-soil separation conveyor chain, and configured to adjust tensioning of the potato-soil separation conveyor chain to adjust a spacing between conveyor chain rods.

In the above solution, the high-efficiency and low-damage potato combine harvester further includes a photogate sensor and the control unit; the photogate sensor is configured to detect a time signal that a beam is obstructed by the conveyor chain rods of the potato-soil separation conveyor chain; the time signal includes an "off time" and an "on time" and is transmitted to the control unit; and the control unit calculates a linear speed v of the potato-soil separation conveyor chain and a spacing l between adjacent ones of the conveyor chain rods according to the time signal acquired by the photogate sensor.

In the above solution, the high-efficiency and low-damage potato combine harvester further includes an image acquisition device; and the image acquisition device is configured to acquire an image of a potato-soil mixture on the potato-soil separation conveyor chain and transmit the image to the control unit, such that the linear speed v of the potato-soil separation conveyor chain is adjusted according to a congestion condition displayed by the image.

In the above solution, the potato-soil separation conveyor chain includes a plurality of the conveyor chain rods; adjacent ones of the conveyor chain rods are respectively connected at ends through herringbone torsion spring connectors; and two adjacent ones of the herringbone torsion spring connectors are arranged in a vertical turning direction.

Further, a pair of pin holes are formed respectively radially in two ends of each of the conveyor chain rods; through cotter pins and locating catches, the herringbone torsion spring connectors are located in an axial direction of the conveyor chain rods; three locating catches are provided at each of the two ends of each of the conveyor chain rods as well as between a pair of the cotter pins; the locating catches pairwise separate adjacent ones of the herringbone torsion spring connectors connected to the conveyor chain rods; two adjacent ones of the herringbone torsion spring connectors are cooperated with a same one of the conveyor chain rods; the two adjacent ones of the herringbone torsion spring connectors are arranged in the vertical turning direction; and two ends of a same one of the conveyor chain rods are respectively cooperated with two of the herringbone torsion spring connectors.

In the above solution, the potato-stem separation conveyor chain includes a plurality of transverse rubber rods and a plurality of longitudinal rubber belts; the plurality of the transverse rubber rods are arranged transversely; the plurality of the longitudinal rubber belts are arranged longitudinally; the plurality of the transverse rubber rods and the plurality of the longitudinal rubber belts are interlaced to form a net-like structure; finger-like flexible protruding contacts are uniformly arranged on the plurality of the transverse rubber rods; and the finger-like flexible protruding contacts are cooperated with the elastic open-close scraping teeth to separate the stems and the leaves from the potatoes.

In the above solution, the elastic open-close scraping teeth include fixed seats, a fixed shaft, flexible rubber scraping teeth, a reset torsional spring, and an elongated rod; the fixed seats are respectively provided at two ends of the fixed shaft; the fixed shaft is parallel to the conveyor chain rods; one end of each of the flexible rubber scraping teeth is a shaft sleeve structure; a plurality of the flexible rubber scraping teeth are sleeved on the fixed shaft; the reset torsional spring includes one end connected to the shaft sleeve structure of one of the flexible rubber scraping teeth, and an other end connected to the elongated rod; and two ends of the elongated rod are respectively connected to the fixed seats.

In the above solution, the tensioning mechanism includes tensioning arms, a rotary shaft, tensioning wheels, and an adjusting hydraulic cylinder; each of the tensioning arms includes a transverse arm and a longitudinal arm intersected to form a "T"-shaped structure, and is connected to a shaft end of the rotary shaft at an intersection; the tensioning arms are respectively connected to two ends of the rotary shaft; two ends of the transverse arm of each of the tensioning arms are respectively provided with the tensioning wheels; the tensioning wheels come in contact with the potato-soil separation conveyor chain; the longitudinal arm of each of the tensioning arms includes one end hinged with the adjusting hydraulic cylinder, and an other end connected to a potato harvester frame; and by controlling a telescopic amount of the adjusting hydraulic cylinder, a tension degree of the potato-soil separation conveyor chain is changed; and the tensioning mechanism is provided on a lower segment of the potato-soil separation conveyor chain; two of the tensioning wheels are located on an inner ring of the potato-soil separation conveyor chain, and two of the tensioning wheels are located on an outer ring of the potato-soil separation conveyor chain; when the tensioning mechanism works, the two of the tensioning wheels are pressed upward from a lower surface of the lower segment of the potato-soil separation conveyor chain, and the two of the tensioning wheels are pressed downward from an upper surface of the lower segment of the potato-soil separation conveyor chain, thereby adjusting an openness of each of the herringbone torsion spring connectors, and adjusting the spacing between adjacent ones of the conveyor chain rods.

In the above solution, the photogate sensor includes a first photogate sensor and a second photogate sensor; the first photogate sensor and the second photogate sensor are respectively provided at two sides of an upper segment of the potato-soil separation conveyor chain; the first photogate sensor and the second photogate sensor each include a laser, a sensor, and a timer; the laser is configured to emit a beam, the sensor is configured to receive the beam, and the timer is configured to calculate time that the conveyor chain rods move to a position between the laser and the sensor for a first time, and the beam is obstructed, namely "off time" t; the timer is further configured to calculate time that the conveyor chain rods move away from the position between the laser and the sensor for a first time, and the beam is unobstructed until being obstructed next time, namely "on time" T; the control unit receives a time signal calculated by the first photogate sensor and the second photogate sensor, and calculates the linear speed v of the potato-soil separation conveyor chain and the spacing l between the adjacent ones of the conveyor chain rods; and the linear speed v of the potato-soil separation conveyor chain is calculated by:

where, d is a diameter of each of the conveyor chain rods; and the spacing l between the adjacent ones of the conveyor chain rods is calculated by:

$$l = v \cdot T.$$

In the above solution, the separation and elevation reversing device includes a first longitudinal flexible conveyor belt, a first transverse flexible conveyor belt, a second longitudinal flexible conveyor belt, an elevation inclined conveyor belt, and a second transverse flexible conveyor belt; a first-stage single-layer potato-stem-soil separating roller, a second-stage double-layer potato-stem-soil separating roller, and a third-stage three-layer potato-stem-soil separating roller are sequentially inclined on the first longitudinal flexible conveyor belt from front to back; the first-stage single-layer potato-stem-soil separating roller, the second-stage double-layer potato-stem-soil separating roller, and the third-stage three-layer potato-stem-soil separating roller are increasingly high in sequence; a gap is provided between double layers of separating rollers in the second-stage double-layer potato-stem-soil separating roller; a gap is provided between three layers of separating rollers in the third-stage three-layer potato-stem-soil separating roller; the first longitudinal flexible conveyor belt is configured to convey the potatoes to the first transverse flexible conveyor belt; the first transverse flexible conveyor belt is configured to convey the potatoes from the first longitudinal flexible conveyor belt to the second longitudinal flexible conveyor belt; the second longitudinal flexible conveyor belt is configured to convey the potatoes from the first transverse flexible conveyor belt to the elevation inclined conveyor belt; the elevation inclined conveyor belt is configured to convey the potatoes from the second longitudinal flexible conveyor belt to the second transverse flexible conveyor belt; and the second transverse flexible conveyor belt is configured to convey the potatoes to the potato collection box. In the above solution, the first-stage single-layer potato-stem-soil separating roller includes a first-stage roller body, first-stage roller mounting seats, first-stage roller mounting slides, a first-stage roller compressed spring, a first-stage roller driven hydraulic motor, a first-stage roller transmission belt pulley, and a first-stage roller transmission belt; two ends of the first-stage roller body are respectively provided on the first-stage roller mounting seats; the first-stage roller mounting seats are respectively connected to the first-stage roller mounting slides to form a sliding pair; the first-stage roller compressed spring is provided on each of the first-stage roller mounting slides; the first-stage roller compressed spring includes one end in contact with an upper inner wall of the each of the first-stage roller mounting slides, and an other end in contact with the first-stage roller body; one end of the first-stage roller body is provided with the first-stage roller transmission belt pulley; the first-stage roller driven hydraulic motor is connected to the first-stage roller transmission belt pulley through the first-stage roller transmission belt, to drive the first-stage roller body to rotate; and a rotating direction of the first-stage roller body is opposite to a conveying direction of a conveyor belt.

In the above solution, the second-stage double-layer potato-stem-soil separating roller includes two second-stage roller bodies, second-stage roller mounting seats, second-stage roller mounting slides, a second-stage roller compressed spring, a second-stage roller driven hydraulic motor, second-stage roller transmission belt pulleys, and a second-stage roller transmission belt; two ends of each of the second-stage roller bodies are respectively provided on the second-stage roller mounting seats; the second-stage roller mounting seats are respectively connected to the second-stage roller mounting slides to form a sliding pair; the two second-stage roller bodies are stacked along a direction of the second-stage roller mounting slides; the second-stage roller compressed spring is provided on each of the second-stage roller mounting slides; the second-stage roller compressed spring includes one end in contact with an upper inner wall of the each of the second-stage roller mounting slides, and an other end in contact with an upper one of the second-stage roller bodies; one end of each of the second-stage roller bodies is provided with one of the second-stage roller transmission belt pulleys; the second-stage roller driven hydraulic motor is connected to one of the second-stage roller transmission belt pulleys through the second-stage roller transmission belt; a diameter of one of the second-stage roller transmission belt pulleys of the upper one of the second-stage roller body in the second-stage double-layer potato-stem-soil separating roller is less than a diameter of one of the second-stage roller transmission belt pulleys of a lower one of the second-stage roller bodies; an upper one and a lower one of the second-stage roller transmission belt pulleys are connected through a transmission belt; the second-stage roller driven hydraulic motor drives the upper one and the lower one of the second-stage roller bodies to rotate; a gap is provided between the two second-stage roller bodies; a rotating direction of the second-stage roller bodies is opposite to the conveying direction of the conveyor belt; and the upper one of the second-stage roller bodies has a rotational speed greater than a rotational speed of the lower one of the second-stage roller bodies.

In the above solution, the third-stage three-layer potato-stem-soil separating roller includes three third-stage roller bodies, third-stage roller mounting seats, third-stage roller mounting slides, a third-stage roller compressed spring, a third-stage roller driven hydraulic motor, third-stage roller transmission belt pulleys, and a third-stage roller transmission belt; two ends of each of the third-stage roller bodies are respectively provided on the third-stage roller mounting seats; the third-stage roller mounting seats are respectively connected to the third-stage roller mounting slides to form a sliding pair; the three third-stage roller bodies are stacked along a direction of the third-stage roller mounting slides; the third-stage roller compressed spring is provided on each of the third-stage roller mounting slides; the third-stage roller compressed spring includes one end in contact with an upper inner wall of the each of the third-stage roller mounting slides, and an other end in contact with an uppermost one of the third-stage roller bodies; one end of each of the third-stage roller bodies is provided with one of the third-stage roller transmission belt pulleys; the third-stage roller driven hydraulic motor is connected to one of the third-stage roller transmission belt pulleys through the third-stage roller transmission belt; diameters of the third-stage roller transmission belt pulleys on the third-stage roller bodies increase sequentially from top to bottom; two adjacent ones of the third-stage roller transmission belt pulleys are connected through a transmission belt; the third-stage roller driven hydraulic motor drives the three third-stage roller bodies to rotate; a gap is provided between the three third-stage roller bodies; a rotating direction of the third-stage roller bodies is opposite to the conveying direction of the conveyor belt; and rotational speeds of the three third-stage roller bodies decrease sequentially from top to bottom;

the third-stage three-layer potato-stem-soil separating roller is provided on the second longitudinal flexible conveyor belt; and the third-stage three-layer potato-stem-soil separating roller is inclined at a front end of the second longitudinal flexible conveyor belt; and the third-stage three-layer potato-stem-soil separating roller is provided on the second transverse flexible conveyor belt; and the third-stage three-layer potato-stem-soil separating roller is inclined at a front end of the second transverse flexible conveyor belt.

In the above solution, a plurality of arc-shaped scraping plates are arranged on the elevation inclined conveyor belt; and the arc-shaped scraping plates each include one end connected to a main body of the conveyor belt, and are configured to support the potatoes and convey the potatoes upward to the second transverse flexible conveyor belt.

In the above solution, the high-efficiency and low-damage potato combine harvester further includes a monitoring device; the monitoring device is configured to capture a potato image before the potatoes enter the potato collection box, and feed the potato image back to the control unit; the control unit recognizes a boundary of a potato body, a boundary of a damage part and a boundary of adhered soil for each of the potatoes according to the potato image, and calculates a damage rate and a soil adhering rate of the potatoes; the damage part includes a mechanical damage part; when recognizing that a mechanical damage rate of the potatoes is greater than a preset value, the control unit feeds data back to an operator, to adjust the digging depth of the digging device; and when recognizing that the soil adhering rate of the potatoes is greater than a preset value, the control unit feeds data back to the operator, to adjust a linear speed and a vibration frequency of the conveyance and separation device of the potato combine harvester.

In the above solution, the control unit performs boundary segmentation through a hue-saturation-value (HSV) color space on the potato image captured by the monitoring device, and performs, according to preset color thresholds for the potato body, the damage part and the adhered soil of the potatoes, colorization and color differentiation on the potato body, the damage part and the adhered soil in the potato image captured by the monitoring device; upon completion of the color differentiation, a soil enclosure, a potato body enclosure, and a damage part enclosure are obtained according to a color distribution and boundaries of different colors, and the damage rate and the soil adhering rate of the potatoes are calculated; the damage rate of the potatoes is calculated with a coordinate block filling method and/or an integral method; and the soil adhering rate of the potatoes is calculated with an integral method.

In the above solution, the high-efficiency and low-damage potato combine harvester further includes a turn-over device; the monitoring device includes a first industrial camera and a second industrial camera; the turn-over device is configured to turn over the potato; the first industrial camera captures an upper surface image of the potatoes and transmits the upper surface image to the control unit; the control unit controls the turn-over device to turn over the potatoes; the second industrial camera captures a lower surface image of the potatoes and transmits the lower surface image to the control unit; and in combination with the upper surface image and the lower surface image of the potatoes, the control unit calculates the damage rate.

In the above solution, the turn-over device includes a motor, an electric cylinder, and a shifting tooth mechanism; the shifting tooth mechanism includes a rotating shaft; a plurality of shifting teeth are provided on the rotating shaft; the motor is connected to an end of the rotating shaft, and configured to drive the rotating shaft to rotate; and the electric cylinder is connected to the motor, and configured to drive the motor, thereby driving the shifting tooth mechanism to move up and down.

In the above solution, the damage rate of the potatoes is an average of a damage rate in the coordinate block filling method and a damage rate in the integral method.

In the above solution, the damage part of the potatoes further includes one or more of an insect hole and a rot; and the damage rate of the potatoes includes a sum of one or more of a damage rate for a mechanical damage, a damage rate for the insect hole, and a damage rate for the rot.

In the above solution, the control unit segments each of the soil enclosure and the potato body enclosure into an upper portion and a lower portion with a coordinate system, and performs function fitting on a boundary line of the upper portion and a boundary line of the lower portion; by integrating a function, an area of the soil enclosure and an area of the potato body enclosure are calculated; the soil adhering rate of the single potato is obtained by subtracting the area of the potato body enclosure from the area of the soil enclosure to obtain a difference and then dividing the difference by the area of the potato body enclosure; a maximum adhering distance for the soil of the potatoes is calculated; in the potato image captured by the monitoring device, by dividing a sum of soil adhering rates for a plurality of the potatoes by a total number of the plurality of the potatoes in the potato image, the soil adhering rate of the potatoes is obtained; when the soil adhering rate of the potatoes is greater than the preset value, the data is fed back to the operator; and in combination with the soil adhering rate of the potatoes and the maximum adhering distance for the soil of the potatoes, the linear speed and the vibration frequency of the conveyance and separation device of the potato combine harvester are adjusted.

In the above solution, the potato collection box includes a box body, a supporting plate, and a plurality of pressure sensors; and the supporting plate is provided in the box body; the plurality of the pressure sensors are configured to monitor pressures of potatoes falling onto the supporting plate in the potato collection box and send the pressures to the control unit; and the control unit receives pressure data from the plurality of the pressure sensors, analyzes a distribution of the potatoes falling onto the supporting plate according to the pressure data, and controls an ascending angle, a descending angle, and an inclination angle of the supporting plate according to the distribution.

In the above solution, the potato collection box further includes a carrier plate, a hydraulic post, a universal joint, and a supporting frame; the supporting plate and the carrier plate are stacked in the box body, and the supporting plate is located on the carrier plate; the plurality of the pressure sensors are provided between the supporting plate and the carrier plate; the plurality of the pressure sensors are configured to monitor the pressures of the potatoes on the supporting plate and sends the pressures to the control unit; the hydraulic post is provided at a bottom of the carrier plate; an upper end of the hydraulic post is connected to a lower surface of the carrier plate through the universal joint; a lower end of the hydraulic post is provided on the supporting frame; the control unit receives the pressure data from the plurality of the pressure sensors, analyzes the distribution of the potatoes on the supporting plate according to the pressure data, and controls a telescopic amount of the hydraulic post, to achieve the ascending, the descending, and the inclination angle of the supporting plate.

Further, a number of the pressure sensors is five; the pressure sensors are arranged on an upper surface of the carrier plate in a 'five-point method', specifically, the pressure sensors are respectively provided at four corners and an intersection between diagonals of the four corners of the carrier plate; and the upper ends of the hydraulic posts are respectively connected to four endpoints of the lower surface of the carrier plate through the universal joints.

In the above solution, the potato collection box further includes an unloading conveyor belt and an unloading hydraulic cylinder; the box body is open on a top, and at a side namely an open side; one end of the unloading conveyor belt is connected to the open side of the box body; the unloading hydraulic cylinder includes one end connected to the box body, and an other end connected to the unloading conveyor belt; and the unloading hydraulic cylinder is configured to realize opening and closing of the unloading conveyor belt and the open side of the box body.

Compared with the prior art, the present disclosure achieves following advantages.

1. The present disclosure can harvest potatoes at the high efficiency and the low damage, and improves harvesting quality of the potatoes.

2. According to an implementation of the present disclosure, compared with a fixed shovel, the reciprocating vibration shovel can effectively cut soil and loosen soil lumps. This effectively reduces a load of the conventional potato harvester in digging and improves a digging efficiency.

3. According to an implementation of the present disclosure, the fixed shovel is made of a nylon material and densely provided with a granularly-protruded lotus-leaf-like hydrophobic structure. While achieving a wear resistance, this prevents adhesion and congestion of moist soil on the shovel surface. The arc-shaped shovel tip of the fixed shovel prevents breakage to skins of the potatoes. Meanwhile, with a replaceable structure of the fixed shovel, the shovel surface can be replaced quickly after worn. This lowers a maintenance cost and makes the device more durable.

4. According to an implementation of the present disclosure, hard chromium plating is used on the surface of the movable shovel, and the shovel tip is shaped as an involute gear tooth provided with cutting edges. While achieving a desirable wear resistance, this can quickly cut the soil at a low resistance. The movable shovel blade is fixed with a movable shovel supporting seat plate through a rivet to form a whole, and replaced with a movable shovel supporting plate after worn. Therefore, the structure is firm and the maintenance is easy.

5. According to an implementation of the present disclosure, the vibrating sieve behind the digging shovel performs preliminary separation on the potato-soil mixture before the mixture enters the conveyance device. This can reduce a workload of the conveyance and separation device of the potato harvester to some extent, and prevent congestion between the soil and the potatoes on the conveyor chain to squeeze and damage the potatoes. Under an action of the drive device, the vibrating sieve and the movable shovel have a same vibration frequency and a phase difference of 180°, thereby effectively relieving vibration of the digging device.

6. According to an implementation of the present disclosure, with the digging depth and penetrating angle adjusting device, the present disclosure can effectively make the digging device more adaptable for different working environments. It uses different penetrating angles for different soil properties to reduce the digging resistance, and uses different digging depths for different varieties and planting modes of the potatoes to prevent potato damage and leakage phenomena in digging.

7. According to an implementation of the present disclosure, through components such as the potato-soil separation conveyor chain, the potato-stem separation conveyor chain, the elastic open-close scraping teeth, and the tensioning mechanism, the present disclosure greatly improves potato-soil separation and potato-stem separation efficiencies.

8. According to an implementation of the present disclosure, through the flexible net-like potato potato-stem separation conveyor chain and the multi-stage elastic open-close scraping tooth mechanism, and under an action of staggered structures formed by the elastic open-close scraping teeth and the finger-like flexible protruding contacts on the transverse rubber rod, the present disclosure reduces a breakage rate of the potatoes in potato-stem separation, and improves potato-stem separation efficiency and quality.

9. According to an implementation of the present disclosure, the rod spacing is adjusted through the tensioning mechanism. In an environment with moist and adhesive soil, the rod spacing can be increased to accelerate a soil screening speed. This effectively reduces congestion of the soil and potato mixture in real-time conveyance and separation, and improves separation efficiency and performance.

10. According to an implementation of the present disclosure, the photogate sensor detects a time signal that a beam is obstructed by the conveyor chain rods of the potato-soil separation conveyor chain. The time signal includes an "off time" and an "on time" and is transmitted to the control unit. The control unit calculates a linear speed v of the potato-soil separation conveyor chain and a spacing l between adjacent ones of the conveyor chain rods.

11. According to an implementation of the present disclosure, the image acquisition device acquires an image of a potato-soil mixture on the potato-soil separation conveyor chain and transmits the image to the control unit, such that an operator adjusts the linear speed v of the potato-soil separation conveyor chain according to a congestion condition displayed by the image. This makes an operator of the potato combine harvester control separation and congestion conditions of the potato-soil mixture on the separation conveyor chain in real time, thereby adjusting the linear speed of the potato-soil separation conveyor chain, the rod spacing and other working parameters, improving working performance of the conveyance and separation device, and yielding a higher working efficiency of the potato combine harvester.

12. According to an implementation of the present disclosure, the present disclosure not only improves potato-soil separation and potato-stem separation effects, and reduces the breakage rate of the potatoes, but also lowers the congestion in potato conveyance and separation, and yields a higher harvesting efficiency of the potato combine harvester overall.

13. According to an implementation of the present disclosure, the separating rollers of the separation and elevation reversing device are inclined on the longitudinal flexible conveyor belt, and can change a conveyance direction of the potatoes. Through friction between the rollers as well as between the roller and the conveyor belt, soil adhered on the potatoes can be crushed, and the potatoes are separated from connected stems. The multiple stages of the separating rollers on the first longitudinal flexible conveyor belt are increasingly higher from front to back. This can shunt a large flow of the potatoes to prevent damage and squeezing on the potatoes.

14. According to an implementation of the present disclosure, with a separating roller compressed spring in the separation and elevation reversing device, the separating roller moving downward for a large flow of the potatoes, a large soil lump and a large connecting force between the potatoes and the stems in actual operation can be elevated through an elevating roller mounting seat, the separating roller that moves downward is buffered, and the separating roller does not move downward all the time to damage the device.

15. According to an implementation of the present disclosure, the arc-shaped scraping plates in the separation and elevation reversing device are provided on the elevation inclined conveyor belt, and configured to support the upward conveyed potatoes. This prevents the potatoes from falling off to cause a damage in conveyance. With a certain inclination angle between the elevation inclined conveyor belt and the second longitudinal flexible conveyor belt, while the conveying direction of the potatoes can be changed, the potato combine harvester has a smaller footprint and more devices can be provided on the potato combine harvester.

16. According to an implementation of the present disclosure, the second longitudinal flexible conveyor belt and the second transverse flexible conveyor belt in the separation and elevation reversing device each are provided thereon with the third-stage three-layer potato-stem-soil separating roller. The third-stage three-layer potato-stem-soil separating roller is provided at a front end in the conveying direction of the conveyor belt. Through an interaction between the rollers, not only can soil on the potatoes be shaken off, but also the potatoes do not fall off for a large flow.

17. According to an implementation of the present disclosure, the monitoring device extracts information of the potato image based on machine vision, and transmits the information to the control unit. According to the potato image, the control unit recognizes a boundary of a potato body, a boundary of a damage part and a boundary of adhered soil for each of the potatoes, and calculates a damage rate and a soil adhering rate of the potato. In combination with a maximum adhering distance of the potato, working parameters in potato-soil separation are adjusted to improve harvesting quality and efficiency.

18. According to an implementation of the present disclosure, boundary segmentation is performed through an HSV color space. According to preset color thresholds for the potato body, the damage part and the adhered soil of the potato, colorization and color differentiation are performed on the potato body, the damage part and the adhered soil in the potato image captured by the monitoring device. Upon completion of the color differentiation, a soil enclosure, a potato body enclosure, and a damage part enclosure are obtained according to a color distribution and boundaries of different colors, and the damage rate and the soil adhering rate of the potato are calculated. The damage rate of the potato is calculated with a coordinate block filling method and/or an integral method. The soil adhering rate of the potato is calculated with an integral method. For the sake of a more accurate damage rate, the damage rate of the potato is an average of a damage rate in the coordinate block filling method and a damage rate in the integral method. The damage rate can be displayed in a display device. Therefore, the operator can know the damage condition of the potatoes in real time, and timely adjust relevant working parameters to reduce an economic loss.

19. According to an implementation of the present disclosure, the damage part includes a mechanical damage part. When recognizing that a total mechanical damage rate of the potato is greater than a preset value, the control unit feeds data back to an operator, to adjust the digging depth of the digging device, and reducing the mechanical damage rate of the potato in harvesting.

20. According to an implementation of the present disclosure, the damage part of the potato further includes one or more of an insect hole and a rot. The damage rate of the single potato includes a sum of one or more of a damage rate for the mechanical damage, a damage rate for the insect hole, and a damage rate for the rot. The control unit calculates a total damage rate for the mechanical damage, the insect hole and the rot. Therefore, not only the damage rate of the mechanical damage for the potato, but also the damage rate of the insect hole and the damage rate of the rot for the potato, can be known, thereby knowing a quality of the potatoes to provide a reference for next planting. For example, a high rate of the insect hole can make farmers know whether a dosage of an insecticide is to be increased in next year. The detection on the whole damage rate can further facilitate subsequent prediction on application of the potatoes. The potatoes with a high total damage rate can be used to prepare industrial starch. The potatoes with a low total damage rate can be used to prepare food.

21. According to an implementation of the present disclosure, information of the potato image is extracted through machine vision. After the potato boundary and the surface adhered soil are recognized, a soil adhering rate is calculated with the integral method. When recognizing that the soil adhering rate of the potato is greater than a preset value, the control unit feeds data back to the operator. In combination with the soil adhering rate of the potato and the maximum adhering distance for the soil of the potato, the linear speed and vibration frequency of the conveyance and separation device of the potato combine harvester are adjusted, thereby reducing the adhered soil on the potatoes, and improving the harvesting efficiency and harvesting quality.

22. According to an implementation of the present disclosure, the electric cylinder and the motor of the turn-over device drive the shifting tooth mechanism to turn over the potato, to photograph the damage part on the upper and lower surfaces of the potato. The control unit calculates the damage rate in combination with images for the upper and lower surfaces of the potato. This makes the damage rate detected more accurately, and solves the problem of a conventional method that can only detect a single surface.

23. According to an implementation of the present disclosure, in an initial state of the potato collection box, the supporting plate has a small vertical distance relative to a potato falling position. With an increase in a piling amount of the potatoes, the position of the supporting plate is lowered adaptively, such that the potatoes falling into the box body do not fall off to cause a damage due to a large falling height. Meanwhile, the potato collection box can adjust an inclined state of the supporting plate according to a pressure distribution of the potato pile on the supporting plate. Therefore, the potatoes are piled uniformly in the box body, and are not leaked due to an uneven height of the upper surface of the potato pile.

24. According to an implementation of the present disclosure, in a potato unloading process of the potato collection box, the unloading conveyor belt is laid flat to form a potato unloading port. The supporting plate is inclined toward the potato unloading port to form a certain slope. This improves a potato unloading efficiency.

It is to be noted that these effects are not conflicted with other effects. In various implementations of the present disclosure, all of the above effects are unnecessarily achieved. Other effects can be obtained apparently from the description, drawings, claims and so on.

DESCRIPTION OF THE EMBODIMENTS

Figure 1:
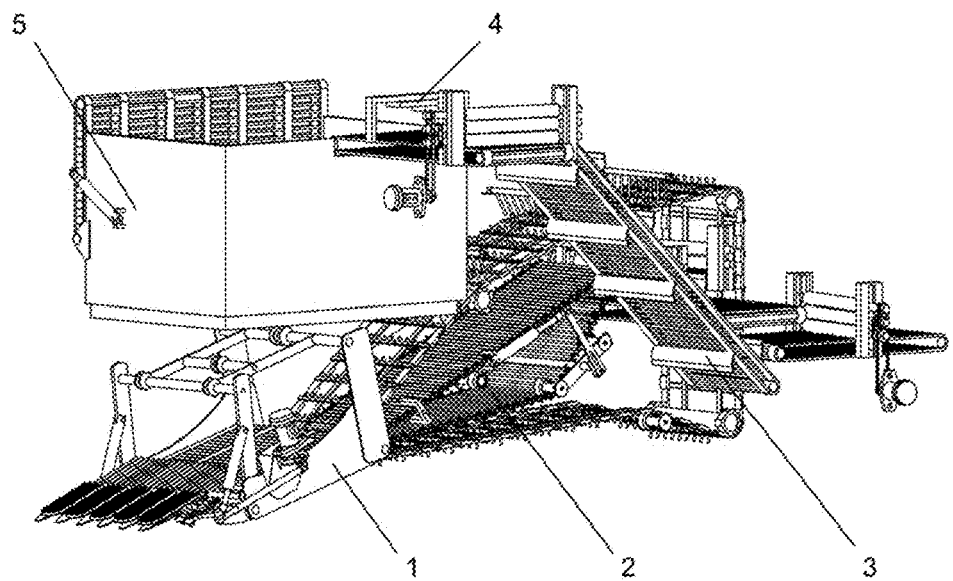
FIG. 1 is a partial schematic structural view of a high-efficiency and low-damage potato combine harvester according to an implementation of the present disclosure.
Figure 2:
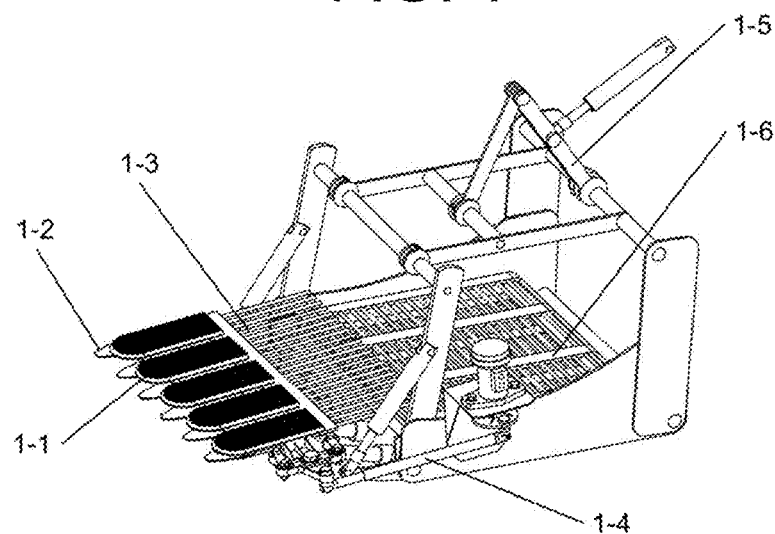
FIG. 2 is a schematic structural view of a digging device according to an implementation of the present disclosure.

The embodiments of the present disclosure are described below in detail. Examples of the embodiments are shown in the drawings. The same or similar numerals represent the same or similar elements or elements having the same or similar functions throughout the specification. The embodiments described below with reference to the accompanying drawings are exemplary, and are intended to explain the present disclosure but should not be construed as a limitation to the present disclosure.

It should be understood that, in the description of the present disclosure, the terms such as "central". "longitudinal". "transverse". "length". "width". "thickness", "front". "rear". "left". "right". "upper". "lower". "axial", "radial", "vertical". "horizontal". "inner", and "outer" are intended to indicate orientations or positional relations shown in the drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure. In addition, the terms "first" and "second" are merely intended for a purpose of description, and shall not be understood as an indication or implication of relative importance or implicit indication of a quantity of indicated technical features. Thus, features defined with "first" and "second" may explicitly or implicitly include one or more of the features. In the description of the present disclosure. "a plurality of" means two or more, unless otherwise specifically defined. In the present disclosure, unless otherwise clearly specified and defined, meanings of terms "install", "connect with", "connect to" and "fixed to" should be understood in a broad sense. For example, the connection may be a fixed connection, a removable connection, or an integral connection; may be a mechanical connection or an electrical connection; may be a direct connection or an indirect connection via a medium; or may be intercommunication between two components. Those of ordinary skill in the art may understand specific meanings of the above terms in the present disclosure based on a specific situation.

FIG. 1 illustrates a preferred implementation of a high-efficiency and low-damage potato combine harvester. The high-efficiency and low-damage potato combine harvester includes a digging device 1, a conveyance and separation device 2, a separation and elevation reversing device 3, and a potato collection box 5.

The digging device 1 is provided at a front end of the potato combine harvester, and configured to dig mature potatoes from a ridge. The conveyance and separation device 2 is provided behind the digging device 1, and configured to perform preliminary conveyance and separation on a potato-soil-stem mixture dug by the digging device 1. A main body structure of the separation and elevation reversing device 3 is provided at a side of the conveyance and separation device 2. The separation and elevation reversing device 3 is a double-layer spatial rotating structure composed of multiple stages of reversing rollers and separation conveyor chain, and is configured to further separate the potato-soil-stem mixture from the conveyance and separation device 2 and elevate the potatoes to the potato collection box 5. The potato collection box 5 is located below a tail segment of the separation conveyor chain of the separation and elevation reversing device 3, and configured to load the potatoes and feed weight information of the carried potatoes back to a control unit. The control unit controls an ascending angle, a descending angle, and an inclination angle of a potato carrying part of the potato collection box 5 according to a weight of the carried potatoes.

Referring to FIG. 2 to FIG. 13, the digging device includes a digging shovel, a vibrating sieve 1-3, a drive device 1-4, an adjusting device 1-5, and a transitional conveyor chain 1-6.

Figure 3:
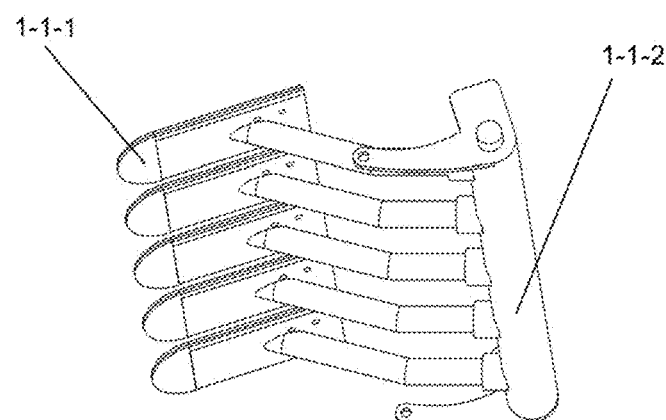
FIG. 3 is a schematic structural view of an upper fixed shovel according to an implementation of the present disclosure.
Figure 4:
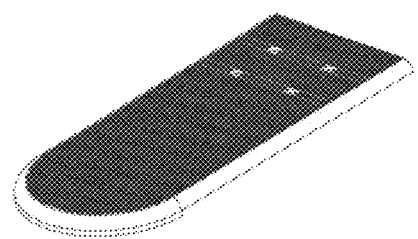
FIG. 4 is a schematic structural view of a nylon shovel surface according to an implementation of the present disclosure.

Referring to FIG. 3 and FIG. 4, the digging shovel includes an upper fixed shovel 1-1 and a lower movable shovel 1-2. The upper fixed shovel 1-1 is provided on the lower movable shovel 1-2. The upper fixed shovel 1-1 and the lower movable shovel 1-2 are stacked in a staggered manner. A shovel tip of the lower movable shovel 1-2 extends to a front of a shovel tip of the upper fixed shovel 1-1. Circular microprotrusion structures are densely arranged on a shovel surface of the upper fixed shovel 1-1. The vibrating sieve 1-3 is provided between the digging device 1 and the transitional conveyor chain 1-6. The vibrating sieve 1-3 is connected to the drive device 1-4. The drive device 1-4 is further configured to drive the vibrating sieve 1-3 to vibrate in a reciprocating manner. The drive device 1-4 is provided at a side of the digging shovel, connected to the lower movable shovel 1-2 and the vibrating sieve 1-3, and configured to drive the lower movable shovel 1-2 and the vibrating sieve 1-3 to vibrate in a reciprocating manner. The adjusting device 1-5 is provided on a potato harvester frame. The adjusting device 1-5 is connected to the digging shovel, and configured to adjust a digging depth and a penetrating angle. The transitional conveyor chain 1-6 is provided behind the digging shovel.

In an implementation of the present disclosure, the upper fixed shovel 1-1 includes a nylon shovel surface 1-1-1 and a fixed shovel supporting device 1-1-2. The nylon shovel surface 1-1-1 is provided on the fixed shovel supporting device 1-1-2. The circular microprotrusion structures are densely arranged on the nylon shovel surface 1-1-1. The densely arranged circular microprotrusion structures each are a lotus-leaf-like hydrophobic structure. The lotus-leaf-like hydrophobic structure is obtained by a manner of sintering nylon with laser. Preferably, in a specific implementation of the present disclosure, the densely arranged circular microprotrusion structures having a diameter of 0.5 mm are obtained by a manner of sintering the nylon with selective laser sintering (SLS) and by three-dimensional (3D printing), so as not to adhere fine soil particles, and cause congestion of soil on the shovel surface.

In an implementation of the present disclosure, the nylon shovel surface 1-1-1 has an arc-shaped shovel tip, to prevent adhesion of the soil on the shovel surface and breakage of the potatoes. Preferably, four counter bores are formed in an upper surface of the nylon shovel surface 1-1-1. A side of a lower surface of the nylon shovel surface close to the shovel tip is a stepped protrusion structure.

Figure 5:
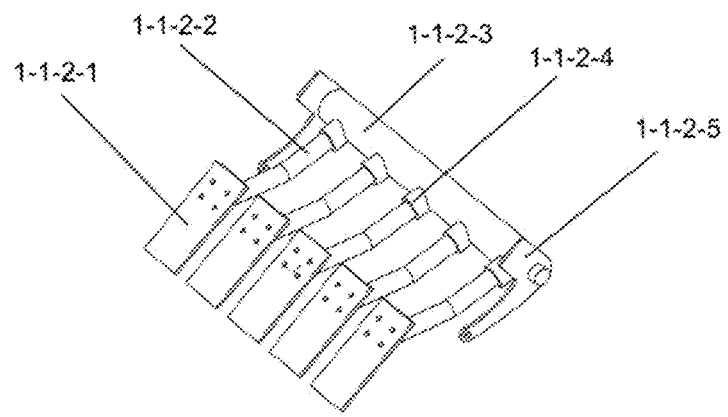
FIG. 5 is a schematic structural view of a fixed shovel supporting device according to an implementation of the present disclosure.

Referring to FIG. 5, according to the embodiment, preferably, the fixed shovel supporting device 1-1-2 includes a fixed shovel supporting plate 1-1-2-1, a supporting arm 1-1-2-2, a rotary shaft 1-1-2-3, and an angle adjusting plate 1-1-2-5. The nylon shovel surface 1-1-1 is provided on the fixed shovel supporting plate 1-1-2-1. The fixed shovel supporting plate 1-1-2-1 is connected to one end of the supporting arm 1-1-2-2. An other end of the supporting arm 1-1-2-2 is connected to the rotary shaft 1-1-2-3. Two ends of the rotary shaft 1-1-2-3 are provided on the adjusting device 1-5. The angle adjusting plate 1-1-2-5 includes one end connected to the rotary shaft 1-1-2-3, and an other end connected to the adjusting device 1-5.

Preferably, in a specific implementation of the present disclosure, the fixed shovel supporting plate 1-1-2-1 has a width same as a width of the nylon shovel surface 1-1-1, a length obtained by subtracting a length of the stepped protrusion structure from a total length of the nylon shovel surface 1-1, and a thickness same as a height of the stepped protrusion of the nylon shovel surface 1-1-1. Four through holes are formed in an upper surface of the fixed shovel supporting plate 1-1-2-1. The four through holes have a same geometric distribution as the four counter bores in the nylon shovel surface 1-1-1, to ensure that the through holes are aligned, and bolts passing through the through holes are cooperated with nuts to fix the nylon shovel surface 1-1-1 and the fixed shovel supporting plate 1-1-2-1 conveniently. In installation, a front end surface of the fixed shovel supporting plate 1-1-2-1 is attached to a stepped protrusion surface of the nylon shovel surface 1-1-1. The four through holes are aligned to the four counter bores. The nylon shovel surface 1-1-1 and the fixed shovel supporting plate 1-1-2-1 are fixed through the bolts to form a whole. After installation, a bolt head is lower than a step of each counter bore in the upper surface of the nylon shovel surface 1-1-1, such that the nylon shovel surface 1-1-1 is flat. Meanwhile, with the stepped structure, a forward supporting force can be provided for the nylon shovel surface 1-1-1 to offset a friction force in soil digging. This prevents the nylon shovel surface 1-1-1 from falling due to an unbalanced force. The supporting arm 1-1-2-2 is a solid curved cylindrical structure, with a diameter same as an inner diameter of a connecting sleeve 1-1-2-4. The supporting arm is connected in transition fit. One end of the supporting arm 1-1-2-2 is a beveled surface. This end is preferably welded with a lower surface of the fixed shovel supporting plate 1-1-2-1. An other end of the supporting arm 1-1-2-2 is a truncated surface. The rotary shaft 1-1-2-3 is a solid stepped shaft structure, with a smaller diameter for shaft heads at two ends, and a larger diameter for a middle shaft body. A plurality of counter bores are formed axially and equidistantly in a surface of the middle shaft body. A center distance between adjacent counter bores is the same as a spacing between adjacent fixed shovel supporting plates 1-1-2-1. A diameter of each counter bore is the same as an outer diameter of the connecting sleeve 1-1-2-4. A depth of the counter bore is ½ of a length of the connecting sleeve 1-1-2-4. The connecting sleeve 1-1-2-4 is a short tubular structure. In welded installation, the connecting sleeve 1-1-2-4 is welded to the truncated surface of the supporting arm 1-1-2-2. The supporting arm 1-1-2-2 is inserted into the counter bore in the shaft body of the rotary shaft 1-1-2-3 together with the connecting sleeve 1-1-2-4. An intersecting line formed by the rotary shaft 1-1-2-3 and the connecting sleeve 1-1-2-4 is welded fully to make connection more stable. All support arms 1-1-2-2 have a same direction in welding. Through holes are respectively formed in two ends of the angle adjusting plate 1-1-2-5. A diameter of a larger one of the through holes is a same as a diameter of the shaft head of the rotary shaft 1-1-2-3. In installation, the angle adjusting plate 1-1-2-5 is sleeved on the shaft head of the rotary shaft 1-1-2-3 through the through hole. A smaller one of the through holes at an other end of the angle adjusting plate 1-1-2-5 is hinged with an angle adjusting hydraulic cylinder 1-5-9.

Figure 6:
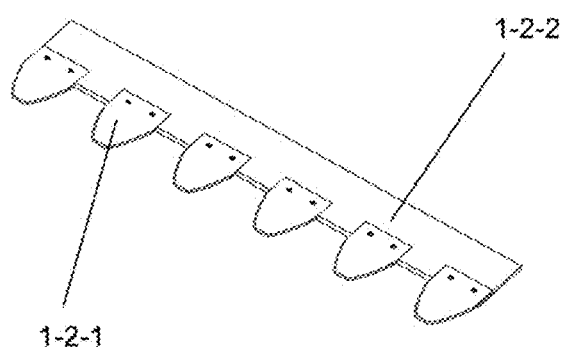
FIG. 6 is a schematic structural view of a lower movable shovel according to an implementation of the present disclosure.
Figure 7:
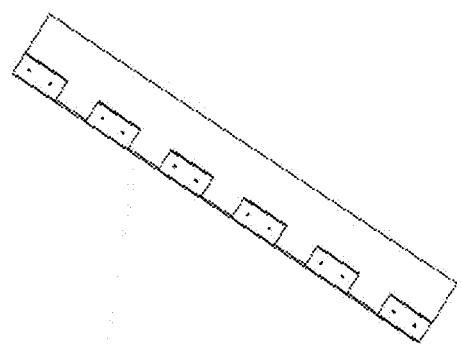
FIG. 7 is a schematic structural view of a movable shovel supporting seat plate according to an implementation of the present disclosure.

Referring to FIG. 6 and FIG. 7, in an implementation of the present disclosure, a shovel tip of a movable shovel blade 1-2-1 of the lower movable shovel 1-2 is shaped as a gear tooth having two involutes crossed and a tip end cut. The involutes at two sides of the shovel tip are respectively provided with cutting edges, thereby reducing a resistance when the movable shovel blade 1-2-1 cut the soil.

Preferably, in a specific implementation of the present disclosure, the movable shovel blade 1-2-1 is made of a stainless steel material with a high surface smoothness. A chromium plated layer with a thickness of at least 20 μm is provided on a surface of the movable shovel blade 1-2-1 by hard chromium plating, to make the movable shovel blade 1-2-1 more wearable. Two counter bores are formed in an upper surface of the movable shovel blade 1-2-1 in a shovel width direction. A movable shovel supporting seat plate 1-2-2 is made of a metal material. Stepped groove structures as wide as the movable shovel blade 1-2-1 are uniformly distributed at a long side of the movable shovel supporting seat plate. Two through holes are formed in each groove structure along a long side direction of the movable shovel supporting seat plate 1-2-2. The two through holes have a same geometric distribution as the two counter bores in the movable shovel blade 1-2-1. In installation, the movable shovel blade 1-2-1 is embedded into the groove structure of the movable shovel supporting seat plate 1-2-2. The counter bores are aligned to the through holes in one-to-one correspondence. The movable shovel blade 1-2-1 and the movable shovel supporting seat plate 1-2-2 are fixedly connected through rivets to form a whole. After installation, a rivet head is lower than a step in each counter bore in the upper surface of the movable shovel blade 1-2-1, thereby ensuring that the upper surface of the movable shovel blade 1-2-1 is flat.

Figure 8:
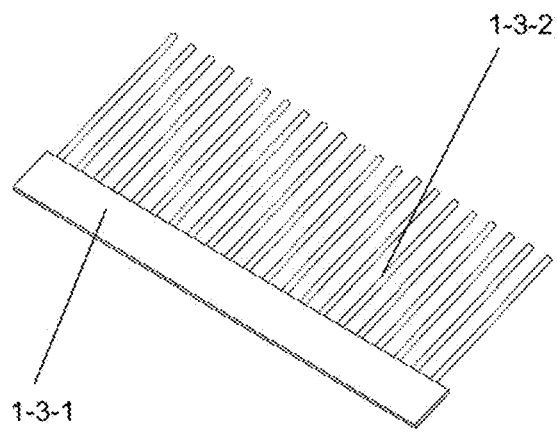
FIG. 8 is a schematic structural view of a vibrating sieve according to an implementation of the present disclosure.

Referring to FIG. 8, according to the embodiment, preferably, in a specific implementation of the present disclosure, sieve bars 1-3-2 preferably have a diameter of 10 mm to 15 mm and a center distance of 40 mm to 50 mm according to different soil textures and potato varieties, and are uniformly welded in a width direction of a sieve bar welding plate 1-3-1.

Figure 9:
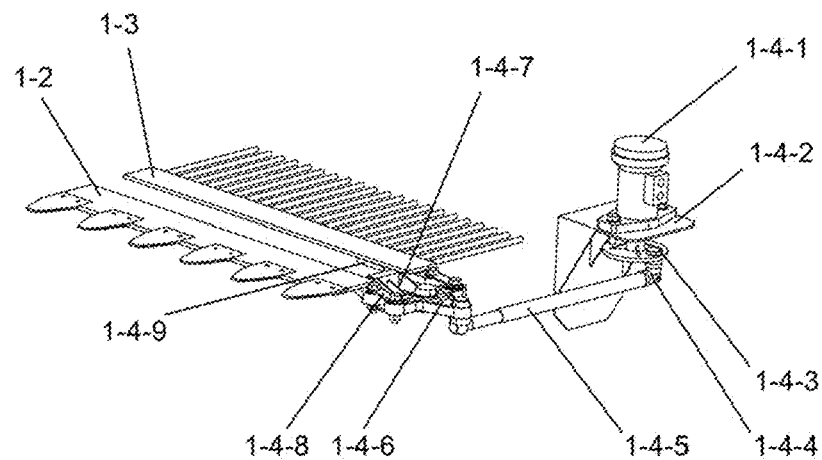
FIG. 9 is a schematic structural view of a drive device according to an implementation of the present disclosure.
Figure 10:
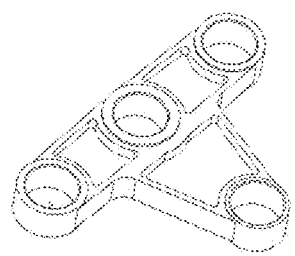
FIG. 10 is a schematic structural view of a drive plate according to an implementation of the present disclosure.
Figure 11:
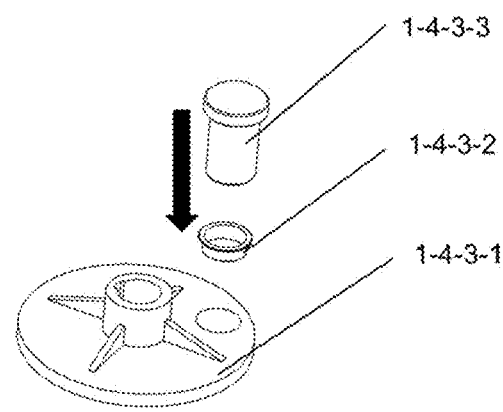
FIG. 11 is a schematic structural view of a bidirectional oscillating rod according to an implementation of the present disclosure.

Referring to FIG. 9. FIG. 10 and FIG. 11, in an implementation of the present disclosure, preferably, the drive device 1-4 includes a hydraulic motor 1-4-1, a hydraulic motor fixing seat 1-4-2, a drive plate 1-4-3, a universal coupler 1-4-4, an oscillating shaft 1-4-5, a bidirectional oscillating rod 1-4-6, an oscillating rod fixing seat 1-4-7, a driving force connecting plate 1-4-8, and a driving force connecting seat 1-4-9. The hydraulic motor 1-4-1 is connected to the hydraulic motor fixing seat 1-4-2 through a bolt. The hydraulic motor fixing seat 1-4-2 is welded on a second side plate 1-5-7. A shaft end of the hydraulic motor 1-4-1 is connected to a central hole of the drive plate 1-4-3. The drive plate 1-4-3 is composed of a plate body 1-4-3-1, a sliding shaft sleeve 1-4-3-2, and a short shaft 1-4-3-3. A through hole is formed in an edge of the plate body 1-4-3-1. The sliding shaft sleeve 1-4-3-2 is provided in the through hole. The short shaft 1-4-3-3 is a two-segment stepped shaft structure. In the short shaft, an upper shaft body is short, with a diameter greater than a diameter of the through hole in the edge of the plate body 1-4-3-1 and an inner diameter of the sliding shaft sleeve 1-4-3-2, and is configured to locate the short shaft 1-4-3-3. A lower shaft body is long, with a diameter slightly less than the inner diameter of the sliding shaft sleeve 1-4-3-2, and is in clearance fit with the sliding shaft sleeve. The lower shaft body of the short shaft 1-4-3-3 is connected to one end of the universal coupler 1-4-4 thereunder through the sliding shaft sleeve 1-4-3-2. An other end of the universal coupler 1-4-4 is connected to the oscillating shaft 1-4-5, such that an angle of the oscillating shaft 1-4-5 relative to ground changes with the penetrating angle of the digging shovel, and a power can be transferred normally all the time. An other end of the oscillating shaft 1-4-5 is hinged with the bidirectional oscillating rod 1-4-6. The bidirectional oscillating rod 1-4-6 is "T"-shaped, and is provided with three oscillating arms around an oscillation center. The oscillation center is hinged with one end of the oscillating rod fixing seat 1-4-7 to form a rotation pair. An other end of the oscillating rod fixing seat 1-4-7 is welded with a lower surface of the fixed shovel supporting plate 1-1-2-1 close to the drive device. This ensures that the oscillation center of the bidirectional oscillating rod 1-4-6 is unchanged relative to the upper fixed shovel 1-1. The bidirectional oscillating rod 1-4-6 drives one of the oscillating arms to hinge with one end of the oscillating shaft 1-4-5. The other two of the oscillating arms are axial-symmetrically distributed with respect to a connecting line for a central oscillating hole and a center of an oscillating arm driving hinge hole of the bidirectional oscillating rod 1-4-6, and are hinged to one end of the driving force connecting plate 1-4-8. An other end of the driving force connecting plate 1-4-8 is hinged with the driving force connecting seat 1-4-9. A plurality of plug welding holes are formed in a bottom plate of the driving force connecting seat 1-4-9. Through the plug welding holes, the driving force connecting seat 1-4-9 is connected to the movable shovel supporting seat plate 1-2-2 and a side end of a lower surface of the sieve bar welding plate 1-3-1.

As shown in FIG. 9, when the drive device 1-4 works, the hydraulic motor 1-4-1 provides a power for rotation of the drive plate 1-4-3. The drive plate 1-4-3 is connected to the oscillating shaft 1-4-5 through the universal coupler 1-4-4 to form an oscillating rod mechanism. The oscillating shaft 1-4-5 transfers the power to the bidirectional oscillating rod 1-4-6 to drive the oscillating arms, such that the oscillating arms oscillate around the oscillation center in a reciprocating manner. Two symmetrical oscillating arms of the bidirectional oscillating rod 1-4-6 drive the lower movable shovel 1-2 and the vibrating sieve 1-3 through the driving force connecting plate 1-4-8 and the driving force connecting seat 1-4-9 to cause a reciprocating motion at a same amplitude, a same frequency and a phase difference of 180°.

Figure 12:
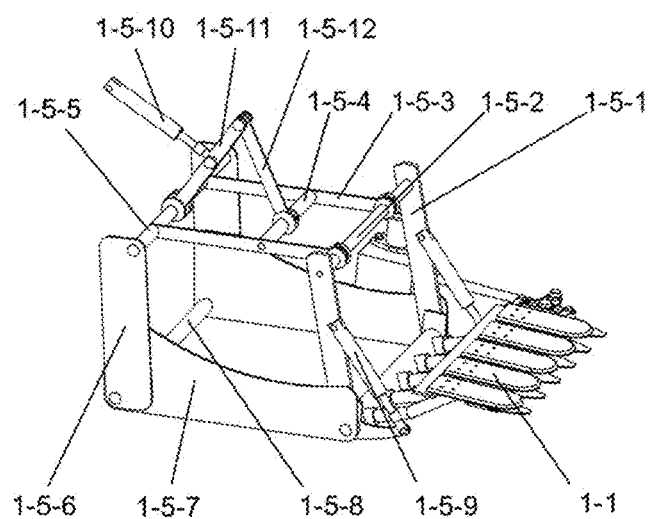
FIG. 12 is a schematic structural view of a digging depth and penetrating angle adjusting device according to an implementation of the present disclosure.

Referring to FIG. 12, preferably, the adjusting device 1-5 is a digging depth and penetrating angle adjusting device, and includes parallel four-rod mechanisms, a depth adjusting mechanism, and an angle adjusting mechanism. The depth adjusting mechanism includes one side connected to the potato harvester frame, and the other side connected to an upper portion of the parallel four-rod mechanism. The upper fixed shovel 1-1 is provided at a front end of the parallel four-rod mechanism. A rear end of the parallel four-rod mechanism is connected to the potato harvester frame. The depth adjusting mechanism is configured to adjust an inclination angle of the parallel four-rod mechanism relative to ground, thereby adjusting the digging depth of the digging shovel. The angle adjusting mechanism includes one end connected to the front end of the parallel four-rod mechanism, and an other end connected to the upper fixed shovel 1-1. The angle adjusting mechanism is configured to adjust an inclination angle of the upper fixed shovel 1-1 relative to the ground, thereby adjusting the penetrating angle of the digging shovel.

A number of the parallel four-rod mechanisms is two, and the parallel four-rod mechanisms are respectively symmetrically provided at two sides of the depth adjusting mechanism. The parallel four-rod mechanisms each include front connecting rods 1-5-1, upper connecting rods 1-5-3, first side plates 1-5-6, and second side plates 1-5-7. One end of each of the front connecting rods 1-5-1 is connected to one end of one of the upper connecting rods 1-5-3. An other end of the one of the upper connecting rods 1-5-3 is connected to one end of one of the first side plates 1-5-6. An other end of the one of the first side plates 1-5-6 is connected to one end of one of the second side plates 1-5-7. An other end of the one of the second side plates 1-5-7 is connected to another end of the each of the front connecting rods 1-5-1. Upper portions of two of the front connecting rods 1-5-1 are connected through a first beam 1-5-2. Two of the upper connecting rods 1-5-3 are connected through a second beam 1-5-4. Upper portions of two of the first side plates 1-5-6 are connected through a third beam 1-5-5. Lower portions of the two of the first side plates 1-5-6 are connected through a fourth beam 1-5-8.

The depth adjusting mechanism includes a digging depth adjusting hydraulic cylinder 1-5-10, a first depth adjusting rod 1-5-11, and a second depth adjusting rod 1-5-12. The digging depth adjusting hydraulic cylinder 1-5-10 includes one end connected to the potato harvester frame, and an other end connected to the first depth adjusting rod 1-5-11. The first depth adjusting rod 1-5-11 includes one end connected to a third beam 1-5-5, and an other end connected to one end of the second depth adjusting rod 1-5-12. An other end of the second depth adjusting rod 1-5-12 is connected to a second beam 1-5-4.

The angle adjusting mechanism includes angle adjusting hydraulic cylinders 1-5-9. The angle adjusting hydraulic cylinders 1-5-9 each include one end connected to one end of each of front connecting rods 1-5-1, and an other end connected to the upper fixed shovel 1-1.

The front connecting rods 1-5-1, the upper connecting rods 1-5-3, the first side plates 1-5-6, the second side plates 1-5-7 and the angle adjusting hydraulic cylinders 1-5-9 are all symmetrically provided in pairs with respect to a central axis of the digging device.

Preferably, in a specific implementation of the present disclosure, the first beam 1-5-2, the second beam 1-5-4, the third beam 1-5-5 and the fourth beam 1-5-8 are a stepped shaft, which has a smaller diameter for shaft heads at two ends, and a larger diameter for a middle shaft body. Two axial locating grooves are symmetrically formed with respect to a section at ½ of a length of the middle shaft body of the first beam 1-5-2. An axial locating groove is formed in a position at ½ of a length of the middle shaft body of each of the second beam 1-5-4 and the third beam 1-5-5. The first side plate 1-5-6 may be fixedly connected to the potato harvester frame by welding. Shaft heads at two ends of the first beam 1-5-2 each pass through an opening in the upper end of the front connecting rod 1-5-1 to form a rotation pair. A split sliding shaft sleeve is welded at one end of the upper connecting rod 1-5-3, and hinged with each of the axial locating grooves in the first beam 1-5-2 to form a rotation pair. An other end of the upper connecting rod 1-5-3 is welded with the middle shaft body of the third beam 1-5-5. Shaft heads at two ends of the second beam 1-5-4 each pass through a middle opening of the upper connecting rod 1-5-3 and are welded. Shaft heads at two ends of the third beam 1-5-5 each pass through an opening in an upper end of the first side plate 1-5-6 to form a rotation pair. An opening in a lower end of the first side plate 1-5-6, an opening in a rear end of the second side plate 1-5-7 and the fourth beam 1-5-8 are concentric. Shaft heads at two ends of the fourth beam 1-5-8 each pass through the opening in the lower end of the first side plate 1-5-6 and the opening in the rear end of the second side plate 1-5-7 to form a rotation pair. An opening in a front end of the second side plate 1-5-7, an opening in a lower end of the front connecting rod 1-5-1, and a rotary shaft 1-1-2-3 of the fixed shovel supporting device 1-1-2 are concentric. Shaft heads at two ends of the rotary shaft 1-1-2-3 each pass through the opening in the front end of the second side plate 1-5-7 and the opening in the lower end of the front connecting rod 1-5-1 to form a rotation pair. The angle adjusting hydraulic cylinder 1-5-9 includes one end hinged with the angle adjusting plate 1-1-2-5, and an other end connected to the front connecting rod through a through hole in a middle of the front connecting rod 1-5-1. A split sliding shaft sleeve is provided at one end of the first depth adjusting rod 1-5-11, and hinged with the axial locating groove in the second beam 1-5-4 to form a rotation pair. An other end of the first depth adjusting rod 1-5-11 is hinged with one end of the second depth adjusting rod 1-5-12. A split sliding shaft sleeve is also welded at an other end of the second depth adjusting rod 1-5-12, and hinged with the axial locating groove of the third beam 1-5-5 to form a rotation pair. The digging depth adjusting hydraulic cylinder 1-5-10 includes one end hinged with the second depth adjusting rod through a through hole in a middle of the second depth adjusting rod 1-5-12, and an other end hinged to the potato harvester frame.

Figure 13:
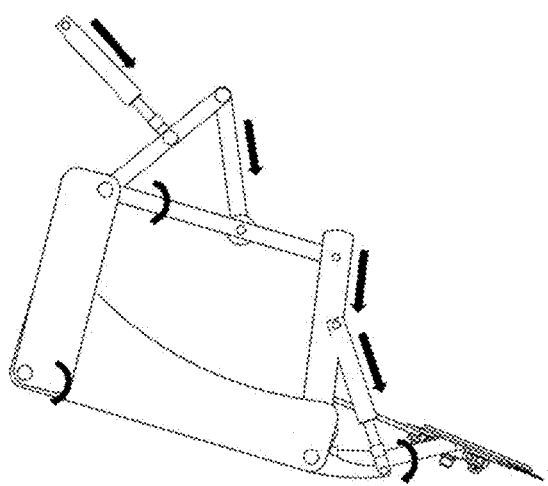
FIG. 13 illustrates a working principle of a digging depth and penetrating angle adjusting device according to an implementation of the present disclosure.

Referring to FIG. 13, the adjusting device 1-5 works as follows: The angle adjusting plate 1-1-2-5 is hinged with the angle adjusting hydraulic cylinder 1-5-9. Agronomic parameters in local potato planting, such as a soil texture and a potato tuber depth, can be investigated before harvesting, and an ideal angle of the digging shovel is obtained. Through a control unit or a control switch in a driving cab, a flow of hydraulic oil is changed to adjust a telescopic amount of the angle adjusting hydraulic cylinder 1-5-9, thereby directly driving the upper fixed shovel 1-1 and indirectly driving the lower movable shovel 1-2 and the vibrating sieve 1-3 to change an included angle with the ground, and adjusting the penetrating angle of the digging shovel. A telescopic amount of the digging depth adjusting hydraulic cylinder 1-5-10 is controlled in a same manner, thereby driving the parallel four-rod mechanism through the first depth adjusting rod 1-5-11 and the second depth adjusting rod 1-5-12 to change subsidence of the whole digging device relative to the ground, and changing the digging depth.

When the digging device 1 works, the shovel tip of the lower movable shovel 1-2 is located in front of the shovel tip of the fixed shovel 1-1, and thus come in contact with the soil first. Under the driving of the drive device 1-4, the lower movable shovel 1-2 vibrates transversely in a reciprocating manner. In cooperation with the hard chromium plated metal and involute gear tooth shape, the shovel tip at a low shearing resistance can cut the soil quickly. This makes to-be-dug soil loose to reduce a penetration resistance of the upper fixed shovel 1-1. The potato harvester drives the digging device to advance forward. A potato-soil mixture in front of the machine is dug continuously, and moves backward through the shovel tip and shovel surface of the upper fixed shovel 1-1 under a pushing action. The upper fixed shovel 1-1 has the arc-shaped shovel tip to prevent damage on skins of the potatoes. Meanwhile, the nylon shovel surface 1-1 of the lotus-leaf-like hydrophobic structure can effectively guide moist and heavy adhesive soil on the shovel surface to a tail of the shovel, to prevent soil hilling. The vibrating sieve 1-3 is located at a tail of the upper fixed shovel 1-1. Powered by the drive device 1-4, the vibrating sieve has a same amplitude, a same frequency and a phase difference of 180° with the lower movable shovel 1-2, and can perform preliminary dispersion and separation on the dug potato-soil mixture to reduce a workload in subsequent conveyance and separation as well as overall vibration of the digging device. The drive device 1-4 is powered by the hydraulic motor 1-4-1. By independently controlling a rotational speed of the hydraulic motor 1-4-1, the lower movable shovel 1-2 and the vibrating sieve 1-3 can be adjusted in vibration frequency. This makes the digging device more adaptable to different working environments. The parallel four-rod structure of the adjusting device 1-5 is hinged with the digging shovel and the potato harvester frame. By controlling the telescopic amount of the hydraulic cylinder, the digging depth and penetrating angle of the digging shovel are adjusted, thereby meeting potato digging requirements in different planting modes.

The present disclosure can effectively reduce a digging resistance in potato harvesting and prevent soil hilling and potato damaging phenomena. This greatly improves a harvesting efficiency and working performance.

As shown in FIG. 14 to FIG. 22, the conveyance and separation device 2 refers to a potato-soil-stem conveyance and separation device. The conveyance and separation device 2 includes a potato-soil separation conveyor chain 2-1, a potato-stem separation conveyor chain 2-2, elastic open-close scraping teeth 2-3, and a tensioning mechanism 2-4. The potato-soil separation conveyor chain 2-1 includes an input end located behind the digging device 1, and is configured to elevate the potato-soil mixture and perform preliminary separation on the soil and the potatoes. While the input end of the potato-soil separation conveyor chain 2-1 is located behind the digging device 1, an output end of the potato-soil separation conveyor chain 2-1 is located in front of an input end 3 of the separation and elevation reversing device, and is configured to elevate the potato-soil mixture and perform the preliminary separation on the soil and the potatoes. The potato-stem separation conveyor chain 2-2 surrounds the potato-soil separation conveyor chain 2-1. The elastic open-close scraping teeth 2-3 are provided above the potato-stem separation conveyor chain 2-2. The elastic open-close scraping teeth 2-3 are cooperated with the potato-stem separation conveyor chain 2-2 to separate stems and leaves from the potatoes. The tensioning mechanism 2-4 is provided on a lower segment of the potato-soil separation conveyor chain 2-1, and configured to tension the potato-soil separation conveyor chain 2-1 upward and downward. A tension degree of the potato-soil separation conveyor chain 2-1 is adjusted, thus adjusting a spacing between conveyor chain rods 2-1-1, and adjusting conveyance and separation efficiencies of the potato-soil separation conveyor chain 2-1.

In an implementation of the present disclosure, preferably, the high-efficiency and low-damage potato combine harvester further includes a photogate sensor and the control unit. The photogate sensor is configured to detect a time signal that a beam is obstructed by the conveyor chain rods 2-1-1 of the potato-soil separation conveyor chain 2-1. The time signal includes an "off time" and an "on time" and is transmitted to the control unit. The control unit calculates a linear speed v of the potato-soil separation conveyor chain 2-1 and a spacing l between adjacent ones of the conveyor chain rods 2-1-1 according to the time signal acquired by the photogate sensor, to facilitate timely adjustment of the operator on working parameters of the potato combine harvester.

In an implementation of the present disclosure, preferably, the high-efficiency and low-damage potato combine harvester further includes an image acquisition device 2-7. The image acquisition device 2-7 is configured to acquire a congestion image of a potato-soil mixture on the potato-soil separation conveyor chain 2-1 and transmit the congestion image to the control unit, such that the operator adjusts the linear speed v of the potato-soil separation conveyor chain 2-1 according to the congestion image of the potato-soil mixture.

In an implementation of the present disclosure, preferably, the potato-soil separation conveyor chain 2-1 includes a plurality of the conveyor chain rods 2-1-1, cotter pins 2-1-2, locating catches 2-1-3, and herringbone torsion spring connectors 2-1-4. Adjacent ones of the conveyor chain rods 2-1-1 are connected at ends through the herringbone torsion spring connectors 2-1-4 to form a closed-loop chain structure. Two adjacent ones of the herringbone torsion spring connectors 2-1-4 are arranged in a vertical turning direction.

Figure 15:
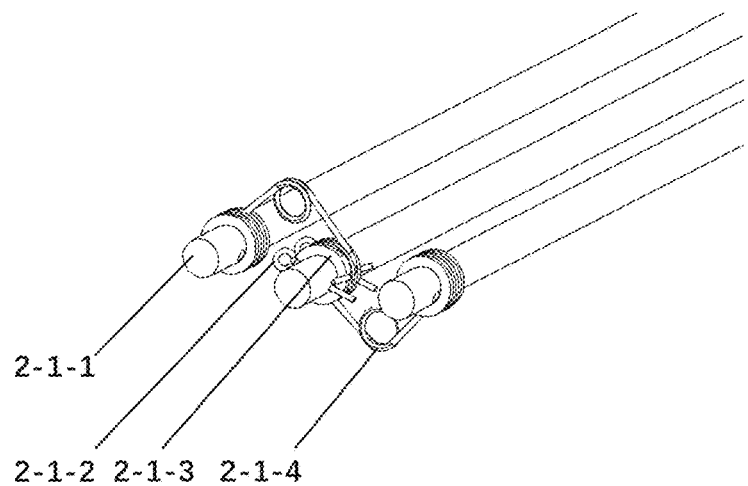
FIG. 15 is a schematic structural view of a junction of a potato-soil separation conveyor chain according to an implementation of the present disclosure.

Referring to FIG. 15, in an implementation of the present disclosure, preferably, a pair of pin holes are formed respectively radially in two ends of each of the conveyor chain rods 2-1-1. Through the cotter pins 2-1-2 and the locating catches 2-1-3, the herringbone torsion spring connectors 2-1-4 are located in an axial direction of the conveyor chain rods. Three locating catches 2-1-3 are provided at each of the two ends of each of the conveyor chain rods 2-1-1 as well as between a pair of the cotter pins 2-1-2. The locating catches 2-1-3 pairwise separate adjacent ones of the herringbone torsion spring connectors 2-1-4 connected to the conveyor chain rods 2-1-1. Two adjacent ones of the herringbone torsion spring connectors 2-1-4 are cooperated with a same one of the conveyor chain rods 2-1-1. The two adjacent ones of the herringbone torsion spring connectors 2-1-4 are arranged in the vertical turning direction. Two ends of a same one of the conveyor chain rods 2-1-1 are respectively cooperated with two of the herringbone torsion spring connectors 2-1-4. The conveyor chain rods 2-1-1 and the herringbone torsion spring connectors 2-1-4 are connected cyclically and serially to form a closed-loop chain structure.

Figure 16:
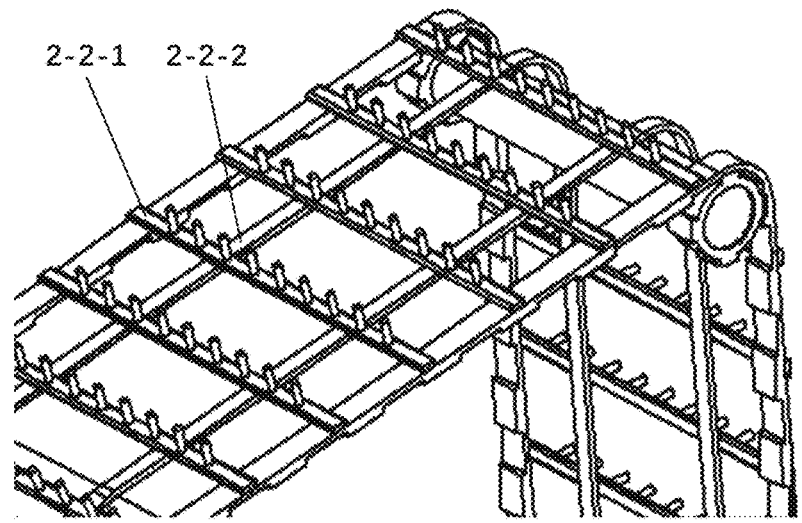
FIG. 16 is a schematic structural view of a potato-stem separation conveyor chain according to an implementation of the present disclosure.

Referring to FIG. 16, in an implementation of the present disclosure, preferably, the potato-stem separation conveyor chain 2-2 includes a plurality of transverse rubber rods 2-2-1 and a plurality of longitudinal rubber belts 2-2-2. The plurality of the transverse rubber rods 2-2-1 are arranged transversely. The plurality of the longitudinal rubber belts 2-2-2 are arranged longitudinally. The plurality of the transverse rubber rods 2-2-1 and the plurality of the longitudinal rubber belts 2-2-2 are interlaced to form a net-like structure. Finger-like flexible protruding contacts are uniformly arranged on the plurality of the transverse rubber rods 2-2-1. The finger-like flexible protruding contacts are cooperated with the elastic open-close scraping teeth 2-3 to separate the stems and the leaves from the potatoes.

Figure 17:
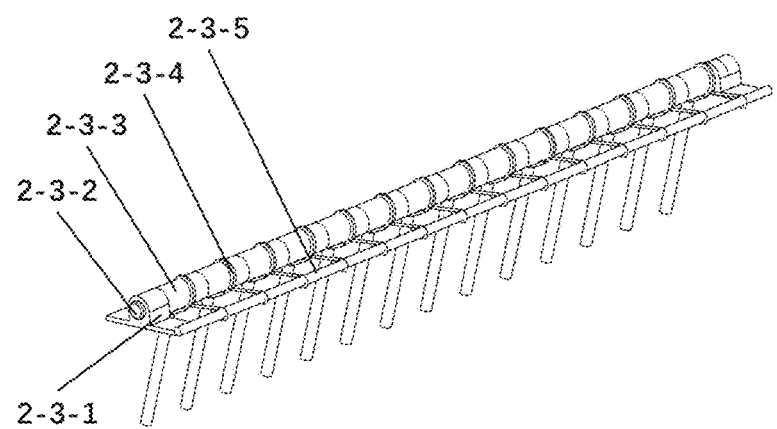
FIG. 17 is a schematic structural view of an elastic open-close scraping tooth according to an implementation of the present disclosure.

Referring to FIG. 17, in an implementation of the present disclosure, preferably, the elastic open-close scraping teeth 2-3 on the potato-stem separation conveyor chain 2-2 are set as a plurality of stages according to an actual conveyance distance. In an embodiment of the present disclosure, there are at least three stages. The elastic open-close scraping teeth 2-3 each include fixed seats 2-3-1, a fixed shaft 2-3-2, flexible rubber scraping teeth 2-3-3, a reset torsional spring 2-3-4, and an elongated rod 2-3-5. The fixed seats 2-3-1 are respectively provided at two ends of the fixed shaft 2-3-2. The fixed shaft 2-3-2 is parallel to the conveyor chain rods 2-1-1. One end of each of the flexible rubber scraping teeth 2-3-3 is a shaft sleeve structure. A plurality of the flexible rubber scraping teeth 2-3-3 are sleeved on the fixed shaft 2-3-2. The reset torsional spring 2-3-4 includes one end connected to the shaft sleeve structure of one of the flexible rubber scraping teeth 2-3-3, and an other end connected to the elongated rod 2-3-5. Two ends of the elongated rod 2-3-5 are respectively connected to the fixed seats 2-3-1.

The shaft sleeve structure of the flexible rubber scraping tooth 2-3-3 has a designed length. A spacing between tooth bodies of two adjacent flexible rubber scraping teeth 2-3-3 is the same as a spacing between adjacent finger-like flexible protruding contacts on the transverse rubber rods 2-2-1. This ensures that the flexible rubber scraping teeth 2-3-3 and the finger-like flexible protruding contacts are distributed in a staggered manner. Compared with a conventional potato-stem separation device in which stems are removed from the potatoes with an open-close scraping structure in a "slapping" manner, when the present disclosure works, the potato-stem separation conveyor chain 2-2 to which the stems and the leaves are connected move forward. When passing through the elastic open-close scraping teeth 2-3, the potatoes supported by the finger-like flexible protruding contacts on the transverse rubber rods 2-2-1 push away the flexible rubber scraping teeth 2-3-3 to move forward continuously. After allowing the potatoes to pass through, the flexible rubber scraping teeth 2-3-3 are restored under an action of the reset torsional springs 2-3-4, and separate the stems and the leaves from the potatoes through staggered structures formed with the flexible protruding contacts on the transverse rubber rods 2-2-1. Therefore, the present disclosure hooks and separates the stems and leaves from the potatoes, while allowing the potatoes to pass through normally. Meanwhile, each flexible rubber scraping tooth 2-3-3 has a reset function. The present disclosure can be adaptable to complex workloads, with excellent working performance.

Figure 18:
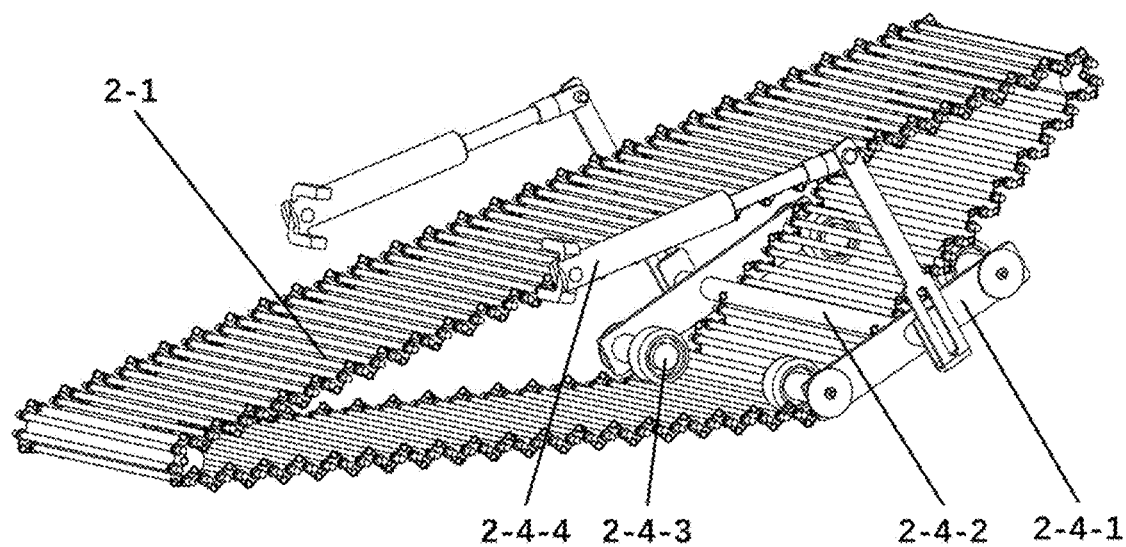
FIG. 18 is a schematic structural view of a tensioning mechanism according to an implementation of the present disclosure.

Referring to FIG. 18, according to the embodiment, preferably, the tensioning mechanism 2-4 includes tensioning arms 2-4-1, a rotary shaft 2-4-2, tensioning wheels 2-4-3, and an adjusting hydraulic cylinder 2-4-4. The tensioning arms 2-4-1 each include a transverse arm and a longitudinal arm intersected to form a "T"-shaped structure, and is connected to a shaft end of the rotary shaft 2-4-2 at an intersection. The tensioning arms 2-4-1 are respectively connected to two ends of the rotary shaft 2-4-2. Two ends of the transverse arm of each of the tensioning arms 2-4-1 are respectively provided with the tensioning wheels 2-4-3. The tensioning wheels 2-4-3 come in contact with the potato-soil separation conveyor chain 2-1. An outer ring of each of the tensioning wheels 2-4-3 is made of a rubber material, to tightly attach to the potato-soil separation conveyor chain 2-1, and make operation of the potato-soil separation conveyor chain 2-1 stable. The longitudinal arm of the each of tensioning arms 2-4-1 includes one end hinged with the adjusting hydraulic cylinder 2-4-4, and an other end connected to a potato harvester frame. By controlling a telescopic amount of the adjusting hydraulic cylinder 2-4-4, a tension degree of the potato-soil separation conveyor chain 2-1 is changed. Preferably, the adjusting hydraulic cylinder 2-4-4 is a double-acting hydraulic cylinder. With adjustment on the telescopic amount of the cylinder, the tension degree of the potato-soil separation conveyor chain 2-1 is changed.

The tensioning mechanism 2-4 is provided on a lower segment of the potato-soil separation conveyor chain 2-1. Two of the tensioning wheels 2-4-3 are located on an inner ring of the potato-soil separation conveyor chain 2-1, and two of the tensioning wheels 2-4-3 are located on an outer ring of the potato-soil separation conveyor chain 2-1. When the tensioning mechanism 2-4 works, the two tensioning wheels of the 2-4-3 are pressed upward by a lower surface of the lower segment of the potato-soil separation conveyor chain 2-1, and the two of the tensioning wheels 2-4-3 are pressed downward by an upper surface of the lower segment of the potato-soil separation conveyor chain 2-1. This greatly improves the tension degree, and effectively adjusts an openness of the herringbone torsion spring connector 2-1-4, thereby adjusting the spacing between adjacent conveyor chain rods 2-1-1.

Figure 14:
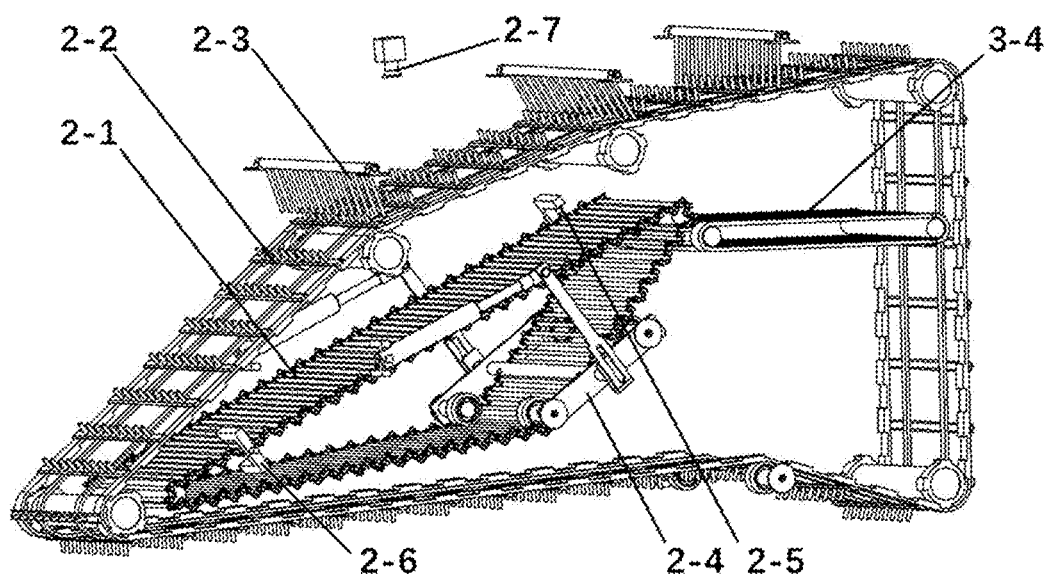
FIG. 14 is a schematic structural view of a conveyance and separation device according to an implementation of the present disclosure.

Referring to FIG. 14, according to the embodiment, preferably, the photogate sensor includes a first photogate sensor 2-5 and a second photogate sensor 2-6. The image acquisition device 2-7 is provided above an upper segment of the potato-soil separation conveyor chain 2-1 and an upper segment of the potato-stem separation conveyor chain 2-2, to photograph the whole separation conveyor chain at a high angle to obtain a congestion condition of the potato-soil mixture on the conveyor chain in real time. The first photogate sensor 2-5, the second photogate sensor 2-6, the image acquisition device 2-7 and the control unit transmit data and image information in a wireless or wired manner.

In an implementation of the present disclosure, the first photogate sensor 2-5 and the second photogate sensor 2-6 are respectively provided at two sides of the upper segment of the potato-soil separation conveyor chain 2-1, and at an upper end and a lower end of the upper segment.

Figure 19:
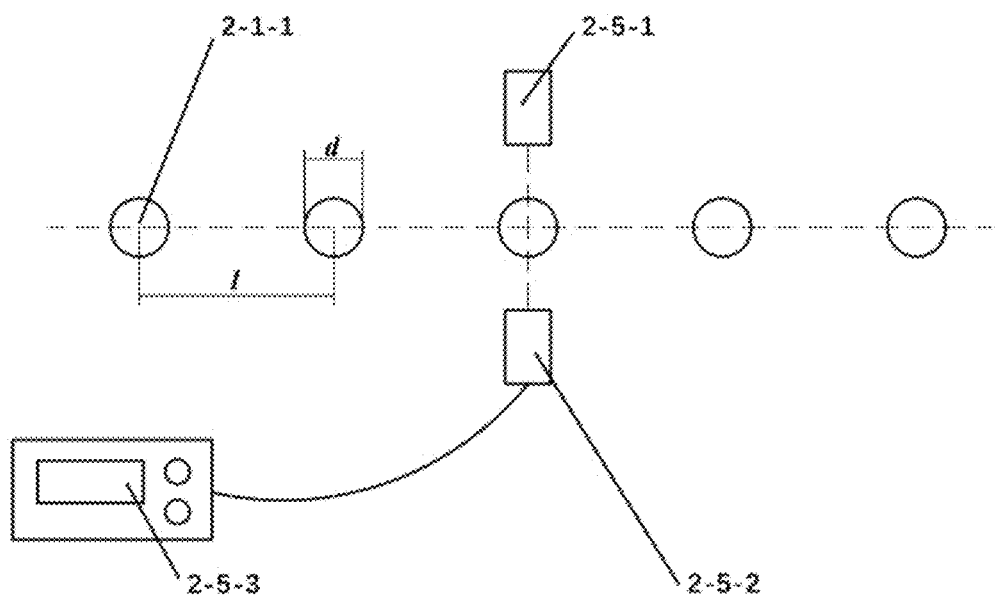
FIG. 19 illustrates a working principle of a photogate sensor according to an implementation of the present disclosure.

Referring to FIG. 19, in an implementation of the present disclosure, the first photogate sensor 2-5 and the second photogate sensor 2-6 are structurally the same. With the first photogate sensor 2-5 as an example, the first photogate sensor 2-5 includes a laser 2-5-1, a sensor 2-5-2, and a timer 2-5-3. The laser 2-5-1 is configured to emit a beam. The sensor 2-5-2 is configured to receive the beam. The timer 2-5-3 is configured to calculate the "off" time and the "on" time.

Normally, the laser 2-5-1 emits the beam, the sensor 2-5-2 receives the beam, and the timer 2-5-3 does not work. When the conveyor chain rod 2-1-1 moves to a position between the laser 2-5-1 and the sensor 2-5-2 for a first time to obstruct the beam, the timer 2-5-3 is activated to calculate the "off" time, namely beam obstructed time t. When the conveyor chain rod 2-1-1 moves away from the position between the laser 2-5-1 and the sensor 2-5-2 for a first time, a beam path is unobstructed again, and the timer 2-5-3 is activated to calculate the "on" time, namely time T that the beam path is unobstructed until being obstructed next time.

Figure 20:
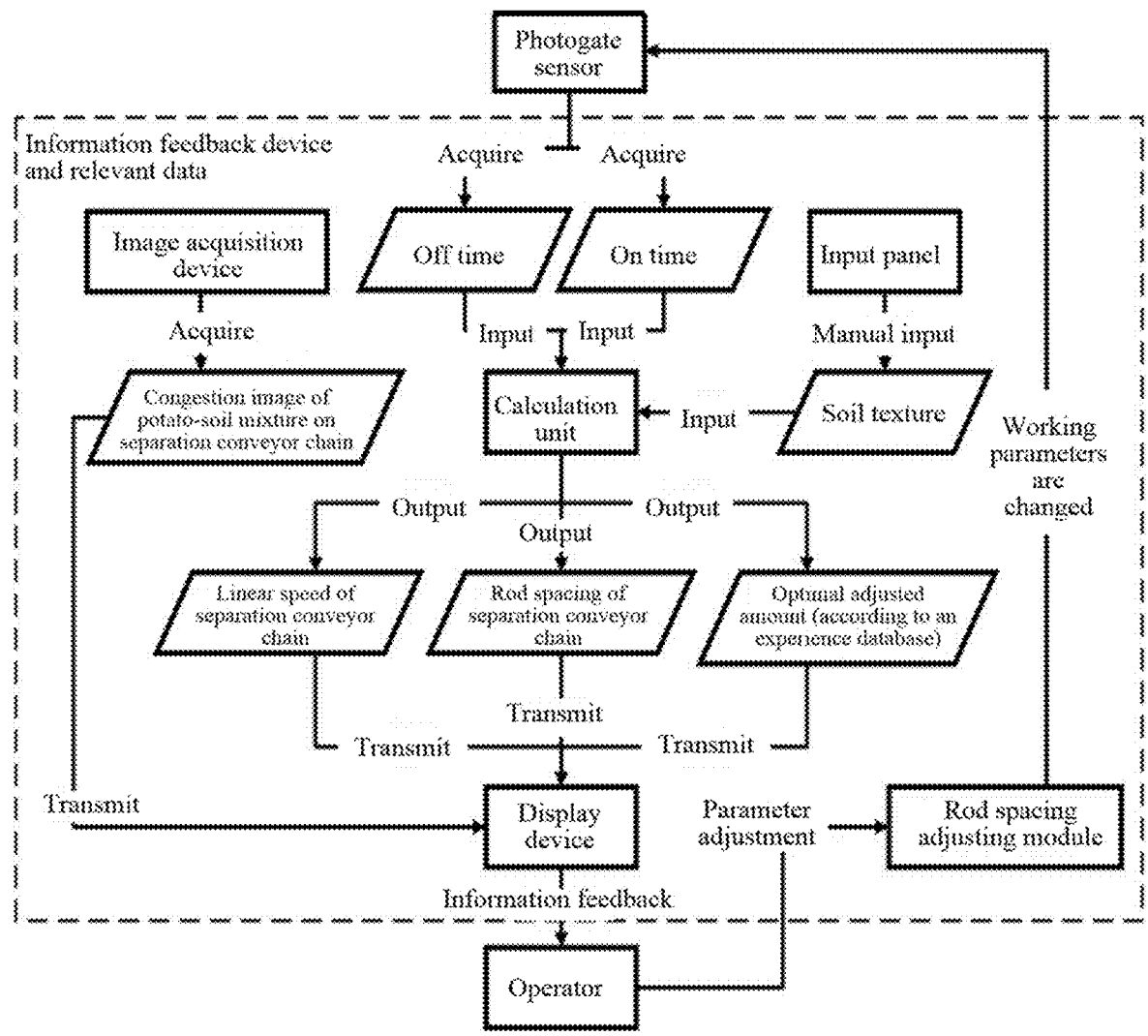
FIG. 20 illustrates a workflow of an information feedback device according to an implementation of the present disclosure.

Referring to FIG. 20, the control unit receives a time signal calculated by the first photogate sensor 2-5 and the second photogate sensor 2-6, calculates the linear speed v of the potato-soil separation conveyor chain 2-1 and the spacing l between the adjacent ones of the conveyor chain rods 2-1-1, and displays the linear speed and the spacing on a display device connected to the control unit.

The linear speed v of the potato-soil separation conveyor chain 2-1 is calculated by:

$$v = \frac{d}{t}$$

where, d is a diameter of each of the conveyor chain rods 2-1-1.

The spacing l between the adjacent ones of the conveyor chain rods 2-1-1 is calculated by:

$$l = v \cdot T.$$

Further, while a plurality of the conveyor chain rods 2-1-1 sequentially pass through the position between the laser 2-5-1 and the sensor 2-5-2, the first photogate sensor 2-5 acquires ta and Ta in real time, sequentially including ta1, Ta1, ta2, Ta2, ta3, Ta3 . . . tan, Tan. The second photogate sensor 2-6 acquires, in real time, the beam obstructed time tb and the time Tb that the beam is obstructed next time after unobstructed, sequentially including ta1, Tb1, tb2, Tb2, tb3, Tb3 . . . tbn, Tbn, n being a number of recorded time points.

In view of unstable factors such as vibration in work of the potato-soil separation conveyor chain 2-1, and different spacings between the adjacent conveyor chain rods 2-1-1, a method of seeking an average in repeated calculation is employed to determine the "off time" t. The controller seeks averages of m "off time" in n time points continuously recorded by the first photogate sensor 2-5 and the second photogate sensor 2-6, and then seeks an average for the averages of the two photogate sensors. In an implementation of the present disclosure, the control unit seeks averages of ten "off time" $t_m$ to $t_{m+9}$, m∈N+, in n time points continuously recorded by the first photogate sensor 2-5 and the second photogate sensor 2-6, and then seeks an average for the averages of the two photogate sensors. The calculation process is given by:

$$\bar{t}_a = \frac{\sum_{i=m}^{m+9} t_{ai}}{10}, (m \in N+)$$

$$\bar{t}_b = \frac{\sum_{i=m}^{m+9} t_{bi}}{10}, (m \in N+)$$

$$\bar{t} = \frac{\bar{t}_a + \bar{t}_b}{2}$$

where, $\bar{t}_a$ is the average of the m continuous "off time" of the first photogate sensor 2-5, $\bar{t}_b$ is the average of the m continuous "off time" of the second photogate sensor 2-6, and $\bar{t}$ is the average for the averages of the "off time" measured by the first photogate sensor 2-5 and the second photogate sensor 2-6 in a same time period.

The real-time linear speed $\bar{v}$ of the potato-soil separation conveyor chain 2-1 is calculated by:

$$\bar{v} = \frac{d}{\bar{t}}$$

A method of seeking an average in repeated calculation is employed to determine the "on time" T. The control unit seeks averages of m "on time" in n time points continuously recorded by the first photogate sensor 2-5 and the second photogate sensor 2-6, and then seeks an average for the averages of the two photogate sensors. In an implementation of the present disclosure, the control unit seeks averages of ten "off time" Tm to Tm+9, m∈N+, in n time points continuously recorded by the first photogate sensor 2-5 and the second photogate sensor 2-6, and then seeks an average for the averages of the two photogate sensors. The calculation process is given by:

$$\overline{T}_a = \frac{\sum_{i=m}^{m+9} T_{ai}}{10}, (m \in N+)$$

$$\overline{T}_b = \frac{\sum_{i=m}^{m+9} T_{bi}}{10}, (m \in N+)$$

$$\overline{T} = \frac{\overline{T}_a + \overline{T}_b}{2}$$

where, $\overline{T}_a$ is the average of the m continuous "on time" of the first photogate sensor 2-5, $\overline{T}_b$ is the average of the m continuous "on time" of the second photogate sensor 2-6, and $\overline{T}$ is the average for the averages of the "on time" measured by the first photogate sensor 2-5 and the second photogate sensor 2-6 in a same time period.

The average spacing $\bar{l}$ between the adjacent conveyor chain rods 2-1-1 is calculated by:

$$\bar{l} = \bar{v} \cdot \overline{T}.$$

According to the embodiment, preferably, an experience database about soil textures and spacings l between the adjacent conveyor chain rods 2-1-1 is further stored in the control unit. In the experience database, optimal rod spacings l corresponding to different soil textures are associated with a hydraulic telescopic amount of the adjusting hydraulic cylinder 2-4-4. Before harvesting, a soil texture of a harvesting field, such as "sandy loam", "light loam", "heavy loam", "light clay", or "heavy clay", is investigated, and a soil variety is input to the control unit through an input panel 2-8-3. The control unit matches an optimal rod spacing l according to the input soil variety, outputs an adjusted amount corresponding to the optimal rod spacing, and feeds an optimal accurate adjusted value on the telescopic amount of the hydraulic cylinder back to the operator through the display device.

In an implementation of the present disclosure, the rod spacing is adjusted manually. Before the potato combine harvester works, the telescopic amount of the adjusting hydraulic cylinder 2-4-4 are preliminarily adjusted to an optimal value through the control unit. When the potato combine harvester works, and an empirical value of the rod spacing is far from satisfactory due to an actual working condition such as different soil moisture contents, the rod spacing can further be adjusted through a rod spacing adjusting module 2-8-4 according to a real-time congestion condition of the potato-soil mixture on the display device and according to experience on the basis of the optimal value. A rotational speed of the driving hydraulic motor can also be adjusted through a relevant hydraulic control device in the driving cab to change the linear speed of the potato-soil separation conveyor chain 2-1, thereby relieving the congestion condition. With the higher linear speed of the potato-soil separation conveyor chain 2-1, the potato-soil mixture is less likely to cause congestion, but the corresponding potato damage rate is higher. The greater the spacing between the adjacent conveyor chain rods 2-1-1, the higher the soil removal efficiency, and the higher the corresponding potato leakage rate. Upon completion of adjustment, the control unit feeds updated linear speed data of the potato-soil separation conveyor chain 2-1, spacing data between the adjacent conveyor chain rods 2-1-1, and image information on the congestion condition of the potato-soil mixture back to the operator through the display device according to received information, such that the operator knows an adjustment effect.

Figure 21:
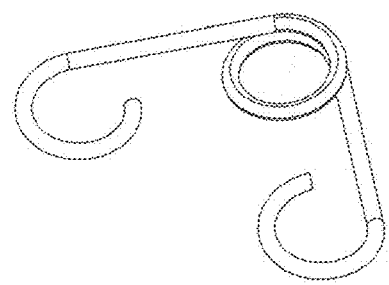
FIG. 21 is a schematic structural view of a herringbone torsion spring connector according to an implementation of the present disclosure.

Referring to FIG. 21, in an implementation of the present disclosure, preferably, hook structures at two ends of the herringbone torsion spring connector 2-1-4 are symmetrically arranged at two sides of a central helical structure. The hook structures at the two ends each have an inner diameter same as a diameter of the conveyor chain rod 2-1-1, and are sleeved on the conveyor chain rod 2-1-1. The hook structures at the two ends are connected to adjacent conveyor chain rods 2-1-1. The central helical structure accumulates or releases deformation energy through deformation. When the tensioning mechanism 2-4 is pressed, the central helical structure of the herringbone torsion spring connector 2-1-4 causes deformation and accumulates deformation energy, a spacing between the hook structures at the two ends of the herringbone torsion spring connector is widened, and the spacing between the adjacent conveyor chain rods 2-1-1 is increased. When the tensioning mechanism 2-4 is loosened, the central helical structure of the herringbone torsion spring connector 2-1-4 shows no deformation and is gradually restored. In this case, the deformation energy is released to pull the adjacent conveyor chain rods 2-1-1 close.

Figure 22:
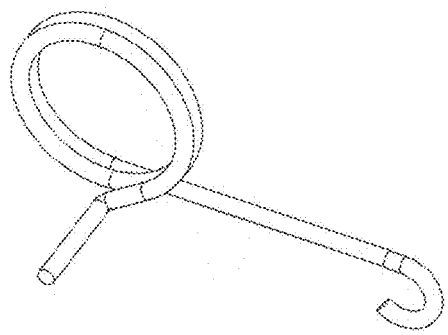
FIG. 22 is a schematic structural view of a reset torsional spring according to an implementation of the present disclosure.
Figure 23:
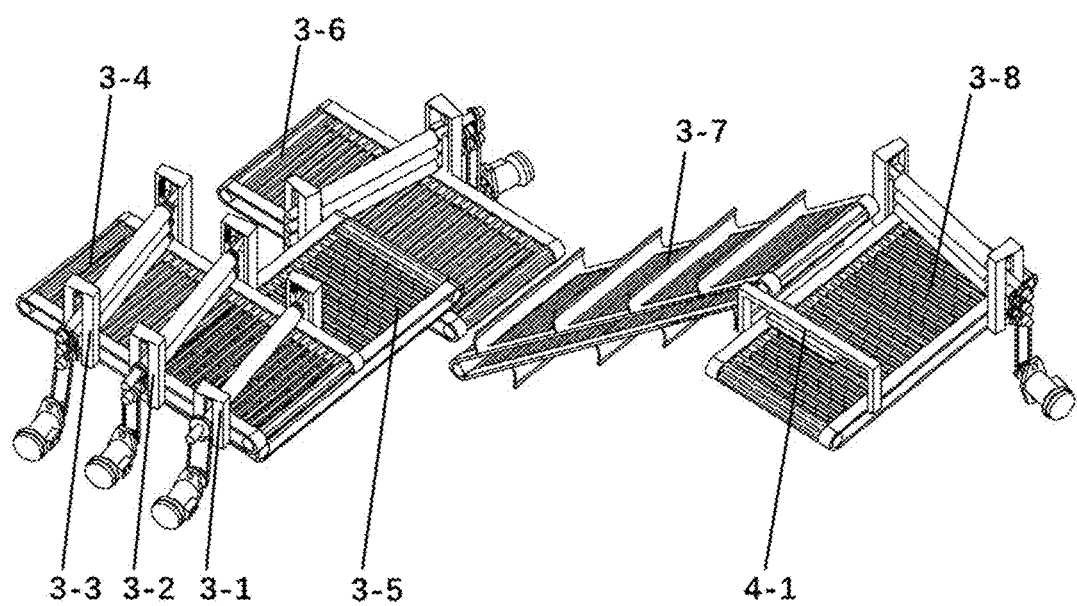
FIG. 23 is a schematic structural view of a separation and elevation reversing device according to an implementation of the present disclosure.

Referring to FIG. 22, in an implementation of the present disclosure, preferably, a central helical structure of the reset torsional spring 2-3-4 is sleeved on the shaft sleeve structure of the flexible rubber scraping tooth 2-3-3, and accumulates or releases deformation energy through deformation. One end of the reset torsional spring 2-3-4 is provided with a hook structure. The hook structure is connected to the elongated rod 2-3-5, to support the reset torsional spring 2-3-4 in deformation. Bent in 90°, an other end of the reset torsional spring 2-3-4 is attached to the tooth body of the flexible rubber scraping tooth 2-3-3, to transfer an acting force to the flexible rubber scraping tooth 2-3-3 for restoration.

When the potato combine harvester works, the potato-soil mixture dug by the digging device 1 is elevated and conveyed by the potato-soil separation conveyor chain 2-1. In this process, soil on a lower layer of the mixture gradually falls off from a gap between the conveyor chain rods 2-1-1, thereby achieving potato-soil separation. Meanwhile, under an action of staggered structures formed by the potato-stem separation conveyor chain 2-2 and the multiple stages of the elastic open-close scraping teeth 2-3, the potato tubers on an upper layer of the mixture and the stems and leaves thereon are separated. The first photogate sensor 2-5 and the second photogate sensor 2-6 on the upper segment of the potato-soil separation conveyor chain 2-1 monitor the linear speed of the potato-soil separation conveyor chain 2-1 and the spacing between the adjacent conveyor chain rods 2-1-1 in real time. The image acquisition device 2-7 above the upper segment of the potato-soil separation conveyor chain 2-1 and the upper segment of the potato-stem separation conveyor chain 2-2 acquires the congestion condition of the potato-soil mixture on the conveyor chain. The first photogate sensor 2-5, the second photogate sensor 2-6 and the image acquisition device 2-7 send information to the control unit in the wired or wireless manner. The control unit feeds processed data back to the operator through the display device, such that the operator assesses a present workload to adjust the linear speed of the potato-soil separation conveyor chain 2-1 and the spacing between the adjacent conveyor chain rods 2-1-1. The spacing between the adjacent conveyor chain rods 2-1-1 is adjusted by controlling a tension degree of the tensioning mechanism 2-4 for the potato-soil separation conveyor chain 2-1. The tensioning mechanism 2-4 is provided on the lower segment of the potato-soil separation conveyor chain 2-1 to tension the potato-soil separation conveyor chain 2-1 upward and downward. By extending the adjusting hydraulic cylinder 2-4-4, the tension degree is reduced, and the spacing between the adjacent conveyor chain rods 2-1-1 is reduced. Consequently, the soil separation efficiency is reduced, but the corresponding potato leakage rate is reduced and the conveyance is more stable. By retracting the adjusting hydraulic cylinder 2-4-4, the tension degree is improved and the spacing between the adjacent conveyor chain rods 2-1-1 is increased. As a result, the soil separation efficiency is improved, but the corresponding potato leakage rate is improved and the conveyance is less stable. The control unit also feeds a working state back to the operator through the controller after working parameters are adjusted, to facilitate assessment of the operator on whether present working parameters satisfy the workload.

The separation and elevation reversing device 3 shown in FIG. 23 to FIG. 28 is a potato-stem-soil separation reversing device. The separation and elevation reversing device 3 includes a first longitudinal flexible conveyor belt 3-4, a first transverse flexible conveyor belt 3-5, a second longitudinal flexible conveyor belt 3-6, an elevation inclined conveyor belt 3-7, and a second transverse flexible conveyor belt 3-8.

A first-stage single-layer potato-stem-soil separating roller 3-1, a second-stage double-layer potato-stem-soil separating roller 3-2, and a third-stage three-layer potato-stem-soil separating roller 3-3 are sequentially inclined on the first longitudinal flexible conveyor belt 3-4 from front to back. The first-stage single-layer potato-stem-soil separating roller 3-1, the second-stage double-layer potato-stem-soil separating roller 3-2 and the third-stage three-layer potato-stem-soil separating roller 3-3 are increasingly high in sequence. A gap is provided between double layers of separating rollers in the second-stage double-layer potato-stem-soil separating roller 3-2. A gap is provided between three layers of separating rollers in the third-stage three-layer potato-stem-soil separating roller 3-3. The first longitudinal flexible conveyor belt 3-4 is configured to remove soil on the potatoes, separate the potatoes from connected stems, and shunt and convey the potatoes to the first transverse flexible conveyor belt 3-5. The first transverse flexible conveyor belt 3-5 is configured to convey the potatoes from the first longitudinal flexible conveyor belt 3-4 to the second longitudinal flexible conveyor belt 3-6. The second longitudinal flexible conveyor belt 3-6 is configured to convey the potatoes from the first transverse flexible conveyor belt 3-5 to the elevation inclined conveyor belt 3-7. The elevation inclined conveyor belt 3-7 is configured to convey the potatoes from the second longitudinal flexible conveyor belt 3-6 to the second transverse flexible conveyor belt 3-8. The second transverse flexible conveyor belt 3-8 is configured to convey the potatoes to the potato collection box 5.

Figure 24:
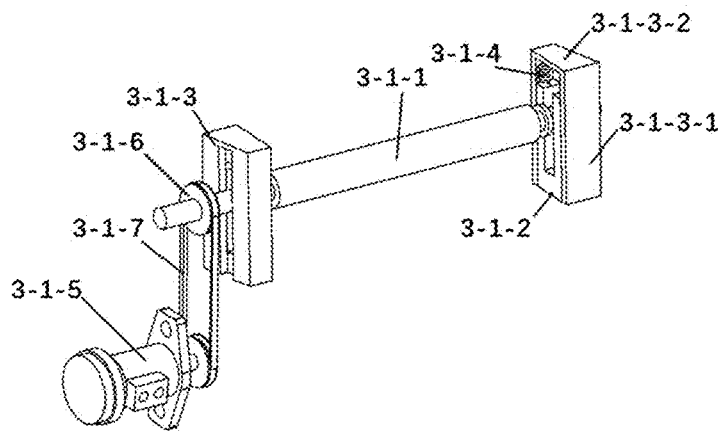
FIG. 24 is a schematic structural view of a first-stage single-layer potato-stem-soil separating roller according to an implementation of the present disclosure.

Referring to FIG. 24, in an implementation of the present disclosure, preferably, the first-stage single-layer potato-stem-soil separating roller 3-1 includes a first-stage roller body 3-1-1, first-stage roller mounting seats 3-1-2, first-stage roller mounting slides 3-1-3, a first-stage roller compressed spring 3-1-4, a first-stage roller driven hydraulic motor 3-1-5, a first-stage roller transmission belt pulley 3-1-6, and a first-stage roller transmission belt 3-1-7. Two ends of the first-stage roller body 3-1-1 are respectively provided on the first-stage roller mounting seats 3-1-2. The first-stage roller mounting seats 3-1-2 each are respectively provided with two guiding grooves at two sides, and are supported on the two ends of the first-stage roller body 3-1-1 through an internal bearing. The first-stage roller mounting slide 3-1-3 includes first U-shaped steels 3-1-3-1 at two sides, and a first sealing plate 3-1-3-2 on a top. The first-stage roller mounting seats 3-1-2 are respectively connected to the first-stage roller mounting slides 3-1-3 to form a sliding pair. Specifically, the first-stage roller mounting seat 3-1-2 is connected to projecting edges of the first U-shaped steels 3-1-3-1 at the two sides of each of the first-stage roller mounting slides 3-1-3 through the guiding grooves to form the sliding pair. This drives the first-stage roller body 3-1-1 to move slightly in a direction perpendicular to the ground.

The first-stage roller compressed spring 3-1-4 is provided on the first-stage roller mounting slide 3-1-3. The first-stage roller compressed spring 3-1-4 includes one end in contact with an upper inner wall of the first-stage roller mounting slide 3-1-3, and an other end in contact with the first-stage roller body 3-1-1. Specifically, the first-stage roller compressed spring 3-1-4 is provided in the first-stage roller mounting slide 3-1-3 and on the first-stage roller mounting seat 3-1-2, with one end in contact with the top first sealing plate 3-1-3-2, and an other end in contact with an upper surface of the first-stage roller mounting seat 3-1-2. By pressing the first-stage roller mounting seat 3-1-2 downward through an elastic force, the first-stage roller body 3-1-1 is attached to an upper surface of the first longitudinal flexible conveyor belt 3-4.

One end of the first-stage roller body 3-1-1 is provided with the first-stage roller transmission belt pulley 3-1-6. The first-stage roller driven hydraulic motor 3-1-5 is connected to the first-stage roller transmission belt pulley 3-1-6 through the first-stage roller transmission belt 3-1-7. The first-stage roller driven hydraulic motor 3-1-5 is configured to provide a power for rotation of the first-stage roller body 3-1-1, thereby driving the first-stage roller body 3-1-1 to rotate. A rotating direction of the first-stage roller body 3-1-1 is opposite to a conveying direction of a conveyor belt. Preferably, the first-stage roller transmission belt pulley 3-1-6 is located at a same side as the first-stage roller driven hydraulic motor 3-1-5. Through the first-stage roller transmission belt 3-1-7, the first-stage roller transmission belt pulley 3-1-6 at a shaft end of the first-stage roller body 3-1-1 and the first-stage roller transmission belt pulley 3-1-6 at a shaft end of the first-stage roller driven hydraulic motor 3-1-5 are connected. Therefore, a power of the hydraulic motor is transferred to the first-stage roller body 3-1-1. Meanwhile, the first-stage roller transmission belt 3-1-7 can fine adjust a gap between the roller and the conveyor belt under an action of an own elastic force.

Figure 25:
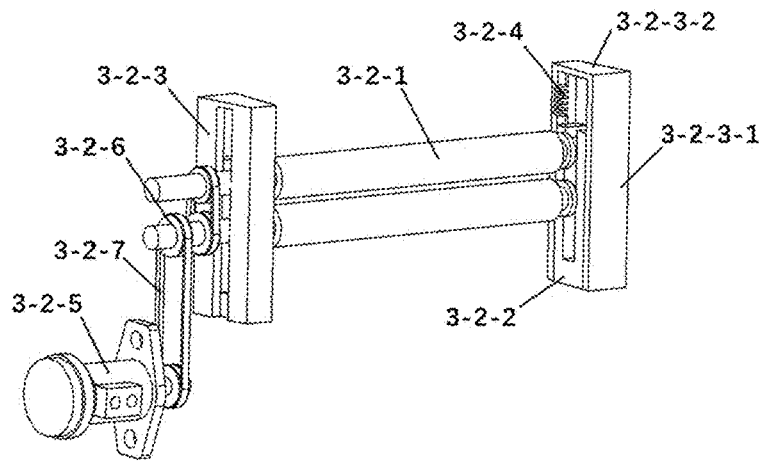
FIG. 25 is a schematic structural view of a second-stage double-layer potato-stem-soil separating roller according to an implementation of the present disclosure.

Referring to FIG. 25, in an implementation of the present disclosure, preferably, the second-stage double-layer potato-stem-soil separating roller 3-2 includes two second-stage roller bodies 3-2-1, second-stage roller mounting seats 3-2-2, second-stage roller mounting slides 3-2-3, a second-stage roller compressed spring 3-2-4, a second-stage roller driven hydraulic motor 3-2-5, second-stage roller transmission belt pulleys 3-2-6, and a second-stage roller transmission belt 3-2-7.

Two ends of each of the second-stage roller bodies 3-2-1 are respectively provided on the second-stage roller mounting seats 3-2-2. The second-stage roller mounting seats 3-2-2 each are respectively provided with two guiding grooves at two sides, and supported at the two ends of the second-stage roller body 3-2-1 through an internal bearing. The second-stage roller mounting slide 3-2-3 includes second U-shaped steels 3-2-3-1 at two sides, and a second sealing plate 3-2-3-2 on a top. The second-stage roller mounting slide 3-2-3 is longer than the first-stage roller mounting slide 3-1-3. The second-stage roller mounting seat 3-2-2 is connected to the second-stage roller mounting slide 3-2-3 to form a sliding pair, thereby driving the second-stage roller body 3-2-1 to move slightly in a direction perpendicular to the ground. Two pairs of the second-stage roller mounting seats 3-2-2 supporting the two second-stage roller bodies 3-2-1 are stacked along a direction of the second-stage roller mounting slide 3-2-3. The second-stage roller compressed spring 3-2-4 is provided on the second-stage roller mounting slide 3-2-3. The second-stage roller compressed spring 3-2-4 includes one end in contact with an upper inner wall of the second-stage roller mounting slide 3-2-3, and an other end in contact with an upper second-stage roller body 3-2-1. Specifically, the second-stage roller compressed spring 3-2-4 is provided in the second-stage roller mounting slide 3-2-3 and on the second-stage roller mounting seat 3-2-2, with one end in contact with the top second sealing plate 3-2-3-2, and an other end in contact with an upper surface of the second-stage roller mounting seat 3-2-2 away from the first longitudinal flexible conveyor belt 3-4. By pressing the second-stage roller mounting seat 3-2-2 downward through an elastic force, the second-stage roller body 3-2-1 close to the first longitudinal flexible conveyor belt 3-4 is attached to an upper surface of the first longitudinal flexible conveyor belt 3-4.

One end of the second-stage roller body 3-2-1 is provided with one of the second-stage roller transmission belt pulleys 3-2-6. The second-stage roller driven hydraulic motor 3-2-5 is connected to the second-stage roller transmission belt pulley 3-2-6 through the second-stage roller transmission belt 3-2-7, thereby driving upper and lower second-stage roller bodies 3-2-1 to rotate. The gap is provided between the two second-stage roller bodies 3-2-1. A rotating direction of the second-stage roller body 3-2-1 is opposite to the conveying direction of the conveyor belt. The upper one of the second-stage roller bodies has a rotational speed greater than a rotational speed of the lower one of the second-stage roller bodies.

In an implementation of the present disclosure, the second-stage roller driven hydraulic motor 3-2-5 is connected through the second-stage roller transmission belt 3-2-7 to the second-stage roller transmission belt pulley 3-2-6 at a shaft end of the second-stage roller body 3-2-1 close to the first longitudinal flexible conveyor belt 3-4, and configured to provide a power for rotation of the second-stage roller body 3-2-1.

In an implementation of the present disclosure, the second-stage roller transmission belt pulley 3-2-6 is provided at the shaft end of the second-stage roller body 3-2-1, and located at a same side as the second-stage roller driven hydraulic motor 3-2-5.

Through the second-stage roller transmission belt 3-2-7, two second-stage roller transmission belt pulleys 3-2-6 provided at the shaft ends of the second-stage roller bodies 3-2-1 are connected, thereby transferring the power of the lower roller body to the upper roller body. Meanwhile, the second-stage roller transmission belt 3-2-7 can fine adjust the gap between the two roller bodies under an action of an own elastic force.

In an implementation of the present disclosure, preferably, a diameter of the second-stage roller transmission belt pulley 3-2-6 on the upper second-stage roller body 3-2-1 in the second-stage double-layer potato-stem-soil separating roller 3-2 is less than a diameter of the second-stage roller transmission belt pulley 3-2-6 on the lower second-stage roller body 3-2-1.

Figure 26:
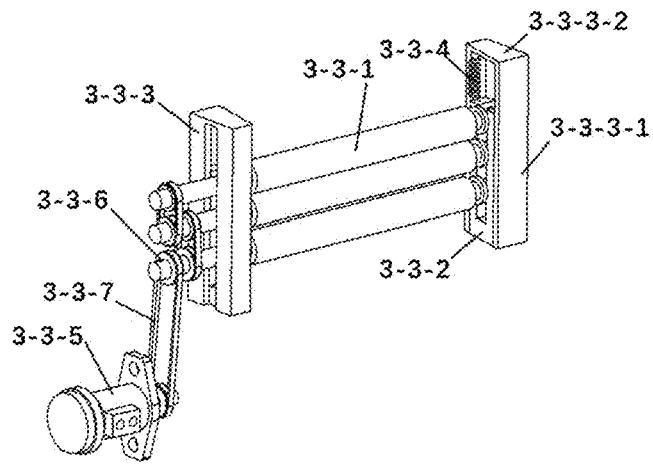
FIG. 26 is a schematic structural view of a third-stage three-layer potato-stem-soil separating roller according to an implementation of the present disclosure.

Referring to FIG. 26, according to the embodiment, preferably, the third-stage three-layer potato-stem-soil separating roller 3-3 includes three third-stage roller bodies 3-3-1, third-stage roller mounting seats 3-3-2, a third-stage roller mounting slide 3-3-3, a third-stage roller compressed spring 3-3-4, a third-stage roller driven hydraulic motor 3-3-5, third-stage roller transmission belt pulleys 3-3-6, and a third-stage roller transmission belt 3-3-7. Two ends of each of the third-stage roller bodies 3-3-1 are respectively provided on the third-stage roller mounting seats 3-3-2. The third-stage roller mounting seat 3-3-2 is connected to the third-stage roller mounting slide 3-3-3 to form a sliding pair. The three third-stage roller bodies 3-3-1 are stacked along a direction of the third-stage roller mounting slide 3-3-3. The third-stage roller compressed spring 3-3-4 is provided on the third-stage roller mounting slide 3-3-3. The third-stage roller compressed spring 3-3-4 includes one end in contact with an upper inner wall of the third-stage roller mounting slide 3-3-3, and an other end in contact with an uppermost third-stage roller body 3-3-1. One end of the third-stage roller body 3-3-1 is provided with one of the third-stage roller transmission belt pulleys 3-3-6. The third-stage roller driven hydraulic motor 3-3-5 is connected to the third-stage roller transmission belt pulley 3-3-6 through the third-stage roller transmission belt 3-3-7, thereby driving the three third-stage roller bodies 3-3-1 to rotate. A gap is provided between the three third-stage roller bodies 3-3-1. A rotating direction of the third-stage roller body 3-3-1 is opposite to the conveying direction of the conveyor belt. Rotational speeds of the three third-stage roller bodies 3-3-1 decrease sequentially from top to bottom.

In an implementation of the present disclosure, preferably, diameters of the third-stage roller transmission belt pulleys 3-3-6 on the third-stage roller bodies 3-3-1 increase sequentially from top to bottom.

In an implementation of the present disclosure, preferably, the third-stage roller mounting seats 3-3-2 each are respectively provided with two guiding grooves at two sides, and are supported at the two ends of the third-stage roller body 3-3-1 through an internal bearing. The third-stage roller mounting slide 3-3-3 includes third U-shaped steels 3-3-3-1 at two sides, and a third sealing plate 3-3-3-2 on a top. The third-stage roller mounting slide 3-3-3 is longer than the second-stage roller mounting slide 3-2-3. The third-stage roller mounting seat 3-3-2 is connected to projecting edges of the third U-shaped steels 3-3-3-1 at the two sides of the third-stage roller mounting slide 3-3-3 through the guiding grooves to form a sliding pair. This drives the third-stage roller body 3-3-1 to move slightly in a direction perpendicular to the ground. Three pairs of the third-stage roller mounting seats 3-3-2 supporting the three third-stage roller bodies 3-3-1 are stacked along the direction of the third-stage roller mounting slide 3-3-3. The third-stage roller compressed spring 3-3-4 is provided in the third-stage roller mounting slide 3-3-3 and on the third-stage roller mounting seat 3-3-2, with one end in contact with the top third sealing plate 3-3-3-2, and an other end in contact with an upper surface of the third-stage roller mounting seat 3-3-2 away from the first longitudinal flexible conveyor belt 3-4. By pressing the third-stage roller mounting seat 3-3-2 downward through an elastic force, the third-stage roller body 3-3-1 close to the first longitudinal flexible conveyor belt 3-4 is attached to the upper surface of the first longitudinal flexible conveyor belt 3-4.

The third-stage roller driven hydraulic motor 3-3-5 is connected through the third-stage roller transmission belt 3-3-7 to the third-stage roller transmission belt pulley 3-3-6 at a shaft end of the third-stage roller body 3-3-1 close to the first longitudinal flexible conveyor belt 3-4, and configured to provide a power for rotation of the third-stage roller body 3-3-1.

In an implementation of the present disclosure, the third-stage roller transmission belt pulley 3-3-6 is provided at the shaft end of the second-stage roller body 3-3-1, and located at a same side as the third-stage roller driven hydraulic motor 3-3-5.

Through the third-stage roller transmission belt 3-3-7, four third-stage roller transmission belt pulleys 3-3-6 provided at the shaft ends of the second-stage roller bodies 3-3-1 are connected, thereby transferring a power from a bottom layer of roller to a second layer of roller and a third layer of roller. Meanwhile, the third-stage roller transmission belt 3-3-7 can fine adjust the gap between the three rollers under an action of an own elastic force.

In an implementation of the present disclosure, the first transverse flexible conveyor belt 3-5 is located under the first longitudinal flexible conveyor belt 3-4 to convey potatoes falling from the first longitudinal flexible conveyor belt 3-4 to the second longitudinal flexible conveyor belt 3-6. This prevents the potatoes from directly falling from the first longitudinal flexible conveyor belt 3-4 to the second longitudinal flexible conveyor belt 3-6 to damage the potatoes.

In an implementation of the present disclosure, preferably, the second longitudinal flexible conveyor belt 3-6 is located under the first transverse flexible conveyor belt 3-5. The second longitudinal flexible conveyor belt 3-6 has a conveying direction opposite to a conveying direction of the first longitudinal flexible conveyor belt 3-4, and is configured to change a conveying direction of the potatoes. The third-stage three-layer potato-stem-soil separating roller 3-3 is provided on the second longitudinal flexible conveyor belt 3-6. The third-stage three-layer potato-stem-soil separating roller 3-3 is inclined at a front end of the second longitudinal flexible conveyor belt 3-6. This prevents the potatoes from falling when a large flow of the potatoes fall from the first transverse flexible conveyor belt 3-5 to the second longitudinal flexible conveyor belt 3-6.

Figure 27:
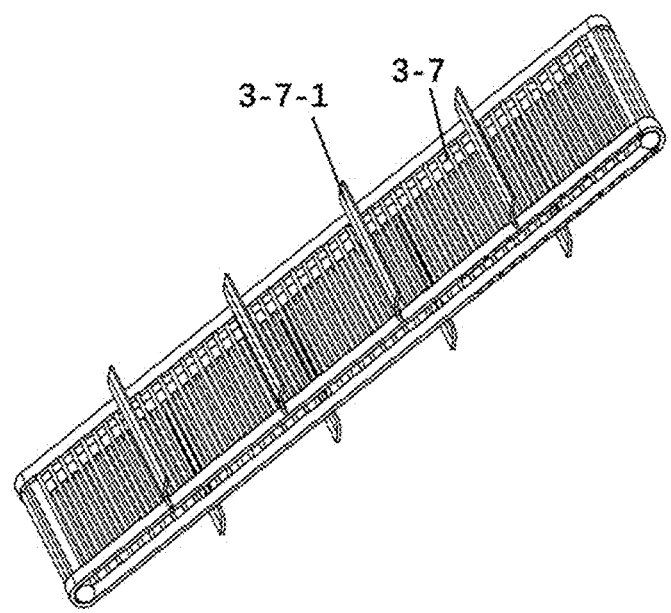
FIG. 27 is a schematic structural view of an elevation inclined conveyor belt according to an implementation of the present disclosure.

Referring to FIG. 27, in an implementation of the present disclosure, preferably, a plurality of arc-shaped scraping plates 3-7-1 are arranged on the elevation inclined conveyor belt 3-7. The arc-shaped scraping plates 3-7-1 each include one end connected to a main body of the conveyor belt, are formed into a bucket structure with a surface of the conveyor belt, and are configured to support the potatoes and convey the potatoes upward to the second transverse flexible conveyor belt 3-8. This prevents the potatoes from falling in upward conveyance to damage the potatoes.

Figure 28:
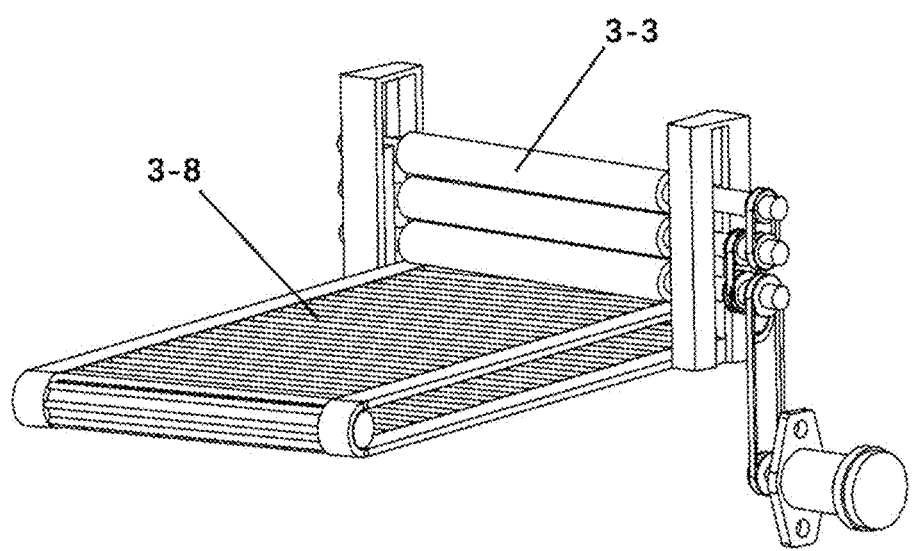
FIG. 28 is a schematic structural view of a second transverse flexible conveyor belt according to an implementation of the present disclosure.
Figure 29:
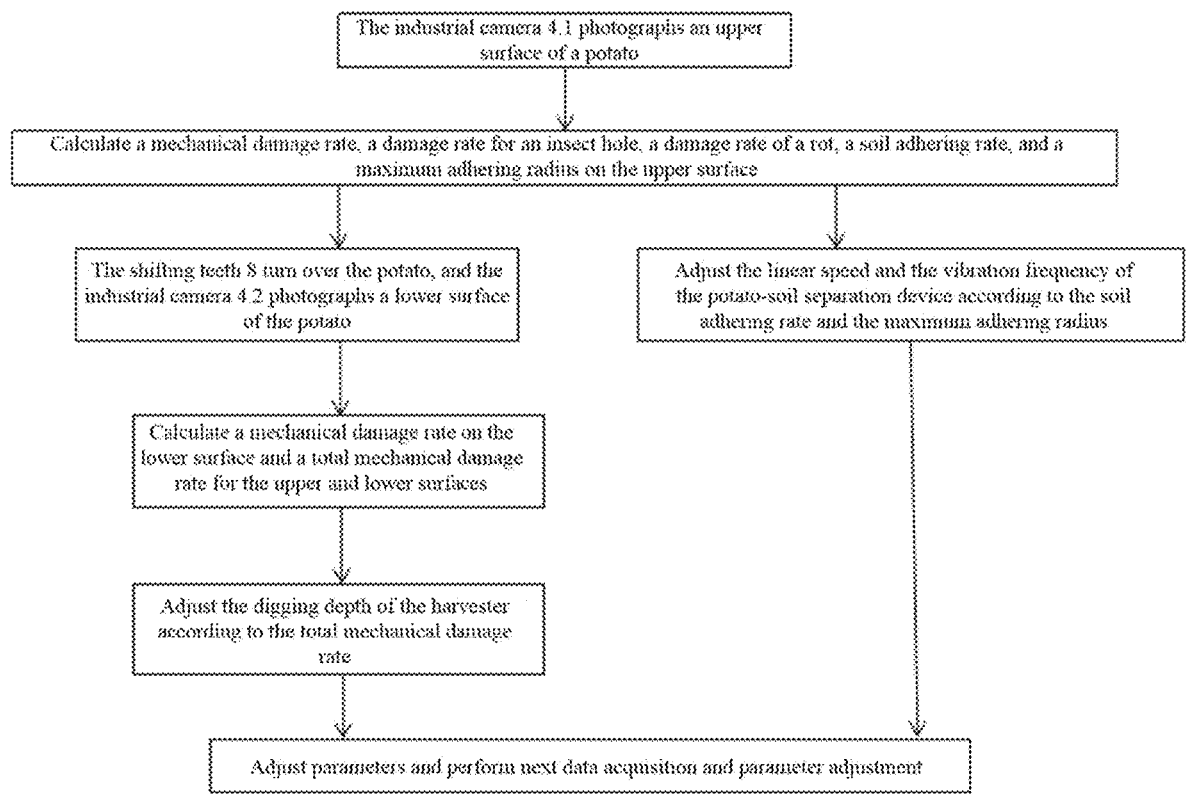
FIG. 29 illustrates a flowchart of a control method of a potato damage and surface soil adhesion monitoring system according to an implementation of the present disclosure.

Referring to FIG. 28, in an implementation of the present disclosure, preferably, the third-stage three-layer potato-stem-soil separating roller 3-3 is provided on the second transverse flexible conveyor belt 3-8. The third-stage three-layer potato-stem-soil separating roller 3-3 is inclined at a front end of the second transverse flexible conveyor belt 3-8. This not only can crush and shake off a part of the soil on the potatoes, but also can prevent the potatoes from falling when a large flow of the potatoes fall from the elevation inclined conveyor belt 3-7 to the second transverse flexible conveyor belt 3-8.

After the separation and elevation reversing device 3 is provided on the conveyance and separation device 2, and a large flow of the potato-soil mixture is conveyed and separated, a small part of the soil on the potatoes is shaken off, and a remaining part of the potato-soil mixture falls onto the first longitudinal flexible conveyor belt 3-4. This part of the potato-soil mixture is conveyed by the first longitudinal flexible conveyor belt 3-4 to the first-stage single-layer potato-stem-soil separating roller 3-1. Under an interaction between the first-stage roller body 3-1-1 and the first longitudinal flexible conveyor belt 3-4, soil lumps in one part of the potato-soil mixture are crushed and shaken off, stems are pulled off from the potatoes, and separated potatoes are collided with the first-stage roller body 3-1-1 to cause deflection in advancement and fall onto the first transverse flexible conveyor belt 3-5. The other part of the potato-soil mixture higher than the first-stage single-layer potato-stem-soil separating roller 3-1 climbs over the first-stage single-layer potato-stem-soil separating roller 3-1, and is conveyed by the first longitudinal flexible conveyor belt 3-4 to the second-stage double-layer potato-stem-soil separating roller 3-2. Under an interaction between the two second-stage roller bodies 3-2-1, and an interaction between the lower roller and the first longitudinal flexible conveyor belt 3-4, soil lumps in one part of the potato-soil mixture are crushed and shaken off, stems are pulled off from the potatoes, and separated potatoes are collided with the second-stage roller bodies 3-2-1 to cause deflection in advancement and fall onto the first transverse flexible conveyor belt 3-5. The other part of the potato-soil mixture higher than the second-stage double-layer potato-stem-soil separating roller 3-2 climbs over the second-stage double-layer potato-stem-soil separating roller 3-2, and is conveyed by the first longitudinal flexible conveyor belt 3-4 to the third-stage third-layer potato-stem-soil separating roller 3-3. Under an interaction between every two of the three third-stage roller bodies 3-3-1, and an interaction between the lower roller and the first longitudinal flexible conveyor belt 3-4, soil lumps in one part of the potato-soil mixture are crushed and shaken off, stems are pulled off from the potatoes, and separated potatoes are collided with the third-stage roller bodies 3-3-1 to cause deflection in advancement and fall onto the first transverse flexible conveyor belt 3-5. The first transverse flexible conveyor belt 3-5 is located between the first longitudinal flexible conveyor belt 3-4 and the second longitudinal flexible conveyor belt 3-6, and buffers the potatoes falling from the first longitudinal flexible conveyor belt 3-4 to the second longitudinal flexible conveyor belt 3-6, so as not to damage the potatoes when the potatoes directly fall from the first longitudinal flexible conveyor belt 3-4 onto the second longitudinal flexible conveyor belt 3-6. The potatoes falling onto the first transverse flexible conveyor belt 3-5 are conveyed by the conveyor belt to fall onto the second longitudinal flexible conveyor belt 3-6. A conveying direction of the potatoes falling onto the second longitudinal flexible conveyor belt 3-6 is opposite to a conveying direction of the first longitudinal flexible conveyor belt 3-4. The third-stage three-layer potato-stem-soil separating roller 3-3 is provided on the second longitudinal flexible conveyor belt 3-6. The third-stage three-layer potato-stem-soil separating roller 3-3 is located at the front end of the conveying direction of the second longitudinal flexible conveyor belt 3-6. When a large flow of the potatoes are conveyed from the first transverse flexible conveyor belt 3-5 to fall onto the second longitudinal flexible conveyor belt 3-6, under the interaction between every two of the three third-stage roller bodies 3-3-1, and the interaction between the lower roller and the second longitudinal flexible conveyor belt 3-6, not only can a part of the soil on the potatoes be crushed and shaken off, but also the potatoes do not fall off due to the large flow of the potatoes. Potatoes passing through the third-stage three-layer potato-stem-soil separating roller 3-3 are conveyed by the second longitudinal flexible conveyor belt 3-6 to fall onto the elevation inclined conveyor belt 3-7. The elevation inclined conveyor belt 3-7 is inclined at a certain angle relative to the second longitudinal flexible conveyor belt 3-6. While the conveying direction of the potatoes is changed, the potato combine harvester has a smaller footprint. The potatoes falling onto the elevation inclined conveyor belt 3-7 are supported by the arc-shaped scraping plates 3-7-1. This prevents the potatoes from falling off to damage the potatoes in upward conveyance. The potatoes are conveyed from a lower end of the elevation inclined conveyor belt 3-7 to an upper end of the elevation inclined conveyor belt 3-7 to fall onto the second transverse flexible conveyor belt 3-8. The potatoes falling onto the second transverse flexible conveyor belt 3-8 contact the third-stage three-layer potato-stem-soil separating roller 3-3 at a front end of the second transverse flexible conveyor belt 3-8. Under the interaction between every two of the three third-stage roller bodies 3-3-1, and the interaction between the lower roller and the second transverse flexible conveyor belt 3-8, a part of the soil on the potatoes is further crushed and shaken off. When a large flow of the potatoes fall from the elevation inclined conveyor belt 3-7 to the second transverse flexible conveyor belt 3-8, the third-stage three-layer potato-stem-soil separating roller 3-3 can prevent the potatoes from falling off due to the large flow. At last, the potatoes passing through the third-stage three-layer potato-stem-soil separating roller 3-3 are conveyed by the second transverse flexible conveyor belt 3-8 to the potato collection box 5.

In an implementation of the present disclosure, preferably, the separation and elevation reversing device 3 includes three stages of separating rollers. A first stage of separating roller to a third stage of separating roller are gradually higher from front to back. This can effectively shunt the large flow of potatoes, so as not to squeeze and damage the potatoes due to congestion. Through a gap between the rollers and between the roller and the conveyor belt, as well as a difference between linear velocities of two adjacent components, the soil on the potatoes is crushed, and the potatoes are separated from connected vines. The vines separated from the potatoes are not reversed for collision with the separating roller, but are rolled to a next stage of separating roller through the gap between the rollers and between the roller and the conveyor belt, as well as the difference between the linear velocities of the two adjacent components, and fall off from a tail of the conveyor belt. With a separating roller compressed spring, the separating roller moving downward for a large flow of the potatoes, a large soil lump and a large connecting force between the potatoes and the stems in actual operation can be elevated through an elevating roller mounting seat, the separating roller that moves downward is buffered, and the separating roller does not move downward all the time to damage the device. With a certain angle between the elevation inclined conveyor belt 3-7 and the second longitudinal flexible conveyor belt 3-6, not only can the potatoes be conveyed upward, but also the potato combine harvester has a smaller footprint. Both the second longitudinal flexible conveyor belt 3-6 and the second transverse flexible conveyor belt 3-8 function to change the conveying direction of the potatoes. The third-stage three-layer potato-stem-soil separating roller 3-3 on each of the second longitudinal flexible conveyor belt 3-6 and the second transverse flexible conveyor belt 3-8 can crush and shake off the soil on the potatoes again, and prevent the potatoes from falling off due to the large flow.

In an implementation of the present disclosure, the separation and elevation reversing device 3 is a staged floating multi-roller potato-stem-soil separation and elevation reversing device. With multiple stages of separating rollers, soil on dug potatoes can be removed, and the potatoes are separated from vines. The multiple stages of separating rollers are gradually higher from front to back, such that a large flow of the potatoes can be effectively shunted, and the potatoes are not damaged for congestion. With a separating roller compressed spring, the separating roller moving downward for a large flow of the potatoes, a large soil lump and a large connecting force between the potatoes and the stems in actual operation can be elevated through an elevating roller mounting seat, the separating roller that moves downward is buffered, and the separating roller does not move downward all the time to damage the device. The staged floating multi-roller potato-stem-soil separation and elevation reversing device can further convert the conveying direction of the potatoes. This greatly improves working efficiency and working performance of the potato combine harvester. With a certain angle between the elevation inclined conveyor belt and the transverse flexible conveyor belt, not only can the conveying direction of the potatoes be changed, and the potatoes be elevated upward, but also the potato combine harvester has a smaller footprint. The arc-shaped scraping plates can support the upward conveyed potatoes, and prevent the potatoes from falling off due to a large inclination angle in upward conveyance. The third-stage three-layer potato-stem-soil separating roller is provided at the front end of the conveying direction of each of the first longitudinal flexible conveyor belt and the second transverse flexible conveyor belt. This prevents the large flow of the potatoes from falling onto the conveyor belt.

Referring to FIG. 29 to FIG. 39, the monitoring device 4 is configured to capture a potato image before the potatoes enter the potato collection box 5, and feed the image back to the control unit. The control unit recognizes a boundary of a potato body, a boundary of a damage part and a boundary of adhered soil for each of the potatoes according to the potato image, and calculates a damage rate and a soil adhering rate of the potato. The damage part includes a mechanical damage part. When recognizing that a mechanical damage rate of the potato is greater than a preset value, the control unit feeds data back to an operator, to adjust the digging depth of the digging device 1. When recognizing that the soil adhering rate of the potato is greater than a preset value, the control unit feeds data back to the operator, to adjust a linear speed and a vibration frequency of the conveyance and separation device 2 of the potato combine harvester.

In an implementation of the present disclosure, the monitoring device 4 is provided above the tail segment of the separation conveyor chain of the separation and elevation reversing device 3, and can monitor a damage and a cleanliness of the potato before the potato enters the potato collection box 5, and feed the damage and the cleanliness back to the operator. In conjunction with a feedback condition, the operator adjusts working parameters of the digging device and the conveyance and separation device.

Figure 30:
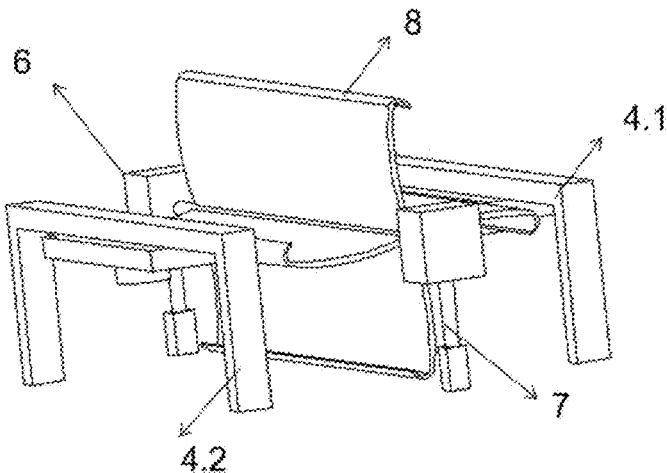
FIG. 30 is a schematic structural view of a shifting tooth device according to an implementation of the present disclosure.

Referring to FIG. 30, in an implementation of the present disclosure, the monitoring device 4 includes a first industrial camera 4.1 and a second industrial camera 4.2. The first industrial camera 4.1 is configured to capture an upper surface image of the potato. The second industrial camera 4.2 is configured to capture a lower surface image of the potato. The high-efficiency and low-damage potato combine harvester further includes a turn-over mechanism. The turn-over device is configured to turn over the potato, such that the monitoring device 4 can capture the upper surface image and the lower surface image of the potato, and transmit the upper surface image and the lower surface image to the control unit. The control unit takes a sum of damage rates in the upper surface image and the lower surface image as the damage rate of the single potato, thereby making the damage rate detected more accurately.

Figure 31:
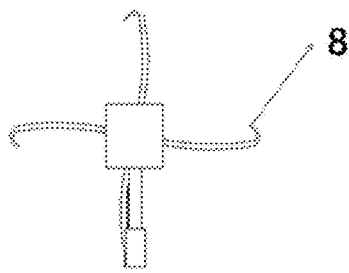
FIG. 31 is an enlarged view of an end surface of a shifting tooth according to an implementation of the present disclosure.

Referring to FIG. 30 and FIG. 31, in an implementation of the present disclosure, the turn-over device includes a motor 6, an electric cylinder 7, and a shifting tooth mechanism 8. The shifting tooth mechanism 8 includes a rotating shaft. A plurality of shifting teeth are provided on the rotating shaft. The motor 6 is connected to the rotating shaft, and configured to drive the rotating shaft to rotate. The electric cylinder 7 is connected to the motor 6, and configured to drive the motor 6, thereby driving the shifting tooth mechanism 8 to move up and down. The motor 6 and the electric cylinder 7 are connected to the control unit.

Figure 32:
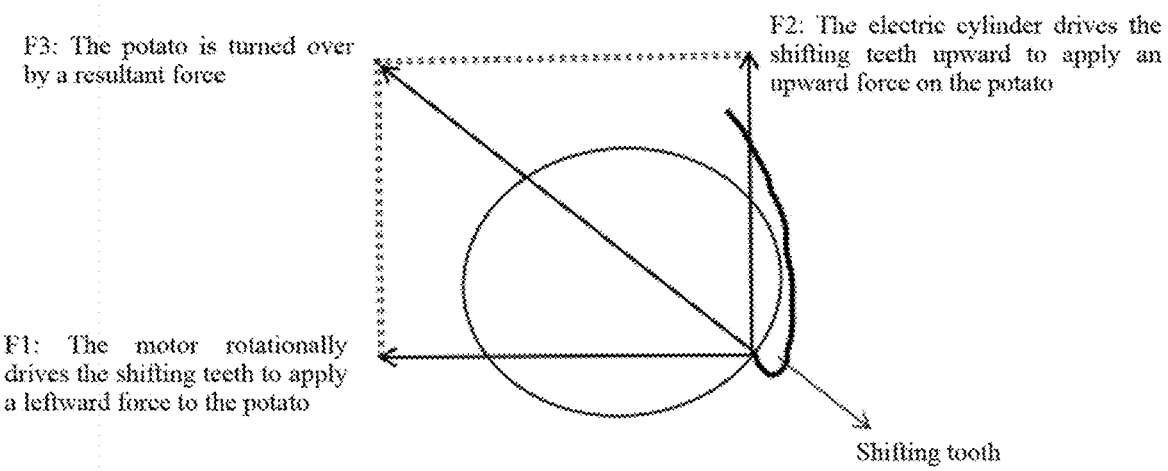
FIG. 32 is a schematic view of a stress on an overturned surface of a potato according to an implementation of the present disclosure.

Referring to FIG. 32, after the industrial camera 4 photographs a damage on an upper surface of the potato, the potato is turned over under an action of the rotary shifting tooth mechanism 8. The motor 6 drives the shifting teeth to rotate. The shifting tooth mechanism 8 applies a leftward force F1 to the potato. In the meantime, the electric cylinder 7 is extended upward, thereby driving the shifting tooth mechanism 8 to move upward. The shifting tooth mechanism 8 applies an upward force F2 to the potato. With a resultant force F3 for the two forces, the potato is turned over. Thereafter, the industrial camera 4 photographs a damage on a lower surface of the potato. Therefore, a total damage rate for the upper and lower surfaces of the potato is calculated. An end of the shifting tooth mechanism 8 is an arc-shaped smooth surface, so as not to damage the potato in the turn-over process. The electric cylinder 7 is restored after extended, to turn over a next batch of potatoes.

The electric cylinder 7 and the motor 6 drive the shifting tooth mechanism 8 to turn over the potato, and the monitoring device 4 captures damage images for the upper and lower surfaces of the potato. This makes the damage rate detected more accurately, and solves the problem of a conventional method that can only detect a single surface.

In an implementation of the present disclosure, a damage type of the potato includes the mechanical damage, an insect hole, and a rot.

In an implementation of the present disclosure, the damage type of the potato can be determined by machine vision with a Bayes classifier. For a specific method, refer to Application of Bayes Classifier in External Quality Detection of Potatoes.

In an implementation of the present disclosure, the mechanical damage of the potato can be detected by deep learning. For a specific method, refer to Research on Application of Potato Mechanical Damage Detection Method based on Deep Learning. In an implementation of the present disclosure, the deep learning can also detect the insect hole and the rot of the potato by training sample images including the insect hole and rot of the potato.

In an implementation of the present disclosure, the machine vision with the Bayes classifier is used as an example for description. A potato external-quality Bayes classifier prediction model is established. Specifically, images including the insect hole, the mechanical damage and the rot are acquired by the machine vision. Feature data in the color images of the potatoes is extracted, and the prediction model on different external qualities of the potatoes is established. Feature information is acquired from the color images of the potatoes, extracted data is smoothed, and the prediction model is established with the Bayes classifier. A prediction result on a damage of the potato is output.

The process includes: a potato sample, feature extraction, selection of a training set and a prediction set, establishment of the prediction model, and output of results from the prediction model to form a prediction set. In an implementation of the present disclosure, for the potato image captured by the first industrial camera 4.1 and the second industrial camera 4.2 of the monitoring device 4, the control unit determines a type of a potato damage through the potato external-quality Bayes classifier prediction model, performs boundary segmentation through an HSV color space, and performs, according to preset color thresholds for a potato body, a damage part and adhered soil of each of potatoes, colorization and color differentiation on the potato body, the damage part and the adhered soil in the potato image captured by the monitoring device 4. Upon completion of the color differentiation, a soil enclosure, a potato body enclosure, and a damage part enclosure are obtained according to a color distribution and boundaries of different colors, and a damage rate and a soil adhering rate of the single potato are calculated. The damage rate of the single potato is calculated with a coordinate filling method and/or an integral method. The soil adhering rate of the single potato is calculated with an integral method.

In an implementation of the present disclosure, preferably, the coordinate filling method and the integral method are respectively used to calculate the damage rate of the single potato, and an average of the two methods is taken as a final damage rate of the single potato.

In an implementation of the present disclosure, preferably, the control unit recognizes an average damage rate, obtained by dividing a total number of potatoes in the image from a sum of damage rates for a plurality of the damaged potatoes in the potato image captured by the monitoring device 4, as a damage rate for the plurality of the potatoes in the image.

In an implementation of the present disclosure, preferably, the damage part of the potato further includes one or more of the insect hole and the rot. The damage rate of the single potato includes a sum of one or more of a damage rate of the mechanical damage, a damage rate of the insect hole, and a damage rate of the rot. The control unit calculates a total damage rate for the mechanical damage, the insect hole and the rot, and displays the total damage rate through a display device. Therefore, not only the damage rate of the mechanical damage for the potato, but also the damage rate of the insect hole and the damage rate of the rot for the potato, can be known, thereby knowing a quality of the potato to provide a reference for next planting. For example, a high rate of the insect hole can make farmers know whether a dosage of an insecticide is to be increased in next year. The detection on the whole damage rate can further facilitate subsequent prediction on application of the potatoes. The potatoes with a high total damage rate can be used to prepare industrial starch. The potatoes with a low total damage rate can be used to prepare food.

According to the embodiment, preferably, the control unit segments each of the soil enclosure and the potato body enclosure into an upper portion and a lower portion with a coordinate system, and performs function fitting on a boundary line of the upper portion and a boundary line of the lower portion. By integrating a function, areas of the two enclosures are calculated. The soil adhering rate of the single potato is obtained by subtracting the area of the potato body enclosure from the area of the soil enclosure and then dividing the area of the potato body enclosure. A maximum adhering distance for the soil of the potato is calculated. In the potato image captured by the monitoring device 4, by dividing a total number of potatoes in the image from a sum of soil adhering rates for a plurality of the potatoes in the image, the soil adhering rate of the potato is obtained. By dividing a total number of potatoes from a sum of maximum soil adhering distances for a plurality of the potatoes, the maximum adhering distance for the soil of the potato is obtained. When the soil adhering rate of the potato is greater than the preset value, the data is fed back. In combination with the soil adhering rate of the potato and the maximum adhering distance for the soil of the potato, the linear speed and the vibration frequency of the conveyance and separation device 2 of the potato combine harvester are adjusted.

A control method of a potato damage and surface soil adhesion monitoring system includes the following steps.

The first industrial camera 4.1 captures an upper surface image of a potato before the potato enters the potato collection box 5, and feeds the upper surface image back to the control unit.

The control unit recognizes a boundary of a potato body, a boundary of a damage part and a boundary of adhered soil for the potato according to the upper surface image of the potato, and calculates a damage rate and a soil adhering rate for an upper surface of the potato.

The shifting tooth mechanism 8 turns over the potato. The second industrial camera 4.2 captures a lower surface image of the potato before the potato enters the potato collection box 5, and feeds the lower surface image back to the control unit.

The control unit recognizes a boundary of a potato body, a boundary of a damage part and a boundary of adhered soil for the potato according to the lower surface image of the potato, and calculates a damage rate for a lower surface of the potato.

The damage part includes a mechanical damage part. When recognizing that a total mechanical damage rate for the upper and lower surfaces of the potato is greater than a preset value, the control unit feeds data back, such that the digging depth of the digging device 1 is adjusted according to reference data.

When recognizing that a total soil adhering rate of the potato is greater than a preset value, the control unit feeds data back. In combination with the soil adhering rate of the potato and the maximum adhering distance for the soil of the potato, the linear speed and the vibration frequency of the conveyance and separation device 2 of the potato combine harvester are adjusted.

In an implementation of the present disclosure, preferably, the maximum adhering distance for the soil of the potato is obtained as follows.

After photographing a potato and adhered soil thereof, the first industrial camera 4.1 recognizes boundary coordinates. A longitudinal maximum distance and a transverse maximum distance of the potato are labeled. With an intersection as a center, and a half of the longitudinal or transverse maximum distance as a radius $r_1$, an auxiliary circle is drawn. A maximum radius r from a boundary of the adhered soil to a centerpoint is labeled, and $r-r_1$ is labeled as a maximum adhering distance of the adhered soil.

In an implementation of the present disclosure, preferably, in combination with the surface soil adhering rate of the potato and the maximum adhering distance for the soil of the potato, the linear speed and the vibration frequency of the conveyance and separation device 2 of the potato combine harvester are specifically adjusted as follows.

If the surface soil adhering rate $R_f > m$, and the maximum adhering distance $r-r_1 > k$, both the linear speed and the vibration frequency of the potato-soil separation device are increased.

If the surface soil adhering rate $R_f > m$, and the maximum adhering distance $r-r_1 < k$, only the vibration frequency is increased.

If the surface soil adhering rate $R_f < m$, and the maximum adhering distance $r-r_1 > k$, both the linear speed of the potato-soil separation device is increased.

If the surface soil adhering rate $R_f < m$, and the maximum adhering distance $r-r_1 < k$, no adjustment is made.

Herein, m and k are respectively a preset critical value of the adhering rate and a preset critical value of the adhering radius, and are determined according to a potato variety and a harvesting environment.

In a specific implementation of the present disclosure, the monitoring device 4 extracts information of the potato image through machine vision, and recognizes boundaries for a potato body, an insect hole, a mechanical damage, and a rot. A damage rate of the potato is calculated with a coordinate filling method and an integral method. An average of the two methods is taken as a final damage rate of the potato and displayed in a display device. A soil adhering rate of the potato is calculated with an integral method. In combination with a maximum adhering radius of the potato, working parameters in potato-soil separation of the potato are adjusted to realize high-efficiency harvesting.

In a specific implementation of the present disclosure, a damage of the potato includes a mechanical damage, an insect hole and a rot. With the machine vision, not only can a damaged potato be recognized, but also the damage rate and the soil adhering rate of the potato can be calculated through the control unit. All results are displayed in real time, to facilitate timely adjustment of the operator on working parameters, ensure a harvesting efficiency, and know quality of the potato.

Figure 33:
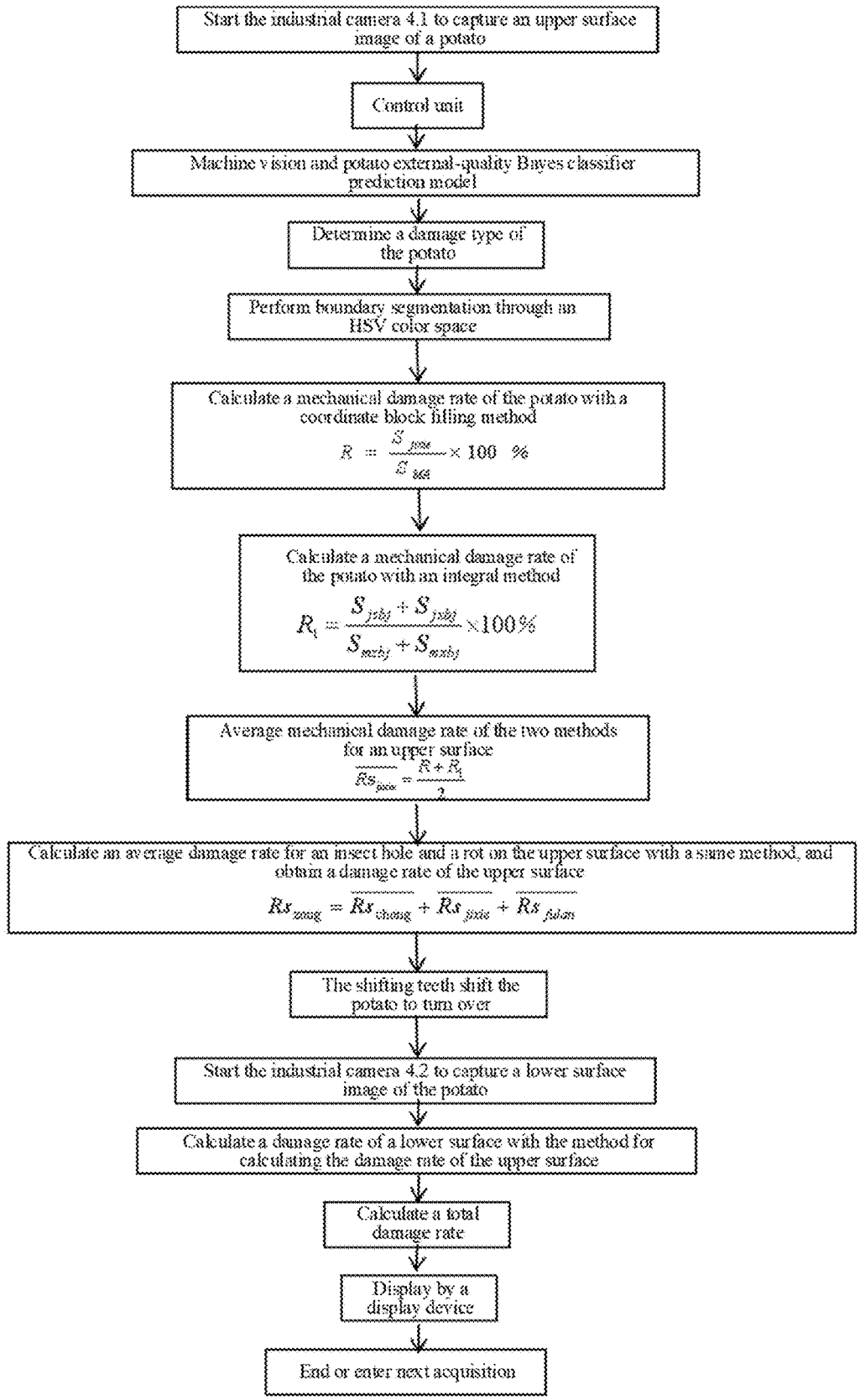
FIG. 33 illustrates a flowchart of detection on a damage rate of a potato according to an implementation of the present disclosure.

Referring to FIG. 33, in a specific implementation of the present disclosure, the first industrial camera 4.1 captures an upper surface image of a potato, and transmits the image to the control unit. After a damage type of the potato is determined with the potato external-quality Bayes classifier prediction model, the control unit performs colorization and color differentiation on a potato boundary, a damage and adhered soil through an HSV space according to preset color thresholds. Specifically:

The image is segmented with a gray threshold segmentation method. Actually, the segmentation method refers to a transformation of an input image f to an output image:

$$g(x, y) = \begin{cases} 1, & T_1 \le f(x, y) \le T_2, \text{ yellow} \\ 2, & f(x, y) < T_1, \text{ green} \\ 0, & f(x, y) > T_2, \text{ black} \end{cases}$$

where, $T_1$ is a threshold for the potato boundary and the damage boundary; $T_2$ is a threshold for the potato boundary and the adhered soil boundary; for an image element of the potato boundary, $g(x, y)=1$, which corresponds to yellow; for an image element of the damage boundary, $g(x,y)=2$, which corresponds to green; and for an image element of the adhered soil boundary, $g(x,y)=0$, which corresponds to black. The color herein can be preset according to an actual condition.

Figure 34:
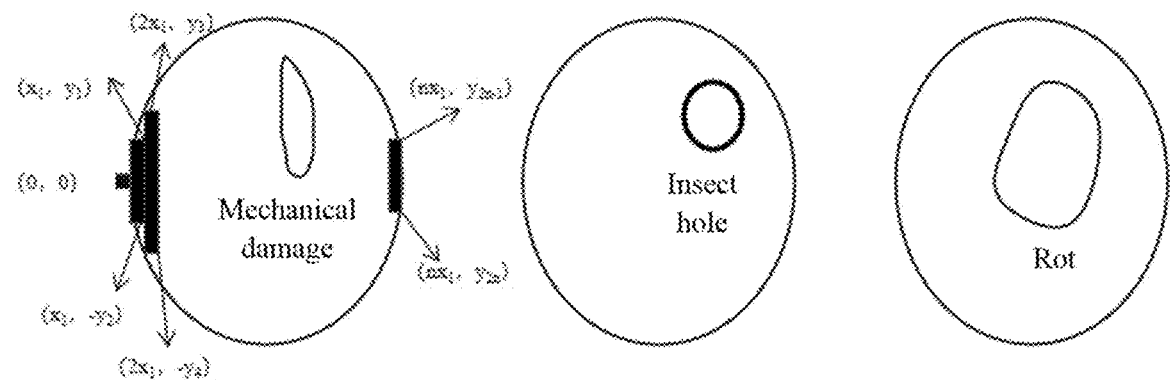
FIG. 34 illustrates a damage part of a potato according to an implementation of the present disclosure.

Referring to FIG. 34, upon completion of the color segmentation on the image and the color differentiation, a soil enclosure, a potato body enclosure, and a damage part enclosure can be obtained according to a color distribution and boundaries of different colors. A total area of the potato and an area of a damage part are calculated by translating a coordinate area block, thereby calculating a damage rate. Specifically:

After an upper surface and a damaged boundary of the potato are recognized by the machine vision, the control system calculates their areas through the coordinate area block. With a mechanical damage type potato as an example, from a left coordinate (0,0), an X-coordinate is increased by $x_1$, $x_1$ is a length of a coordinate block for calculating an area of the potato, and refers to rightward translation. Upper and lower limits of a Y-coordinate are determined according to a boundary of the recognized potato. As shown in FIG. 34, a second coordinate area block has an upper coordinate ($x_1$, $y_1$), and a lower coordinate ($x_1$, $-y_2$). The coordinate block is filled sequentially rightward, until the potato is filled completely. A right coordinate block has an upper coordinate ($nx_1$, $-y'_{2n-1}$), and a lower coordinate ($nx_1$, $-y_{2n}$), $y_{2n-1}$ and $-y_{2n}$ respectively representing an upper coordinate and a lower coordinate on a y-axis corresponding to an nth coordinate block when the area of the potato is filled. Therefore, a total area of a potato domain under the machine vision is given by:

$$S_{MA}=x_1(y_1+y_2)+x_1(y_3+y_4)+ \ldots +x_1(y_{2n-1}+y_{2n}).$$

where, n represents a number of filled blocks, and actually is relevant to a total length of the potato in an x-direction; and n is generally $$\frac{\text{total length of the potato in } X \text{ direction}}{x_1},$$

and is rounded up to an integer.

An area of a mechanical damage domain is calculated with the same method. An area of a mechanical damage domain is calculated with the same method. Assuming that a coordinate block for calculating the area of the mechanical damage domain has a length of $x_2$. From a left coordinate (0, 0), an X-coordinate is increased by $x_2$, and translated rightward. Upper and lower limits of a Y-coordinate are determined according to a boundary of the recognized mechanical damage domain. Upon translation, a second coordinate area block has an upper coordinate ($x_2$, $y'_1$), and a lower coordinate ($x_2$, $-y'_2$). The coordinate block is filled sequentially rightward, until the mechanical damage domain is filled completely. A right coordinate block has an upper coordinate ($nx_2$, $-y'_{2n-1}$), and a lower coordinate ($nx_2$, $-y'_{2n}$). Therefore, the area of the mechanical damage domain is given by:

$$S_{jixie}=x_2(y'_1+y'_2)+x_2(y'_3+y'_4)+ \ldots +x_2(y'_{2n-1}+y'_{2n}).$$

where, n represents a number of filled blocks, and actually is relevant to a total length of the mechanical damage domain in an x-direction; n is generally $$\frac{\text{total length of mechanical damage in } X \text{ direction}}{x_2},$$

and is rounded up to an integer; and x2 is a length of a coordinate block for calculating the area of the mechanical damage domain.

Therefore, a damage rate of the potato under the mechanical damage is calculated by:

$$R = \frac{S_{jixie}}{S_{MA}} \times 100\%.$$

In a specific implementation of the present disclosure, a damage rate of the potato under the insect hole and a rate under the rot can also be calculated with the method for calculating the rate under the mechanical damage.

Figure 35:
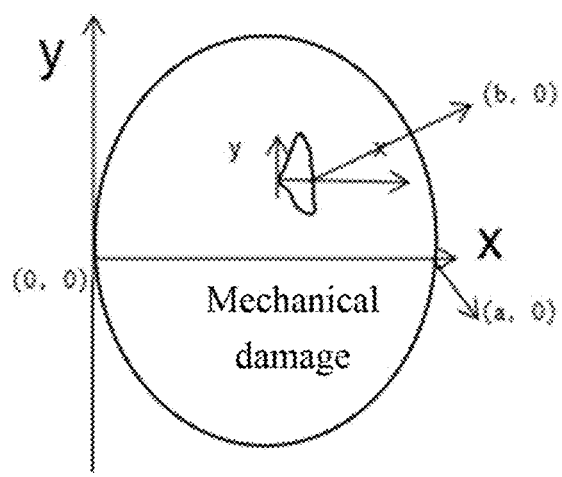
FIG. 35 illustrates calculation on a mechanical damage rate of a potato according to an implementation of the present disclosure.

In a specific implementation of the present disclosure, referring to FIG. 35, for the sake of a more accurate calculated damage rate, the damage rate is calculated with the coordinate block area method and the integral method. Specifically:

The mechanical damage type potato is also used as an example for calculation. An upper surface of a boundary of the potato and an upper surface of a boundary of the mechanical damage are extracted through the machine vision of the monitoring device 4. A coordinate of each boundary is captured by the control unit. The coordinate divides the boundary of the potato into upper and lower portions. With the upper portion as an example for calculation, a storage module of the control module stores the coordinate for the boundary of the potato. A right boundary of the potato has a coordinate (a, 0), and a right boundary of the mechanical damage domain has a coordinate (b, 0). A damage rate of the potato is calculated as follows.

The storage module of the control unit stores the coordinate for the boundary of the potato.

A fitting function is called to perform function fitting on an upper boundary of the potato, and the upper boundary of the potato is given by a function $f_1(x)$.

An integral function is called to calculate an area for the upper boundary of the potato by $S_{msbj}=\int_0^a f_1(x)dx$.

The storage module of the control unit stores the coordinate for the boundary of the mechanical damage domain.

The control unit calls a fitting function to perform function fitting on an upper boundary of the mechanical damage domain, and an upper boundary of the mechanical damage domain is given by a function $f_3(x)$.

An integral function is called to calculate an area for the upper boundary of the mechanical damage domain by $$S_{jsbj} = \int_0^b f_3(x)dx.$$

An area for a lower boundary of the mechanical damage domain is calculated with a method same as the method for the upper boundary by $$S_{jxbj} = \left|\int_0^b f_4(x)dx\right|.$$

A damage rate for the upper surface of the potato is calculated by $$R_1 = \frac{S_{jsbj} + S_{jxbj}}{S_{msbj} + S_{mxbj}} \times 100\%.$$

A mechanical damage rate for the upper surface of the potato is calculated with two method, namely $$\overline{Rs_{jixie}} = \frac{R + R_1}{2}.$$

$\overline{Rs_{chong}}$ and $\overline{Rs_{fulan}}$ are obtained.

A total damage rate for the upper surface of the potato is obtained by $\underline{Rs_{zong}}=\overline{Rs_{chong}}+\overline{Rs_{jixie}}+\overline{Rs_{fulan}}$.

Herein. $\overline{Rs_{chong}}$ is a damage rate of an insect hole on the upper surface of the potato, and $\overline{Rs_{fulan}}$ is a damage rate of a rot on the upper surface of the potato.

In a specific implementation of the present disclosure, a damage rate for a lower surface of the potato is calculated with a method same as the method for calculating the damage rate for the upper surface of the potato:

After the potato is turned over by the shifting tooth mechanism 8, the first industrial camera 4.1 photographs a lower surface of the boundary of the potato and a lower surface of the boundary of the mechanical damage.

A mechanical damage rate for the lower surface of the potato is obtained by $\overline{Rx_{jixie}}$.

A total mechanical damage rate of the potato is obtained by $\overline{Rx_{jixie}}+\overline{Rs_{jixie}}$.

A damage rate for the lower surface of the potato is obtained by $\overline{Rx_{zong}}=\overline{Rx_{chong}}+\overline{Rx_{jixie}}+\overline{Rx_{fulan}}$.

A total damage rate of the potato is obtained by $R_{zong}=Rx_{zong}++Rs_{zong}$.

$\overline{Rx_{chong}}$ is a damage rate of an insect hole on the lower surface of the potato, $\overline{Rx_{fulan}}$ is a damage rate of a rot on the lower surface of the potato. $\overline{Rx_{jixie}}$ is the mechanical damage rate for the lower surface of the potato, and $Rx_{zong}$ is the total damage rate for the lower surface of the potato.

Figure 36:
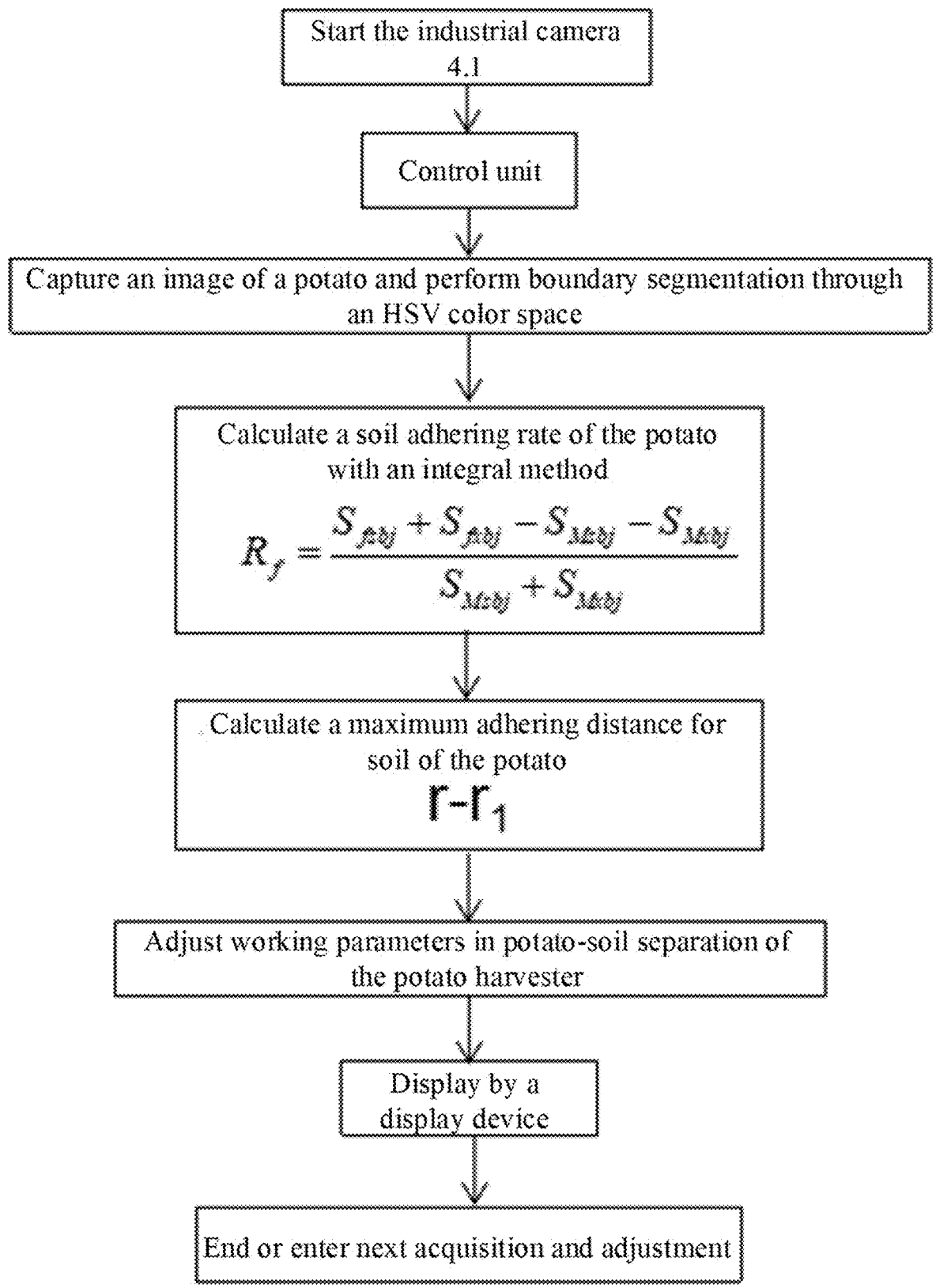
FIG. 36 illustrates a flowchart of detection on a soil adhering rate of a potato according to an implementation of the present disclosure.
Figure 37:
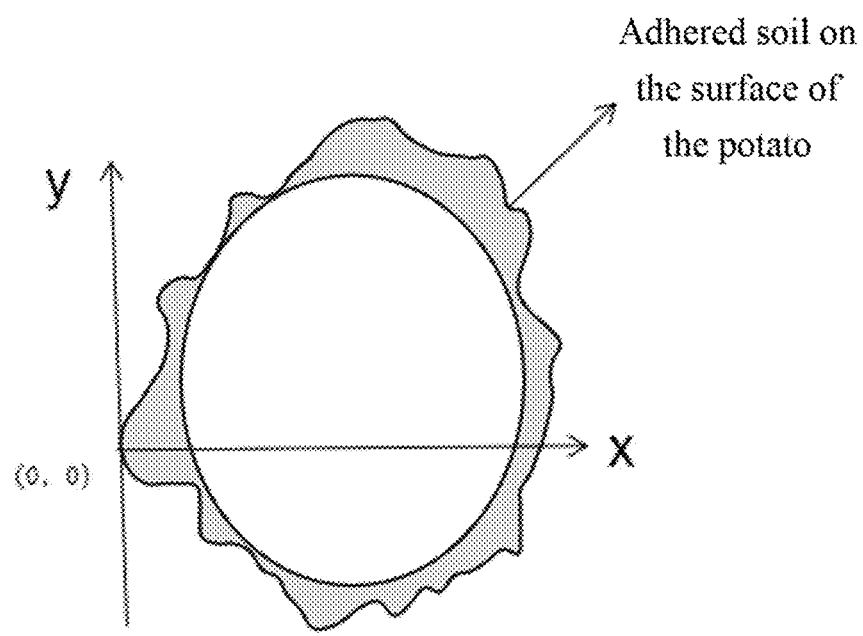
FIG. 37 illustrates calculation on a soil adhering rate of a potato according to an implementation of the present disclosure.

In a specific implementation of the present disclosure, referring to FIG. 36 and FIG. 37, the adhered soil on the surface of the potato is monitored as follows:

According to the solution in the integral method for calculating the damage rate of the potato, a surface soil adhering rate of the potato is calculated. An image of the potato is captured through the machine vision of the monitoring device 4. A potato with adhered soil is automatically classified through the prediction module. Upon completion of color segmentation on the image, a boundary of the potato and the adhered soil form two enclosures, which are yellow and black. A coordinate of the boundary is captured by the control unit. The coordinate divides the boundary of the potato as well as the adhered soil into upper and lower portions. With the upper portion as an example for calculation, a storage module of the control unit stores the coordinate for the boundary of the potato. A right boundary of the potato has a coordinate (a, 0), and a left boundary has a coordinate (e, 0). A right boundary of the soil has a coordinate (d, 0). The surface soil adhering rate of the potato is calculated as follows:

The storage module of the control unit stores the coordinate for the boundary of the potato.

The control unit calls a fitting function to perform function fitting on an upper boundary of the potato, and the upper boundary of the potato is given by a function $f_5(x)$.

An integral function is called to calculate an area for the upper boundary of the potato by $$S_{Msbj} = \int_e^c f_5(x)dx.$$

An area for a lower boundary of the potato is calculated with a method same as the method for the upper boundary by $$S_{Mxbj} = \left|\int_e^c f_6(x)dx\right|.$$

The storage module of the control unit stores a coordinate for a boundary of the adhered soil.

A fitting function is called to perform function fitting on an upper boundary of the adhered soil, and the upper boundary of the adhered soil is given by a function $f_7(x)$.

An integral function is called to calculate an area for the upper boundary of the adhered soil by $$S_{fsbj} = \int_0^d f_7(x)dx.$$

An area for a lower boundary of the adhered soil is calculated with a method same as the method for the upper boundary by $$S_{fxbj} = \left| \int_0^d f_8(x)dx \right|.$$

The surface soil adhering rate of the potato is calculated by $$R_f = \frac{s_{fsbj} + s_{fxbj} - s_{Msbj} - s_{Mxbj}}{s_{Msbj} + s_{Mxbj}}.$$

In an implementation of the present disclosure, in order to better know the surface soil adhesion of the potato, the soil adhering rate on the surface of the potato that is calculated with the integral method, and a soil adhering radius r are jointly used to indicate the adhesion of the soil on the surface of the potato. By adjusting working parameters of the potato-soil separation device 2, a desirable harvesting effect is ensured. The soil adhering rate of the potato is calculated only by the front first industrial camera 4.1. However, due to scattering of the soil in turnover, inaccurate data is caused.

Figure 38:
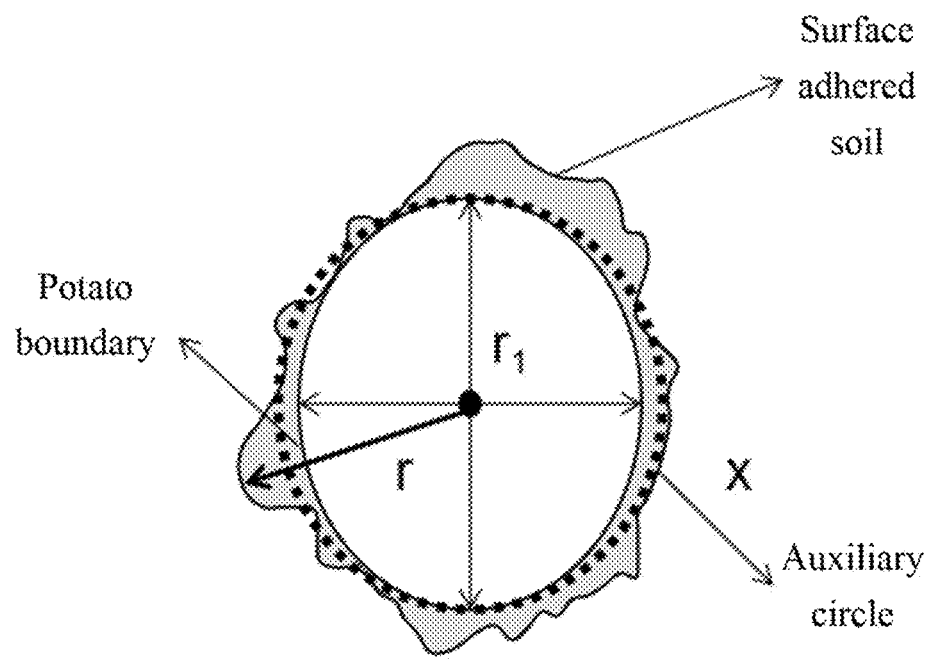
FIG. 38 illustrates calculation on a maximum adhering distance of adhered soil of a potato according to an implementation of the present disclosure.

In a specific implementation of the present disclosure, referring to FIG. 38, a following method is provided.

After a potato and adhered soil thereof are photographed, boundary coordinates are recognized by the machine vision of the monitoring device 4. A longitudinal maximum distance and a transverse maximum distance of the potato are labeled. With an intersection as a center, and a half of the longitudinal or transverse maximum distance as a radius $r_1$, an auxiliary circle is drawn. A maximum radius r from a boundary of the adhered soil to a centerpoint is labeled, and $r-r_1$ is labeled as a maximum adhering distance of the adhered soil. Parameters of the potato-soil separation device of the potato combine harvester, including the linear speed and the vibration frequency of the potato-soil separation device 2, are adjusted. In an implementation of the present disclosure, an adjustment process is as shown in Table 1.

TABLE 1

| Parameter adjustment of the potato-soil separation device | | |
|---|---|---|
| Surface soil adhering rate | Maximum adhering distance | Parameter adjustment of the potato-soil separation device |
| $R_f > m$ | $r - r_1 > k$ | Both the linear speed and the vibration frequency of the potato-soil separation device are increased |
| $R_f > m$ | $r - r_1 < k$ | Only the vibration frequency is increased |
| $R_f < m$ | $r - r_1 > k$ | Only the linear speed of the potato-soil separation device is increased |
| $R_f \leq m$ | $r - r_1 \leq k$ | No adjustment |

Herein, m and k are respectively a preset critical value of the adhering rate and a preset critical value of the adhering radius, and are determined according to a potato variety and a harvesting environment. The adhering radius and the adhering rate for the soil of the potato may only depend on calculation of the upper surface.

Figure 39:
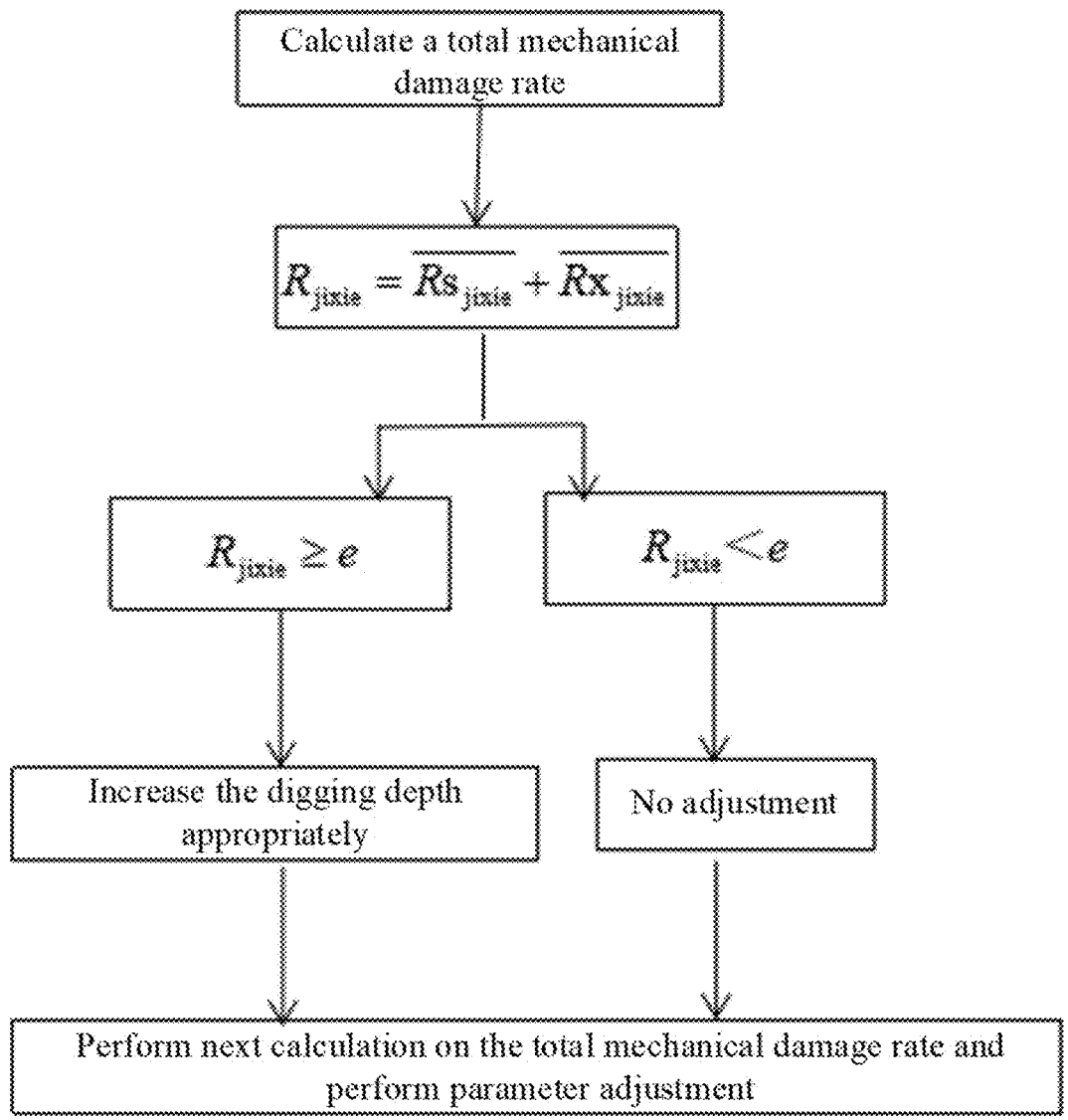
FIG. 39 illustrates a flowchart for adjusting a digging depth based on a mechanical damage extent of a potato according to an implementation of the present disclosure.
Figure 40:
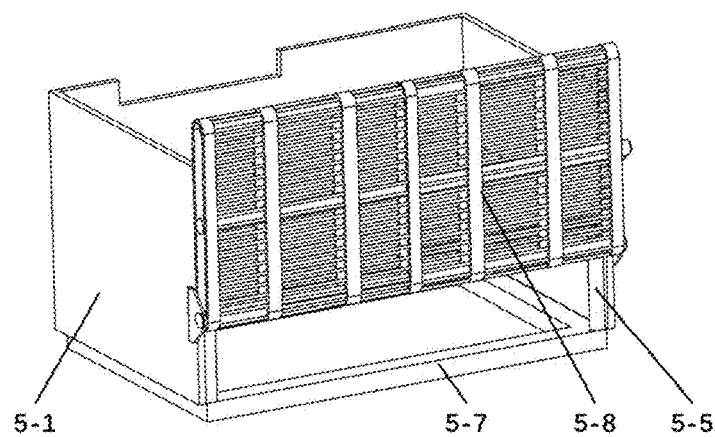
FIG. 40 is a schematic structural view of a potato collection box (in a closed state) according to an implementation of the present disclosure.
Figure 41:
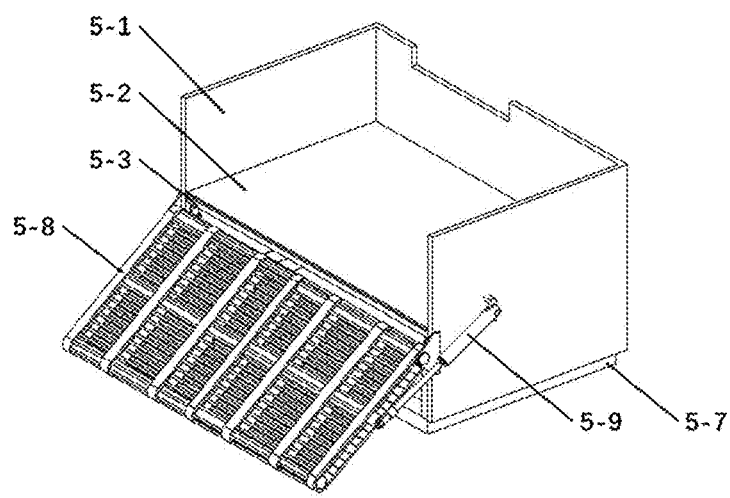
FIG. 41 is a schematic structural view of a potato collection box (in an open state) according to an implementation of the present disclosure.
Figure 42:
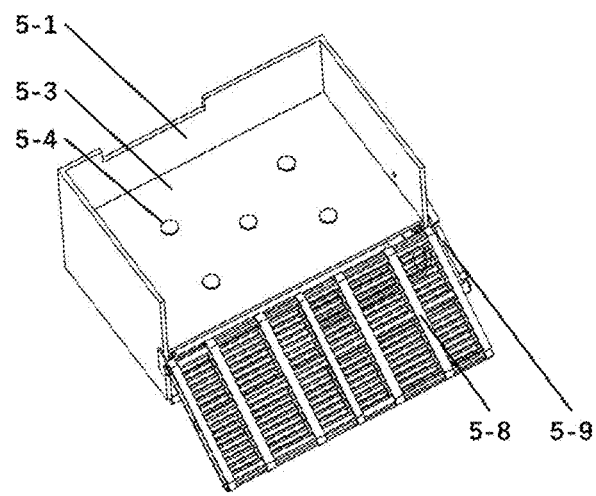
FIG. 42 is a schematic structural view of a potato collection box (a supporting plate is not shown) according to an implementation of the present disclosure.
Figure 43:
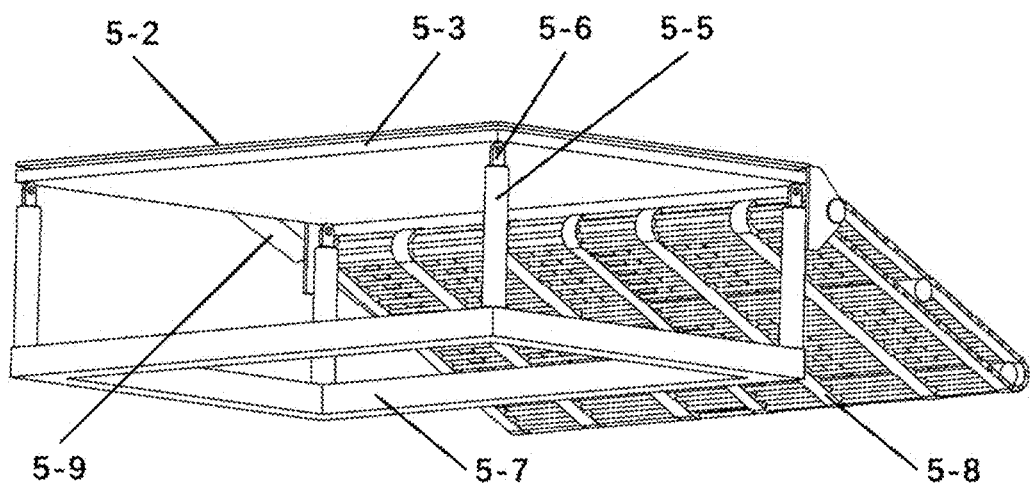
FIG. 43 is a schematic structural view of a potato collection box (a bottom lifting device) according to an implementation of the present disclosure.

In an implementation of the present disclosure, referring to FIG. 39, in case of a high damage rate of the potato, data can be fed back to the operator, to timely adjust the digging depth of the potato, and reduce a human controllable mechanical damage rate.

The total mechanical damage rate of the potato is calculated by:

$$R_{jixie} = \overline{Rs}_{jixie} + \overline{Rx}_{jixie}$$

$R_{jixie}$ is the total mechanical damage rate for the upper and lower surfaces of the potato.

In an implementation of the present disclosure, referring to Table 2, if $R_{jixie} \geq e$, the digging depth can be increased appropriately, thereby reducing the mechanical damage rate of the potato.

TABLE 2

| Digging depth adjusted damage rate | Adjustment on digging depth of the potato |
|---|---|
| $R_{jixie} \geq e$ | The digging depth is increased appropriately |
| $R_{jixie} < e$ | No adjustment |

Herein, e is a critical value for the total mechanical damage rate, and can be determined by a local potato damage acceptance standard.

As shown in FIG. 40 to FIG. 43, the potato collection box 5 includes a box body 5-1, a supporting plate 5-2, and a plurality of pressure sensors 5-4. The supporting plate 5-2 is provided in the box body 5-1. The pressure sensors 5-4 are configured to monitor pressures of potatoes falling onto the supporting plate 5-2 in the potato collection box 5 and send the pressures to the control unit. The control unit receives pressure data from the pressure sensors 5-4, analyzes a distribution of the potatoes falling onto the supporting plate 5-2 according to the pressure data, and controls an ascending angle, a descending angle, and an inclination angle of the supporting plate 5-2 according to the distribution.

In an implementation of the present disclosure, the potato collection box 5 further includes a carrier plate 5-3, hydraulic posts 5-5, universal joints 5-6, and a supporting frame 5-7. The supporting plate 5-2 and the carrier plate 5-3 are stacked in the box body 5-1, and the supporting plate 5-2 is located on the carrier plate. The plurality of pressure sensors 5-4 are provided between the supporting plate 5-2 and the carrier plate 5-3. The pressure sensors 5-4 are configured to monitor the pressures of the potatoes on the supporting plate 5-2 and sends the pressures to the control unit. The hydraulic posts 5-5 are provided at a bottom of the carrier plate 5-3. Upper ends of the hydraulic posts 5-5 are connected to a lower surface of the carrier plate 5-3 through the universal joints 5-6. Lower ends of the hydraulic posts 5-5 are provided on the supporting frame 5-7. The control unit receives the pressure data from the pressure sensors 5-4, analyzes the distribution of the potatoes on the supporting plate 5-2 according to the pressure data, and controls telescopic amounts of the hydraulic posts 5-5, thereby controlling the ascending, the descending and the inclination angle of the supporting plate 5-2.

In an implementation of the present disclosure, the pressure sensors 5-4 are respectively provided at four corners and intersections between diagonals of the four corners of the carrier plate 5-3.

In an implementation of the present disclosure, the upper ends of the hydraulic posts 5-5 are connected to four endpoints of the lower surface of the carrier plate 5-3 through the universal joints 5-6.

In an implementation of the present disclosure, the potato collection box 5 further includes an unloading conveyor belt 5-8 and an unloading hydraulic cylinder 5-9. The box body 5-1 is open on a top and at a side. One end of the unloading conveyor belt 5-8 is connected to the open side of the box body 5-1. The unloading hydraulic cylinder 5-9 includes one end connected to the box body 5-1, and an other end connected to the unloading conveyor belt 5-8. The unloading hydraulic cylinder 5-9 is configured to realize opening and closing between the unloading conveyor belt 5-8 and the open side of the box body 5-1.

In a specific implementation of the present disclosure, the box body 5-1 is a semi-closed structure with three sides enclosed by a steel plate. The supporting plate 5-2 and the carrier plate 5-3 are stacked in the box body 5-1. The supporting plate 5-2 is located on an upper layer, while the carrier plate 5-3 is located on a lower layer. Five pressure sensors 5-4 are provided between the supporting plate 5-2 and the carrier plate 5-3 according to a "five-point distribution", namely the pressure sensors 5-4 are provided at an intersection between diagonals of the carrier plate 5-3 and at four points equidistant from the intersection on the diagonals, to monitor pressures and a distribution of potatoes piled at a bottom of the potato collection box 5. Four hydraulic posts 5-5 are vertically provided under the carrier plate 5-3 to support the carrier plate. The upper ends of the hydraulic posts 5-5 are connected to the four endpoints of the lower surface of the carrier plate 5-3 through the universal joints 5-6. The lower ends of the hydraulic posts 5-5 are located on the supporting frame 5-7. The unloading conveyor belt 5-8 is provided at the unsealed side of the box body 5-1, and connected to the unloading hydraulic cylinder 5-9 to realize opening and closing functions. The control unit receives the pressure data from the pressure sensor 5-4, and controls the telescopic amounts of the four hydraulic posts 5-5, thereby ascending, descending and inclining the supporting plate 5-2, reducing a falling damage of the potatoes, and making the potatoes piled uniformly in the box body 5-1.

Regarding the unloading conveyor belt 5-8 and the unloading hydraulic cylinder 5-9, in response to potato collection, the unloading hydraulic cylinder 5-9 is retracted, and the unloading conveyor belt 5-8 is located at a vertical position and formed into an enclosed structure with the box body 5-1, so as not to leak the potatoes. In response to potato unloading, the unloading hydraulic cylinder 5-9 is extended, the unloading conveyor belt 5-8 is laid flat to form a potato unloading port, and the potatoes are transported by the unloading conveyor belt 5-8 to leave away from the box body 5-1.

In a specific implementation of the present disclosure, in response to the potato collection, the supporting plate 5-2 has a small vertical distance relative to a potato falling position in an initial state. With an increase in a piling amount of the potatoes, the control unit reads values of the five pressure sensors 5-4 in real time, and accumulates the values. According to an accumulated value, a height H lowered by the supporting plate 5-2 is calculated, and the four hydraulic posts 5-5 are retracted by the height H. Therefore, the supporting plate 5-2 is gradually lowered with the increase in the piling amount of the potatoes, and the potatoes are not damaged for a large falling height when falling into the box body 5-1.

In a specific implementation of the present disclosure, in response to the potato collection, the values of the five pressure sensors 5-4 are read in real time. According to a difference between the pressure values of the pressure sensors 5-4 at different positions, an inclined state of the supporting plate 5-2 is calculated. While the four hydraulic posts 5-5 are retracted by the H, telescopic amounts $\Delta h_1$, $\Delta h_2$, $\Delta h_3$, $\Delta h_4$ are changed. Therefore, the potatoes are uniformly piled in the box body 5-1, and are not leaked for an uneven height on an upper surface of the potato pile.

In a specific implementation of the present disclosure, in response to the potato unloading, two hydraulic posts 5-5 close to the unloading conveyor belt 5-8 are retracted, while two hydraulic posts 5-5 away from the unloading conveyor belt 5-8 are extended. Therefore, the supporting plate 5-2 has a certain slope, such that the potatoes fall onto the unloading conveyor belt 5-8 to improve a potato unloading efficiency.

The potato collection box 5 can adaptively adjust a position of the bottom according to a weight of the potatoes, thereby controlling a falling height of the potatoes within an ultimate falling height and reducing the damage rate of the potatoes.

In a specific implementation of the present disclosure, the digging device 1 is provided at a forefront of the potato combine harvester, and configured to dig mature potatoes from a ridge. Through the vibration shovel and the sieve, the digging device lowers a digging resistance in potato harvesting and prevents soil hilling and potato damaging phenomena. The conveyance and separation device 2 is provided behind the digging device 1, and configured to convey and separate the dug potato-soil-stem mixture. Through the flexible net-like potato potato-stem separation conveyor chain and the multi-stage elastic open-close scraping tooth structure, the conveyance and separation device separates stems and leaves of the potatoes with a low damage. With information feedback, the rod spacing adjusting mechanism can effectively ensure soil removal of the potatoes with a high efficiency in different soil working environments and prevent the congestion. A main body structure of the separation and elevation reversing device 3 is provided at a side of the conveyance and separation device 2. The separation and elevation reversing device is a double-layer spatial rotating structure composed of multiple stages of reversing rollers and the separation conveyor chain, and further separates and conveys the potato-soil-stem mixture. This effectively improves a spatial utilization rate of the potato combine harvester and ensures working performance of the potato combine harvester. The monitoring device 4 is provided above the tail segment of the separation conveyor chain of the separation and elevation reversing device 3, to monitor damage and cleanliness of the potatoes before the potatoes enter the potato collection box 5, and feed a separation effect back to the operator. This allows the operator to timely adjust relevant working parameters to reduce an economic loss. The potato collection box 5 is located below the tail segment of the separation conveyor chain of the separation and elevation reversing device 3. The potato collection box can adaptively adjust a bottom position according to a weight of carried potatoes, thereby controlling a falling height of the potatoes within an ultimate falling height, and reducing a damage rate of the potatoes.

The present disclosure can realize low-damage digging, high-efficiency conveyance, and high-performance potato-soil and potato-stem separation at a time, can effectively reduce a digging resistance in potato harvesting and prevent soil hilling and potato damaging phenomena, and improves conveyance and separation efficiencies for a potato-soil-stem mixture. The present disclosure makes the harvester more adaptable to different soil properties and potato varieties, allows an operator to better adjust working performance of the harvester, reduces falling damage of potatoes due to a large falling height in box packaging, and meets requirements of high-efficiency combine harvesting of the potatoes. The present disclosure greatly improves an efficiency and performance in mechanized harvesting of the potatoes, lowers a harvesting cost of the potatoes, and increases an output and an economic output of the potatoes.

It should be understood that although this specification is described in accordance with the examples, not every example only includes one independent technical solution. This description of the specification is for the sake of clarity only. Those skilled in the art should take the specification as a whole, and the technical solutions in examples can also be appropriately combined to form other implementations that can be understood by those skilled in the art.

The series of detailed description listed above are only specific illustration of feasible examples of the present disclosure, rather than limiting the claimed scope of the present disclosure. All equivalent examples or changes made without departing from the technical spirit of the present disclosure should be included in the claimed scope of the present disclosure.

What is claimed is:

1. A high-efficiency and low-damage potato combine harvester, comprising a digging device, a conveyance and separation device, a separation and elevation reversing device, a potato collection box, and a control unit, wherein
   the digging device is provided at a front end of the potato combine harvester;
   the conveyance and separation device is provided behind the digging device, and configured to perform preliminary conveyance and separation on a potato-soil-stem mixture dug by the digging device;
   the separation and elevation reversing device is provided at a side of the conveyance and separation device, and configured to further separate the potato-soil-stem mixture from the conveyance and separation device and elevate potatoes to the potato collection box; and
   the potato collection box is located at a tail end of the separation and elevation reversing device, and configured to load the potatoes and feed weight information of carried potatoes back to the control unit; and the control unit controls an ascending angle, a descending angle, and an inclination angle of a potato carrying part of the potato collection box according to a weight of the carried potatoes,
   wherein the digging device comprises a digging shovel, a vibrating sieve, a drive device, an adjusting device, and a transitional conveyor chain;
   the digging shovel comprises an upper fixed shovel and a lower movable shovel; the upper fixed shovel is provided on the lower movable shovel; the upper fixed shovel and the lower movable shovel are stacked in a staggered manner; a shovel tip of the lower movable shovel extends to a front of a shovel tip of the upper fixed shovel; and circular microprotrusion structures are densely arranged on a shovel surface of the upper fixed shovel;
   the vibrating sieve is provided between the digging device and the transitional conveyor chain;
   the drive device is connected to the lower movable shovel and the vibrating sieve, and configured to drive the lower movable shovel and the vibrating sieve to vibrate in a reciprocating manner;
   the adjusting device is provided on a potato harvester frame; and the adjusting device is connected to the digging shovel, and configured to adjust a digging depth and a penetrating angle; and
   the transitional conveyor chain is provided behind the digging shovel.

2. The high-efficiency and low-damage potato combine harvester according to claim 1, wherein the upper fixed shovel comprises a nylon shovel surface and a fixed shovel supporting device; and
   the nylon shovel surface is provided on the fixed shovel supporting device; the circular microprotrusion structures are densely arranged on the nylon shovel surface; the circular microprotrusion structures each are a lotus-leaf-like hydrophobic structure; and the nylon shovel surface has an arc-shaped shovel tip.

3. The high-efficiency and low-damage potato combine harvester according to claim 2, wherein the fixed shovel supporting device comprises a fixed shovel supporting plate, a supporting arm, a rotary shaft, and an angle adjusting plate; the nylon shovel surface is provided on the fixed shovel supporting plate; the fixed shovel supporting plate is connected to one end of the supporting arm; an other end of the supporting arm is connected to the rotary shaft; two ends of the rotary shaft are provided on the adjusting device; and the angle adjusting plate comprises one end connected to the rotary shaft, and an other end connected to the adjusting device.

4. The high-efficiency and low-damage potato combine harvester according to claim 1, wherein the adjusting device comprises a parallel four-rod mechanism, a depth adjusting mechanism, and an angle adjusting mechanism; and
   the depth adjusting mechanism comprises one side connected to the potato harvester frame, and an other side connected to an upper portion of the parallel four-rod mechanism; the upper fixed shovel is provided at a front end of the parallel four-rod mechanism; a rear end of the parallel four-rod mechanism is connected to the potato harvester frame; the depth adjusting mechanism is configured to adjust an inclination angle of the parallel four-rod mechanism relative to ground, thereby adjusting the digging depth of the digging shovel; the angle adjusting mechanism comprises one end connected to the front end of the parallel four-rod mechanism, and an other end connected to the upper fixed shovel; and the angle adjusting mechanism is configured to adjust an inclination angle of the upper fixed shovel relative to the ground, thereby adjusting the penetrating angle of the digging shovel.

5. The high-efficiency and low-damage potato combine harvester according to claim 4, wherein a number of the parallel four-rod mechanisms is two, and the parallel four-rod mechanisms are respectively symmetrically provided at two sides of the depth adjusting mechanism; the parallel four-rod mechanisms each comprise front connecting rods, upper connecting rods, first side plates, and second side plates; one end of each of the front connecting rods is connected to one end of one of the upper connecting rods; an other end of the one of the upper connecting rods is connected to one end of one of the first side plates; an other end of the one of the first side plates is connected to one end of one of the second side plates; an other end of the one of the second side plates is connected to an other end of the each of the front connecting rods; upper portions of two of the front connecting rods are connected through a first beam; two of the upper connecting rods are connected through a second beam; upper portions of two of the first side plates are connected through a third beam; and lower portions of the two of the first side plates are connected through a fourth beam.

6. The high-efficiency and low-damage potato combine harvester according to claim 5, wherein the angle adjusting mechanism comprises an angle adjusting hydraulic cylinder; and the angle adjusting hydraulic cylinder comprises one end connected to one end of one of the front connecting rods, and an other end connected to the upper fixed shovel.

7. The high-efficiency and low-damage potato combine harvester according to claim 4, wherein the depth adjusting mechanism comprises a digging depth adjusting hydraulic cylinder, a first depth adjusting rod, and a second depth adjusting rod; and the digging depth adjusting hydraulic cylinder comprises one end connected to the potato harvester frame, and an other end connected to the first depth adjusting rod; the first depth adjusting rod comprises one end connected to a third beam-, and an other end connected to one end of the second depth adjusting rod; and an other end of the second depth adjusting rod is connected to a second beam.

8. The high-efficiency and low-damage potato combine harvester according to claim 1, wherein the conveyance and separation device comprises a potato-soil separation conveyor chain, a potato-stem separation conveyor chain, elastic open-close scraping teeth, and a tensioning mechanism; and the potato-stem separation conveyor chain surrounds the potato-soil separation conveyor chain; the elastic open-close scraping teeth are provided above the potato-stem separation conveyor chain; the elastic open-close scraping teeth are cooperated with the potato-stem separation conveyor chain to separate stems and leaves from the potatoes; and the tensioning mechanism is provided on the potato-soil separation conveyor chain, and configured to adjust tensioning of the potato-soil separation conveyor chain to adjust a spacing between conveyor chain rods.

9. The high-efficiency and low-damage potato combine harvester according to claim 8, further comprising a photogate sensor and the control unit, wherein the photogate sensor is configured to detect a time signal that a beam is obstructed by the conveyor chain rods of the potato-soil separation conveyor chain; the time signal comprises an off time and an on time and is transmitted to the control unit; and the control unit calculates a linear speed v of the potato-soil separation conveyor chain and a spacing l between adjacent ones of the conveyor chain rods according to the time signal acquired by the photogate sensor.

10. The high-efficiency and low-damage potato combine harvester according to claim 9, further comprising an image acquisition device, wherein the image acquisition device is configured to acquire an image of a potato-soil mixture on the potato-soil separation conveyor chain and transmit the image to the control unit, such that the linear speed v of the potato-soil separation conveyor chain is adjusted according to a congestion condition displayed by the image.

11. The high-efficiency and low-damage potato combine harvester according to claim 9, wherein the photogate sensor comprises a first photogate sensor and a second photogate sensor;

the first photogate sensor and the second photogate sensor are respectively provided at two sides of an upper segment of the potato-soil separation conveyor chain; the first photogate sensor and the second photogate sensor each comprise a laser, a sensor, and a timer;

the laser is configured to emit a beam, the sensor is configured to receive the beam, and the timer is configured to calculate a time, which is the off time t, that the conveyor chain rods move to a position between the laser and the sensor for a first time and the beam is obstructed; and the timer is further configured to calculate a time, which is the on time T, that the conveyor chain rods move away from the position between the laser and the sensor for a first time and the beam is unobstructed until being obstructed next time;

the control unit receives a time signal calculated by the first photogate sensor and the second photogate sensor, and calculates the linear speed v of the potato-soil separation conveyor chain and the spacing l between the adjacent ones of the conveyor chain rods;

the linear speed v of the potato-soil separation conveyor chain is calculated by:

$$v = \frac{d}{t}$$

wherein, d is a diameter of each of the conveyor chain rods; and the spacing l between the adjacent ones of the conveyor chain rods is calculated by:

$$l = v \cdot T.$$

12. The high-efficiency and low-damage potato combine harvester according to claim 8, wherein the potato-soil separation conveyor chain comprises a plurality of the conveyor chain rods; and the adjacent ones of the conveyor chain rods are respectively connected at ends through herringbone torsion spring connectors; and any two adjacent ones of the herringbone torsion spring connectors are arranged in a vertical turning direction.

13. The high-efficiency and low-damage potato combine harvester according to claim 12, wherein a pair of pin holes are formed respectively radially in two ends of each of the conveyor chain rods; through cotter pins and locating catches, the herringbone torsion spring connectors are located in an axial direction of the conveyor chain rods; three locating catches are provided at each of the two ends of each of the conveyor chain rods and between a pair of the cotter pins; the locating catches pairwise separate adjacent ones of the herringbone torsion spring connectors connected to the conveyor chain rods; any two adjacent ones of the herringbone torsion spring connectors are cooperated with a same one of the conveyor chain rods; the any two adjacent ones of the herringbone torsion spring connectors are arranged in the vertical turning direction; and two ends of the same one of the conveyor chain rods are respectively cooperated with two of the herringbone torsion spring connectors.

14. The high-efficiency and low-damage potato combine harvester according to claim 12, wherein the potato-stem separation conveyor chain comprises a plurality of transverse rubber rods and a plurality of longitudinal rubber belts; the plurality of the transverse rubber rods are arranged transversely; the plurality of the longitudinal rubber belts are arranged longitudinally; the plurality of the transverse rubber rods and the plurality of the longitudinal rubber belts are interlaced to form a net-like structure; finger-like flexible protruding contacts are uniformly arranged on the plurality of the transverse rubber rods; and the finger-like flexible protruding contacts are cooperated with the elastic open-close scraping teeth to separate the stems and the leaves from the potatoes.

15. The high-efficiency and low-damage potato combine harvester according to claim 12, wherein the elastic open-close scraping teeth comprise fixed seats, a fixed shaft, flexible rubber scraping teeth, a reset torsional spring, and an elongated rod; and the fixed seats are respectively provided at two ends of the fixed shaft; the fixed shaft is parallel to the conveyor chain rods; one end of each of the flexible rubber scraping teeth is a shaft sleeve structure; a plurality of the flexible rubber scraping teeth are sleeved on the fixed shaft; the reset torsional spring comprises one end connected to the shaft sleeve structure of one of the flexible rubber scraping teeth, and an other end connected to the elongated rod; and two ends of the elongated rod are respectively connected to the fixed seats.

16. The high-efficiency and low-damage potato combine harvester according to claim 12, wherein the tensioning mechanism comprises tensioning arms, a rotary shaft, tensioning wheels, and an adjusting hydraulic cylinder;

each of the tensioning arms comprises a transverse arm and a longitudinal arm intersected to form a T-shaped structure, and is connected to a shaft end of the rotary shaft at an intersection; the tensioning arms are respectively connected to two ends of the rotary shaft; two ends of the transverse arm of each of the tensioning arms are respectively provided with the tensioning wheels; the tensioning wheels come in contact with the potato-soil separation conveyor chain; the longitudinal arm of each of the tensioning arms comprises one end hinged with the adjusting hydraulic cylinder, and an other end connected to a potato harvester frame; and by controlling a telescopic amount of the adjusting hydraulic cylinder, a tension degree of the potato-soil separation conveyor chain is changed; and the tensioning mechanism is provided on a lower segment of the potato-soil separation conveyor chain; two of the tensioning wheels are located on an inner ring of the potato-soil separation conveyor chain, and two of the tensioning wheels are located on an outer ring of the potato-soil separation conveyor chain; when the tensioning mechanism works, the two of the tensioning wheels are pressed upward from a lower surface of the lower segment of the potato-soil separation conveyor chain, and the two of the tensioning wheels are pressed downward from an upper surface of the lower segment of the potato-soil separation conveyor chain, thereby adjusting an openness of each of the herringbone torsion spring connectors, and adjusting the spacing between the adjacent ones of the conveyor chain rods.

17. The high-efficiency and low-damage potato combine harvester according to claim 1, wherein the separation and elevation reversing device comprises a first longitudinal flexible conveyor belt, a first transverse flexible conveyor belt, a second longitudinal flexible conveyor belt, an elevation inclined conveyor belt, and a second transverse flexible conveyor belt;

a first-stage single-layer potato-stem-soil separating roller, a second-stage double-layer potato-stem-soil separating roller, and a third-stage three-layer potato-stem-soil separating roller are sequentially inclined on the first longitudinal flexible conveyor belt from front to back; the first-stage single-layer potato-stem-soil separating roller, the second-stage double-layer potato-stem-soil separating roller and the third-stage three-layer potato-stem-soil separating roller are increasingly high in sequence; a gap is provided between double layers of separating rollers in the second-stage double-layer potato-stem-soil separating roller; a gap is provided between three layers of separating rollers in the third-stage three-layer potato-stem-soil separating roller; and the first longitudinal flexible conveyor belt is configured to convey the potatoes to the first transverse flexible conveyor belt;

the first transverse flexible conveyor belt is configured to convey the potatoes from the first longitudinal flexible conveyor belt to the second longitudinal flexible conveyor belt;

the second longitudinal flexible conveyor belt is configured to convey the potatoes from the first transverse flexible conveyor belt to the elevation inclined conveyor belt;

the elevation inclined conveyor belt is configured to convey the potatoes from the second longitudinal flexible conveyor belt to the second transverse flexible conveyor belt; and the second transverse flexible conveyor belt is configured to convey the potatoes to the potato collection box.

18. The high-efficiency and low-damage potato combine harvester according to claim 17, wherein the first-stage single-layer potato-stem-soil separating roller comprises a first-stage roller body, first-stage roller mounting seats, first-stage roller mounting slides, a first-stage roller compressed spring, a first-stage roller driven hydraulic motor, a first-stage roller transmission belt pulley, and a first-stage roller transmission belt; and two ends of the first-stage roller body are respectively provided on the first-stage roller mounting seats; the first-stage roller mounting seats are respectively connected to the first-stage roller mounting slides to form a sliding pair; the first-stage roller compressed spring is provided on each of the first-stage roller mounting slides; the first-stage roller compressed spring comprises one end in contact with an upper inner wall of the each of the first-stage roller mounting slides, and an other end in contact with the first-stage roller body; one end of the first-stage roller body is provided with the first-stage roller transmission belt pulley; the first-stage roller driven hydraulic motor is connected to the first-stage roller transmission belt pulley through the first-stage roller transmission belt, to drive the first-stage roller body to rotate; and a rotating direction of the first-stage roller body is opposite to a conveying direction of a conveyor belt.

19. The high-efficiency and low-damage potato combine harvester according to claim 18, wherein the second-stage double-layer potato-stem-soil separating roller comprises two second-stage roller bodies, second-stage roller mounting seats, second-stage roller mounting slides, a second-stage roller compressed spring, a second-stage roller driven hydraulic motor, second-stage roller transmission belt pulleys, and a second-stage roller transmission belt;

two ends of each of the second-stage roller bodies are respectively provided on the second-stage roller mounting seats; the second-stage roller mounting seats are respectively connected to the second-stage roller mounting slides to form a sliding pair; the two second-stage roller bodies are stacked along a direction of the second-stage roller mounting slides; the second-stage roller compressed spring is provided on each of the second-stage roller mounting slides; the second-stage roller compressed spring comprises one end in contact with an upper inner wall of the each of the second-stage roller mounting slides, and an other end in contact with an upper one of the second-stage roller bodies; one end of each of the second-stage roller bodies is provided with one of the second-stage roller transmission belt pulleys; the second-stage roller driven hydraulic motor is connected to one of the second-stage roller transmission belt pulleys through the second-stage roller transmission belt; a diameter of one of the second-stage roller transmission belt pulleys of the upper one of the second-stage roller bodies in the second-stage double-layer potato-stem-soil separating roller is less than a diameter of one of the second-stage roller transmission belt pulleys of a lower one of the second-stage roller bodies; an upper one and a lower one of the second-stage roller transmission belt pulleys are connected through a transmission belt; the second-stage roller driven hydraulic motor drives the upper one and the lower one of the second-stage roller bodies to rotate; a gap is provided between the two second-stage roller bodies; a rotating direction of the second-stage roller bodies is opposite to the conveying direction of the conveyor belt; and the upper one of the second-stage roller bodies has a rotational speed greater than a rotational speed of the lower one of the second-stage roller bodies.

20. The high-efficiency and low-damage potato combine harvester according to claim 18, wherein the third-stage three-layer potato-stem-soil separating roller comprises three third-stage roller bodies, third-stage roller mounting seats, third-stage roller mounting slides, a third-stage roller compressed spring, a third-stage roller driven hydraulic motor, third-stage roller transmission belt pulleys, and a third-stage roller transmission belt;

two ends of each of the third-stage roller bodies are respectively provided on the third-stage roller mounting seats; the third-stage roller mounting seats are respectively connected to the third-stage roller mounting slides to form a sliding pair; the three third-stage roller bodies are stacked along a direction of the third-stage roller mounting slides; the third-stage roller compressed spring is provided on each of the third-stage roller mounting slides; the third-stage roller compressed spring comprises one end in contact with an upper inner wall of the each of the third-stage roller mounting slides, and an other end in contact with an uppermost one of the third-stage roller bodies; one end of each of the third-stage roller bodies is provided with one of the third-stage roller transmission belt pulleys; the third-stage roller driven hydraulic motor is connected to one of the third-stage roller transmission belt pulleys through the third-stage roller transmission belt; diameters of the third-stage roller transmission belt pulleys on the third-stage roller bodies increase sequentially from top to bottom; any two adjacent ones of the third-stage roller transmission belt pulleys are connected through a transmission belt; the third-stage roller driven hydraulic motor drives the three third-stage roller bodies to rotate; a gap is provided between the three third-stage roller bodies; a rotating direction of the third-stage roller bodies is opposite to the conveying direction of the conveyor belt; and rotational speeds of the three third-stage roller bodies decrease sequentially from top to bottom;
the third-stage three-layer potato-stem-soil separating roller is provided on the second longitudinal flexible conveyor belt; and the third-stage three-layer potato-stem-soil separating roller is inclined at a front end of the second longitudinal flexible conveyor belt; and
the third-stage three-layer potato-stem-soil separating roller is provided on the second transverse flexible conveyor belt; and the third-stage three-layer potato-stem-soil separating roller is inclined at a front end of the second transverse flexible conveyor belt.

21. The high-efficiency and low-damage potato combine harvester according to claim 18, wherein a plurality of arc-shaped scraping plates are arranged on the elevation inclined conveyor belt; and the arc-shaped scraping plates each comprise one end connected to a main body of the conveyor belt, and are configured to support the potatoes and convey the potatoes upward to the second transverse flexible conveyor belt.

22. The high-efficiency and low-damage potato combine harvester according to claim 1, further comprising a monitoring device, wherein
the monitoring device is configured to capture a potato image before the potatoes enter the potato collection box, and feed the potato image back to the control unit; and
the control unit recognizes a boundary of a potato body, a boundary of a damage part, and a boundary of adhered soil for each of the potatoes according to the potato image, and calculates a damage rate and a soil adhering rate of the potatoes; the damage part comprises a mechanical damage part; when recognizing that a mechanical damage rate of the potatoes is greater than a preset value, the control unit feeds data back to an operator, to adjust a digging depth of the digging device; and when recognizing that the soil adhering rate of the potatoes is greater than a preset value, the control unit feeds data back to the operator, to adjust a linear speed and a vibration frequency of the conveyance and separation device of the potato combine harvester.

23. The high-efficiency and low-damage potato combine harvester according to claim 22, wherein the control unit performs boundary segmentation through a hue-saturation-value (HSV) color space on the potato image captured by the monitoring device, and performs colorization and color differentiation on the potato body, the damage part and the adhered soil of the potatoes in the potato image captured by the monitoring device, according to preset color thresholds for the potato body, the damage part and the adhered soil of the potatoes; upon completion of the color differentiation, a soil enclosure, a potato body enclosure, and a damage part enclosure are obtained according to a color distribution and boundaries of different colors, and the damage rate and the soil adhering rate of the potatoes are calculated; the damage rate of the potatoes is calculated with a coordinate block filling method and/or an integral method; and the soil adhering rate of the potatoes is calculated with an integral method.

24. The high-efficiency and low-damage potato combine harvester according to claim 23, wherein the damage rate of the potatoes is an average of a damage rate in the coordinate block filling method and a damage rate in the integral method.

25. The high-efficiency and low-damage potato combine harvester according to claim 23, wherein the damage part of the potatoes further comprises one or more of an insect hole and a rot; and the damage rate of the potatoes comprises a sum of one or more of a damage rate for a mechanical damage, a damage rate for the insect hole, and a damage rate for the rot.

26. The high-efficiency and low-damage potato combine harvester according to claim 23, wherein the control unit segments each of the soil enclosure and the potato body enclosure into an upper portion and a lower portion with a coordinate system, and performs function fitting on a boundary line of the upper portion and a boundary line of the lower portion; by integrating a function, an area of the soil enclosure and an area of the potato body enclosure are calculated; the soil adhering rate of a single potato is obtained by subtracting the area of the potato body enclosure from the area of the soil enclosure to obtain a difference and then dividing the difference by the area of the potato body enclosure; a maximum adhering distance for the adhered soil of the potatoes is calculated; in the potato image captured by the monitoring device, by dividing a sum of soil adhering rates for a plurality of the potatoes by a total number of the plurality of the potatoes in the potato image, the soil adhering rate of the potatoes is obtained; when the soil adhering rate of the potatoes is greater than the preset value, the data is fed back to the operator; and in combination with the soil adhering rate of the potatoes and the maximum adhering distance for the adhered soil of the potatoes, the linear speed and the vibration frequency of the conveyance and separation device of the potato combine harvester are adjusted.

27. The high-efficiency and low-damage potato combine harvester according to claim 22, further comprising a turn-over device, wherein the monitoring device comprises a first industrial camera and a second industrial camera; the turn-over device is configured to turn over the potatoes; the first industrial camera captures an upper surface image of the potatoes and transmits the upper surface image to the control unit; the control unit controls the turn-over device to turn over the potatoes; the second industrial camera captures a lower surface image of the potatoes and transmits the lower surface image to the control unit; and in combination with the upper surface image and the lower surface image of the potatoes, the control unit calculates the damage rate.

28. The high-efficiency and low-damage potato combine harvester according to claim 27, wherein the turn-over device comprises a motor, an electric cylinder, and a shifting tooth mechanism; the shifting tooth mechanism comprises a rotating shaft; a plurality of shifting teeth are provided on the rotating shaft; the motor is connected to an end of the rotating shaft, and configured to drive the rotating shaft to rotate; and the electric cylinder is connected to the motor, and configured to drive the motor, thereby driving the shifting tooth mechanism to move up and down.

29. The high-efficiency and low-damage potato combine harvester according to claim 1, wherein the potato collection box comprises a box body, a supporting plate, and a plurality of pressure sensors;
the supporting plate is provided in the box body;
the plurality of the pressure sensors are configured to monitor pressures of potatoes falling onto the supporting plate in the potato collection box and send the pressures to the control unit; and
the control unit receives pressure data from the plurality of the pressure sensors, analyzes a distribution of the potatoes falling onto the supporting plate according to the pressure data, and controls an ascending angle, a descending angle, and an inclination angle of the supporting plate according to the distribution.

30. The high-efficiency and low-damage potato combine harvester according to claim 29, wherein the potato collection box further comprises a carrier plate, a hydraulic post, a universal joint, and a supporting frame; and
the supporting plate and the carrier plate are stacked in the box body, and the supporting plate is located on the carrier plate; the plurality of the pressure sensors are provided between the supporting plate and the carrier plate; the plurality of the pressure sensors are configured to monitor the pressures of the potatoes on the supporting plate and sends the pressures to the control unit; the hydraulic post is provided at a bottom of the carrier plate; an upper end of the hydraulic post is connected to a lower surface of the carrier plate through the universal joint; a lower end of the hydraulic post is provided on the supporting frame; the control unit receives the pressure data from the plurality of the pressure sensors, analyzes the distribution of the potatoes on the supporting plate according to the pressure data, and controls a telescopic amount of the hydraulic post, to achieve the ascending angle, the descending angle, and the inclination angle of the supporting plate.

31. The high-efficiency and low-damage potato combine harvester according to claim 30, wherein a number of the pressure sensors is five; the pressure sensors are arranged on an upper surface of the carrier plate in a five-point method, specifically, the pressure sensors are respectively provided at four corners and an intersection between diagonals of the four corners of the carrier plate; and the upper ends of the hydraulic posts are respectively connected to four endpoints of the lower surface of the carrier plate through the universal joints.

32. The high-efficiency and low-damage potato combine harvester according to claim 29, wherein the potato collection box further comprises an unloading conveyor belt and an unloading hydraulic cylinder; the box body is open on a top and at a side; one end of the unloading conveyor belt is connected to the side of the box body; the unloading hydraulic cylinder comprises one end connected to the box body, and an other end connected to the unloading conveyor belt; and the unloading hydraulic cylinder is configured to realize opening and closing of the unloading conveyor belt and the side of the box body.

* * * * *